US 12,459,105 B2

(12) United States Patent
Chen et al.

(10) Patent No.: US 12,459,105 B2
(45) Date of Patent: Nov. 4, 2025

(54) TOOLBOX SYSTEM

(71) Applicant: Nanjing Chervon Industry Co., Ltd., Nanjing (CN)

(72) Inventors: Cheng Chen, Nanjing (CN); Jie Guo, Nanjing (CN); Yongning Wu, Nanjing (CN); Keqiong Zhong, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 126 days.

(21) Appl. No.: 18/175,220

(22) Filed: Feb. 27, 2023

(65) Prior Publication Data
US 2023/0202025 A1 Jun. 29, 2023

Related U.S. Application Data

(63) Continuation of application No. PCT/CN2022/096771, filed on Jun. 2, 2022.

(30) Foreign Application Priority Data

Jun. 29, 2021 (CN) .......................... 202110729299.4
Mar. 31, 2022 (CN) .......................... 202210336428.8
May 17, 2022 (CN) .......................... 202210536881.3

(51) Int. Cl.
*B25H 3/02* (2006.01)
*B25H 5/00* (2006.01)

(52) U.S. Cl.
CPC ............... *B25H 3/023* (2013.01); *B25H 5/00* (2013.01)

(58) Field of Classification Search
CPC . B25H 3/02; B25H 3/023; B25H 3/00; B25H 3/028; B25H 3/026; B25H 3/04;
(Continued)

(56) References Cited

U.S. PATENT DOCUMENTS 4,574,822 A * 3/1986 Helinsky ................ A63H 33/00
206/823
5,263,576 A * 11/1993 Boreen .................. B65D 43/20
220/345.2
(Continued)

FOREIGN PATENT DOCUMENTS

AU 2007101159 A4 1/2008
CN 201923584 U 8/2011
(Continued)

OTHER PUBLICATIONS

ISA/CN, Int. Search Report issued on PCT application No. PCT/CN2022/096771, dated Aug. 29, 2022, 5 pages.
(Continued)

*Primary Examiner* — Anthony D Stashick
*Assistant Examiner* — Prince Pal
(74) *Attorney, Agent, or Firm* — Greenberg Traurig, LLP

(57) ABSTRACT

A toolbox system includes a storage box and an external hanger assembly. The storage box has an accommodation cavity for storing an item. The storage box includes a limiting portion formed on a housing of the storage box. The external hanger assembly is used for detachably connecting the item. The external hanger assembly includes an external hanger capable of detachably connecting the item. The limiting portion includes a limiting surface and/or a limiting hole mating with a mounting portion of the external hanger assembly.

12 Claims, 53 Drawing Sheets

(58) Field of Classification Search
CPC B65D 21/0209; B65D 21/00; B65D 21/0201;
B65D 21/0204; B65D 21/0212
USPC ...... 206/503, 349; 220/23.83, 600, 752, 694
See application file for complete search history.

(56) References Cited

U.S. PATENT DOCUMENTS

| | | | | |
|---|---|---|---|---|
| 5,497,880 | A * | 3/1996 | Dieffenbach | B65H 75/16 206/395 |
| 5,906,381 | A * | 5/1999 | Hovatter | B25H 3/028 280/47.27 |
| 6,176,559 | B1 * | 1/2001 | Tiramani | B65H 75/403 280/47.35 |
| 6,347,847 | B1 * | 2/2002 | Tiramani | B65H 75/403 280/47.35 |
| 6,761,366 | B1 * | 7/2004 | Klemmensen | B62B 1/125 16/113.1 |
| 8,046,961 | B1 * | 11/2011 | Cutting | H02S 10/40 52/173.3 |
| 8,657,307 | B2 * | 2/2014 | Lifshitz | B25H 3/02 280/47.17 |
| 8,708,351 | B2 * | 4/2014 | Kinskey | B25H 3/022 280/47.131 |
| 10,434,639 | B1 * | 10/2019 | Chen | B25H 3/04 |
| 10,962,218 | B2 * | 3/2021 | Plato | F21V 33/0084 |
| 11,826,764 | B2 * | 11/2023 | Grebing | A47L 9/1691 |
| 11,936,197 | B2 * | 3/2024 | Cholst | B60L 53/30 |
| 12,090,625 | B2 * | 9/2024 | Barton | B25H 3/04 |
| 2004/0160150 | A1 * | 8/2004 | Hay | A47B 97/00 312/281 |
| 2007/0012694 | A1 * | 1/2007 | Duvigneau | B25H 3/026 220/4.27 |
| 2007/0194543 | A1 * | 8/2007 | Duvigneau | B25H 3/026 280/47.26 |
| 2009/0211933 | A1 * | 8/2009 | Chen | B25H 3/02 206/373 |
| 2010/0085745 | A1 * | 4/2010 | Kristiansen | B25H 3/02 362/217.1 |
| 2011/0049824 | A1 * | 3/2011 | Bar-Erez | B25H 3/028 280/47.26 |
| 2011/0158761 | A1 * | 6/2011 | Jackson | B65D 21/064 410/96 |
| 2011/0187248 | A1 * | 8/2011 | Kao | A47B 81/00 312/280 |
| 2012/0080432 | A1 * | 4/2012 | Bensman | B25H 3/023 220/752 |
| 2012/0326406 | A1 * | 12/2012 | Lifshitz | B25H 3/02 206/503 |
| 2013/0051104 | A1 * | 2/2013 | Nakano | H02J 7/0045 320/110 |
| 2013/0127129 | A1 * | 5/2013 | Bensman | B65D 21/0209 206/349 |
| 2014/0166516 | A1 * | 6/2014 | Martinez | B25H 3/02 206/372 |
| 2014/0332424 | A1 * | 11/2014 | Poulin | B25H 3/02 206/349 |
| 2014/0375181 | A1 * | 12/2014 | Bar-Erez | B65D 25/22 312/111 |
| 2015/0274362 | A1 * | 10/2015 | Christopher | B65D 21/0219 206/506 |
| 2016/0130034 | A1 * | 5/2016 | Kuhls | B65D 21/023 206/510 |
| 2017/0063114 | A1 * | 3/2017 | Briere | H02J 7/0013 |
| 2017/0070068 | A1 * | 3/2017 | Ito | H02J 7/0044 |
| 2018/0161975 | A1 * | 6/2018 | Brunner | B62B 1/14 |
| 2019/0002004 | A1 * | 1/2019 | Brunner | B25H 3/023 |
| 2020/0165036 | A1 * | 5/2020 | Squiers | A45C 7/0045 |
| 2020/0284425 | A1 * | 9/2020 | Plato | F21V 33/0084 |
| 2021/0129313 | A1 * | 5/2021 | Tvrdy Benes | B25H 3/02 |
| 2021/0305824 | A1 * | 9/2021 | Shirazi | H02M 3/33507 |
| 2021/0360803 | A1 * | 11/2021 | Semon | H02J 7/0042 |
| 2022/0117393 | A1 * | 4/2022 | Jenkins | B25H 3/04 |
| 2022/0144326 | A1 * | 5/2022 | Williams | B62B 3/10 |
| 2023/0076422 | A1 * | 3/2023 | Hafenrichter | B25F 5/02 |
| 2023/0136626 | A1 * | 5/2023 | Cai | B65D 21/0228 206/503 |
| 2023/0202025 | A1 * | 6/2023 | Chen | B25H 3/02 206/503 |
| 2023/0411975 | A1 * | 12/2023 | Roberts | H01M 10/46 |
| 2024/0025028 | A1 * | 1/2024 | Hamon | B25H 3/028 |
| 2024/0190616 | A1 * | 6/2024 | Squiers | A45C 7/0045 |
| 2024/0208040 | A1 * | 6/2024 | Coons | B25H 3/023 |
| 2024/0270445 | A1 * | 8/2024 | Brunner | B65D 21/0209 |
| 2024/0326231 | A1 * | 10/2024 | Groves | B25H 3/06 |
| 2024/0359311 | A1 * | 10/2024 | Chen | B65D 21/0209 |

FOREIGN PATENT DOCUMENTS

| | | |
|---|---|---|
| CN | 205928597 U | 2/2017 |
| CN | 205968920 U | 2/2017 |
| CN | 109834681 A | 6/2019 |
| CN | 211193824 U | 8/2020 |
| CN | 112821244 A | 5/2021 |
| CN | 215920396 U | 3/2022 |
| WO | 2011135559 A1 | 11/2011 |

OTHER PUBLICATIONS

ISA/CN, English translation of Int. Search Report issued on PCT application No. PCT/CN2022/096771, dated Aug. 29, 2022, 3 pages.

ISA/CN, Written Opinion issued on PCT application No. PCT/CN2022/096771, dated Aug. 29, 2022, 4 pages.

ISA/CN, English translation of Written Opinion issued on PCT application No. PCT/CN2022/096771, dated Aug. 29, 2022, 4 pages.

* cited by examiner

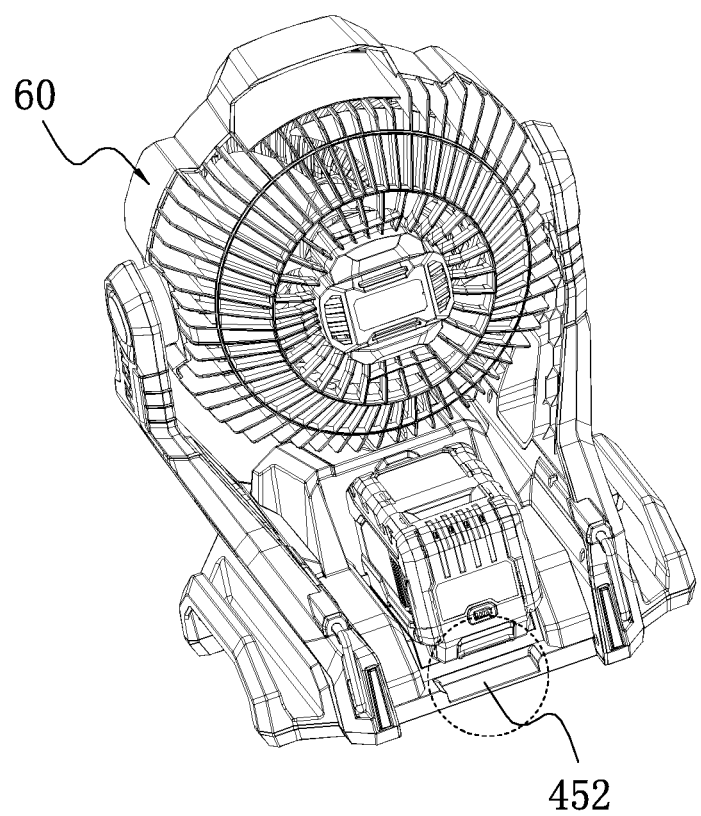
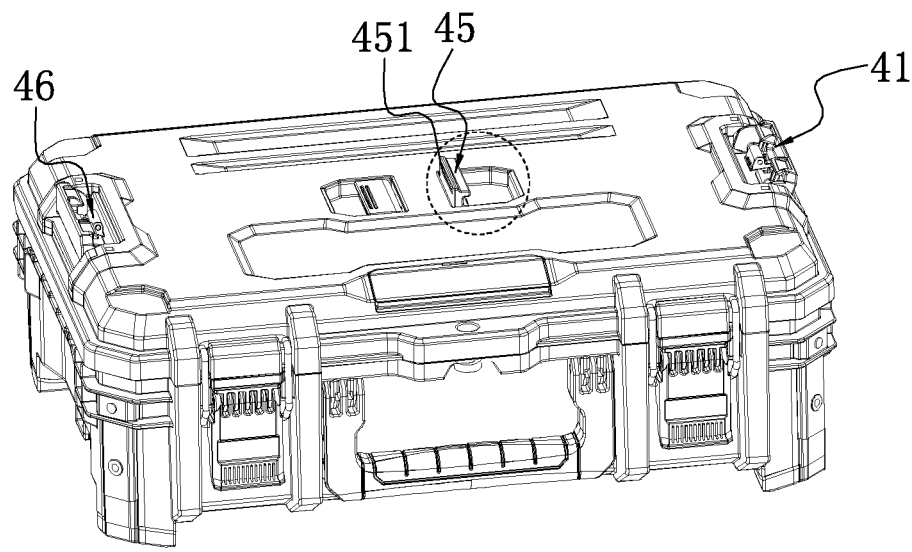
FIG. 25

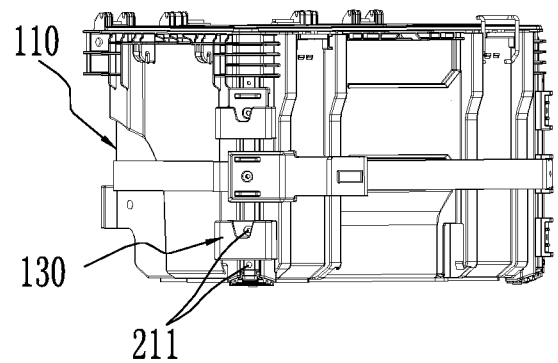
FIG. 54a
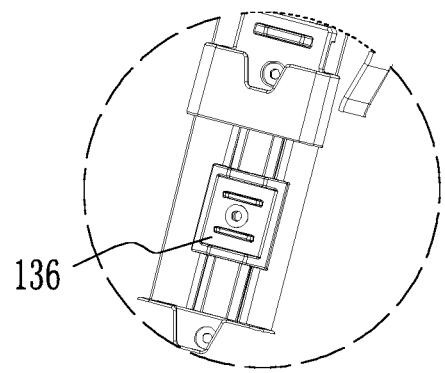
FIG. 54b
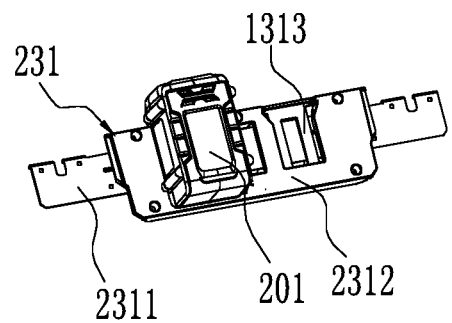
FIG. . 55

TOOLBOX SYSTEM

RELATED APPLICATION INFORMATION

This application is a continuation of International Application Number PCT/CN2022/096771, filed on Jun. 2, 2022, through which this application also claims the benefit under 35 U.S.C. § 119(a) of Chinese Patent Application No. 202110729299.4, filed on Jun. 29, 2021, Chinese Patent Application No. 202210336428.8, filed on Mar. 31, 2022, and Chinese Patent Application No. 202210536881.3, filed on May 17, 2022, which applications are incorporated herein by reference in their entirety.

BACKGROUND

Due to the limited dimensions and space of a storage box, many tools cannot be well stored in the storage box, for example, a battery pack, a horizontal scale, a cable, chemicals such as lubricating oil, and a tool worn at any time. If these items are placed in the storage box, the space in the storage box may not be sufficient. If these items are not placed in the storage box, these items need to be carried by a user with free hands or scattered on the ground, which is very inconvenient. For this reason, some users purchase connecting devices and weld the connecting devices to the storage box, which is not only troublesome but also damages the structure of the storage box.

Therefore, the related art has yet to be improved and developed.

SUMMARY

The present application adopts the following technical solutions: a toolbox system includes a storage box and an external hanger assembly.

The storage box has an accommodation cavity for storing an item. The storage box includes a limiting portion formed on a housing of the storage box. The external hanger assembly is used for detachably connecting the item. The external hanger assembly includes an external hanger capable of detachably connecting the item. The limiting portion includes a limiting surface and/or a limiting hole mating with a mounting portion of the external hanger assembly.

BRIEF DESCRIPTION OF DRAWINGS

FIG. 25 is a schematic view illustrating that a fan unit and the storage box are separated in a toolbox system shown in FIG. 23;

FIG. 54A is a partial structural view of the toolbox system in FIG. 51;

FIG. 54B is a structural view of an intermediate piece of the toolbox system in FIG. 51;

FIG. 55 is a structural view of a first example of a hanger in the toolbox system shown in FIG. 51;

DETAILED DESCRIPTION

The present application is described below in detail in conjunction with drawings and examples.

Figure 1:
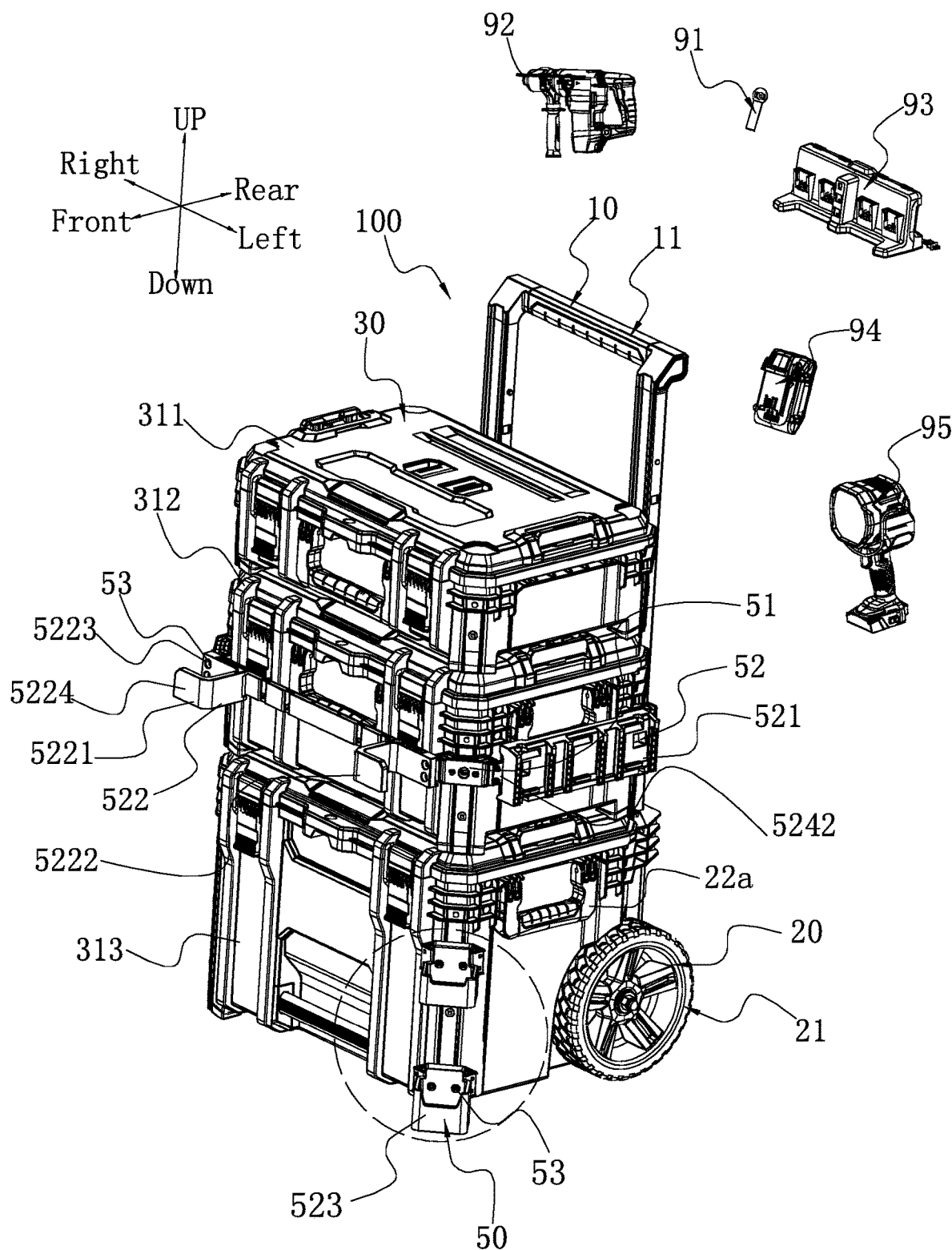
FIG. 1 is a schematic view of a toolbox system according to the present application.

FIG. 1 shows a toolbox system 100 used for storing an item, such as an accessory 91, a tool 92, a charging device 93, a power supply device 94, and a lighting device 95. It is to be noted that storing the item as described in the present application not only includes storing the item in a storage box 31 but also includes fixing the item on an outer side of the storage box 31 and keeping the item fixed relative to the storage box 31, which is also referred to as storing the item in the storage box 31.

To clearly illustrate the technical solutions of the present application, up, down, front, rear, left, and right shown in FIG. 1 are defined. It is to be noted that, unless otherwise specified, up and down, front and rear, and left and right are described below with respect to a state where the toolbox system 100 stands still as shown in FIG. 1. As shown in FIGS. 1 to 6, the toolbox system 100 includes a handle device 10, a moving device 20, a storage device 30, an auxiliary handle device 20a, a locking device 30a, and an interlocking device 40. The storage device 30 is a main part of the toolbox system 100 and includes at least the storage box 31 for storing the item. The toolbox system 100 may include multiple storage boxes 31, and the interlocking device 40 is used for locking the storage boxes 31. The storage box 31 includes a housing 32 having an accommodation cavity 310 and an upper cover 33 for closing the accommodation cavity 310, where the item may be stored in the accommodation cavity 310. The locking device 30a is used for locking the housing 32 and the upper cover 33 so that the housing 32 and the upper cover 33 remain fixed relative to each other. The handle device 10 is connected to the storage box 31 and has a pull rod 11 for a user to grip, where the pull rod 11 is movable relative to the storage box 31. The moving device 20 is connected to the storage box 31, includes one or more wheels 21, and can move the storage box 31 relative to the ground. The user may pull or push the wheels 21 to rotate relative to the ground by holding the pull rod 11, thereby driving the storage box 31 to move. The auxiliary handle device 20a is connected to the storage box 31 and includes a first sidewall handle 21a and a second sidewall handle 22a disposed on left and right sidewalls of the storage box 31, and the user may hold the first sidewall handle 21a and the second sidewall handle 22a to lift the storage box 31. In some other examples, the toolbox system 100 further includes multiple storage boxes 31, and the interlocking device 40 is used for connecting the storage boxes 31 so that the storage boxes 31 can remain fixed relative to each other.

When the toolbox system 100 stands still on the ground as shown in FIG. 1, support points of the wheels 21 with the ground and a support point of the storage box 31 with the ground at least include three support points with the ground, where a plane where the three support points are located is defined as a support plane P. It is to be noted that the ground may refer to another contact surface 61 for placing the toolbox system 100 and is not limited to the ground. At the same time, it is to be noted that in the present application, it is also feasible that the toolbox system 100 is not provided with the moving device 20 so that when the storage box 31 stands still on the ground as shown in FIG. 1, three support points are at least included between the storage box 31 and the ground, where a plane where the three support points are located is also defined as a support plane. Unless otherwise specified, the two support planes are referred to as the same plane in the present application.

The handle device 10 is disposed at a rear side of the storage box 31 and includes a guide rail 12 for guiding the pull rod 11 to move and a locking assembly 13 for locking and releasing the pull rod 11. The guide rail 12 is fixedly connected to the storage box 31, and the locking assembly 13 is connected to the guide rail 12.

Referring to FIGS. 7 to 14, the pull rod 11 has an active state 111, a locked state 112, and a separated state 113 with respect to the storage box 31. When the pull rod 11 is in the active state 111, the pull rod 11 can be driven to move relative to the guide rail 12. For example, when the pull rod 11 is in the active state 111, the user may drive the pull rod 11 to move and reciprocate along an extension direction of the guide rail 12. When the pull rod 11 is in the locked state 112, the pull rod 11 moves, and the guide rail 12 moves together with the pull rod 11, that is, when the pull rod 11 moves, the storage box 31 can move together with the pull rod 11. For example, when the pull rod 11 is in the locked state 112, the locking assembly 13 locks at least part of the pull rod 11 to the guide rail 12 so that the pull rod 11 remains basically fixed relative to the guide rail 12 along the extension direction of the guide rail 12, and when the user pulls the pull rod 11 to move, the storage box 31 can move together with the pull rod 11. It is to be noted that the pull rod 11 at least partially remains basically fixed relative to the guide rail 12 along the extension direction of the guide rail 12, which only limits that a locking portion 134 in the pull rod 11 remains fixed relative to the guide rail 12 along the extension direction of the guide rail 12, and the movement of the pull rod 11 in other directions is not limited. When the pull rod 11 is in the separated state 113, the pull rod 11 is separated from the guide rail 12, that is, the pull rod 11 can be separated from the guide rail 12 into a separately disposed component. In some other examples, the pull rod 11 has the active state 111 and the locked state 112 and does not have the separated state 113, that is, the pull rod 11 is always at least partially in contact with the guide rail 12. In this example, the pull rod 11 has the separated state 113. In the present application, the extension direction of the guide rail 12 is basically consistent with an up and down direction, and along a left and right direction, the guide rail 12 includes a first rail 121 and a second rail 122, which are basically symmetrical about a bisecting plane A.

The pull rod 11 includes a pair of connecting rods opposite to each other, such as a first connecting rod 114 and a second connecting rod 115, a grip rod 116 for connecting the pair of connecting rods, and a separation assembly 14 at a lower end of each connecting rod. The two connecting rods are basically spaced apart from each other in parallel, and upper ends of the connecting rods are connected to the grip rod 116. The grip rod 116 is at least partially covered by a sleeve to improve the grip of a handle. The sleeve may, for example, be made of rubber, wood, plastic, or any other material that improves the grip.

A rear side of the housing 32 of the storage box 31 protrudes backward to form two hollow portions, which are separately a first hollow portion 321 and a second hollow portion 322, where the two hollow portions penetrate up and down along the up and down direction, and the guide rail 12 is fixedly disposed in the hollow portions. The first rail 121 and the second rail 122 of the guide rail 12 are used for guiding the first connecting rod 114 and the second connecting rod 115, respectively and are fixedly disposed in the first hollow portion 321 and the second hollow portion 322, respectively. An upper through hole and a lower through hole through which the connecting rod may penetrate are formed at an upper end and a lower end of the rail, and the connecting rod may penetrate through the rail, that is, it is to be understood that a lower end of the pull rod 11 may penetrate through the lower through hole of the rail. In some other examples, the lower end of the pull rod 11 may not penetrate through the lower through hole of the rail.

A connecting bracket 15 is connected between the first rail 121 and the second rail 122, and the connecting bracket 15 is fixedly connected to the first rail 121 and the second rail 122. The locking assembly 13 can be driven by the user, the locking assembly 13 is at least partially disposed in the connecting bracket 15, and the locking assembly 13 is used for fixing the first connecting rod 114 and the second connecting rod 115 opposite to each other and keeping the first connecting rod 114 and the second connecting rod 115 in the locked state 112. In this example, the locking assembly 13 is symmetrical about the bisecting plane A, and the locking assembly 13 includes at least a first transmission member 131, a second transmission member 132, a third transmission member 133, the locking portion 134, and a biasing member 135. The first transmission member 131 can be driven by the user to reciprocate along a first linear direction 101. The second transmission member 132 can be driven by the first transmission member 131 to rotate about a second linear direction 102. The third transmission member 133 can be driven by the second transmission member 132 to move along a third linear direction 103. The locking portion 134 is fixedly disposed in the first connecting rod 114, or the locking portion 134 is formed by the first connecting rod 114. When the locking portion 134 is in contact with the third transmission member 133, the pull rod 11 is in the locked state 112. When the locking portion 134 is separated from the third transmission member 133, the pull rod 11 is in the active state 111. The biasing member 135 is in contact with the third transmission member 133, and the biasing member 135 can provide the third transmission member 133 with a driving force for the third transmission member 133 to move toward the first connecting rod 114. For example, the first transmission member 131 includes a contact portion 1311 and a transmission portion 1312. The contact portion 1311 is at least partially disposed outside the connecting bracket 15 and can be in contact with the user. The transmission portion 1312 is fixedly connected to or integrally formed with the contact portion 1311, that is, the transmission portion 1312 moves synchronously with the contact portion 1311. The transmission portion 1312 is at least partially in contact with the second transmission member 132. The user may press the contact portion 1311 to move the transmission portion 1312 downward along the first linear direction 101 so that the transmission portion 1312 drives the second transmission member 132 to rotate about the second linear direction 102. Further, the transmission portion 1312 is elongated and serrated, the second transmission member 132 is a gear, and the transmission portion 1312 is always in mesh with the second transmission member 132. The third transmission member 133 penetrates through the transmission portion 1312 of the first transmission member 131, that is, the transmission portion 1312 has a through hole through which the third transmission member 133 may penetrate. The third transmission member 133 includes an abutting portion 1331, a driving portion 1332, and a limiting end. The abutting portion 1331, the driving portion 1332, and the limiting end are fixedly connected or integrally formed. The second transmission member 132 is always in mesh with the driving portion 1332, that is, the driving portion 1332 can be driven by the second transmission member 132. When the second transmission member 132 is driven to rotate about the second linear direction 102, the driving portion 1332 is driven to move along the third linear direction 103 in a direction away from the first connecting rod 114, that is, the limiting end is separated from the locking portion 134. At this time, the first connecting rod 114 can freely move in the first rail 121. An end of the biasing member 135 abuts against the abutting portion 1331. When the driving portion 1332 moves in the direction away from the first connecting rod 114, the biasing member 135 is deformed. When the user releases the first transmission member 131, the biasing member 135 can provide the abutting portion 1331 with a driving force so that the limiting end moves in a direction toward the first connecting rod 114. When the biasing member 135 is mounted, a preload force is applied to the biasing member 135 so that when the biasing member 135 abuts against the third transmission member 133, the driving force in the direction toward the first connecting rod 114 can be applied to the third transmission member 133. The biasing member 135 may be a spring.

In fact, the locking portion 134 is a locking hole formed on the first connecting rod 114, and at least two locking holes through which the limiting end may at least penetrate are formed on the first connecting rod 114 along the extension direction of the first connecting rod 114. For ease of description, the two locking holes are defined as a first locking hole 1341 and a second locking hole 1342 herein, where along the extension direction of the first connecting rod 114, the first locking hole 1341 is disposed on an upper side of the second locking hole 1342. When the limiting end penetrates through the locking hole, the pull rod 11 is in the locked state 112. When the limiting end is in contact with the first locking hole 1341, the first connecting rod 114 is mostly retracted into the first rail 121, that is, the pull rod 11 is at a first locked position 1343. When the limiting end is in contact with the second locking hole 1342, the first connecting rod 114 mostly extends out of the first rail 121, that is, the pull rod 11 is at a second locked position 1344. When the toolbox system 100 is stored, the pull rod 11 may be at the first locked position 1343 for convenience of storage. When the user needs to move the toolbox system 100, the pull rod 11 may be at the second locked position 1344, and the user may pull the pull rod 11 to move the toolbox system 100. In some other examples, one or more intermediate locking holes may be provided between the first locking hole 1341 and the second locking hole 1342 and used for adjusting a height of the pull rod 11, which may be easily adjusted by the user according to requirements.

Since the locking assembly 13 is symmetrical about the bisecting plane A, that is to say, the locking assembly 13 has the same structure at the second connecting rod 115, that is, the structures and principles on two sides of the locking assembly 13 are basically the same. The details are not repeated here.

As shown in FIGS. 13 to 19, separation assemblies 14 are disposed at lower ends of the first connecting rod 114 and the second connecting rod 115, which are a first separation assembly 141 and a second separation assembly 142. Since the first connecting rod 114 and the second connecting rod 115 are symmetrical about the bisecting plane A, the first separation assembly 141 and the second separation assembly 142 are also symmetrical about the bisecting plane A. To avoid the redundant description, only the specific structure and principle of the first separation assembly 141 are described herein, and the specific structure and principle of the second separation assembly 142 are basically the same as those of the first separation assembly 141.

The first separation assembly 141 is connected to the first connecting rod 114, and the first separation assembly 141 includes a first operating member 1412. The first operating member 1412 can move along a direction perpendicular to or intersecting with the extension direction of the first connecting rod 114. The first operating member 1412 includes at least a linkage position 144 and a separated position 145 during movement. When the first operating member 1412 is at the linkage position 144, the first connecting rod 114 cannot be separated from the first rail 121. When the first operating member 1412 is at the separated position 145, the first connecting rod 114 may be separated from the first rail 121 so that the pull rod 11 may be placed alone. When the pull rod 11 is at the first locked position 1343, a ratio of a distance µl between the upper cover 33 of the storage box 31 and the support plane P along the up and down direction to a distance D2 between the pull rod 11 and the support plane P is less than 1, that is to say, a height of the storage box 31 is generally lower than a position of the pull rod 11. In this case, when the user stores the storage box 31, more space is bound to be required to enable the toolbox system 100 to be safely stored, which is inconvenient for the user to manage and store the toolbox system 100, resulting in the waste of space. It is to be noted that the linkage position 144 and the separated position 145 do not specifically refer to particular positions, but rather to positions in which the functions are implemented.

The first separation assembly 141 includes a support member 1411, the first operating member 1412, and a limiting member 1413. The support member 1411 is at least partially disposed on the first connecting rod 114, fixedly disposed in the first connecting rod 114, and is movable with the first connecting rod 114. The first operating member 1412 is at least partially disposed in the support member 1411, the first operating member 1412 can reciprocate with the first connecting rod 114 along the extension direction of the first connecting rod 114, the first operating member 1412 can move relative to the first connecting rod 114 along the direction intersecting with or perpendicular to the extension direction of the first connecting rod 114, and the user can drive the first operating member 1412 so that the first operating member 1412 switches between the linkage position 144 and the separated position 145. The limiting member 1413 is limited by the first rail 121 and the connecting bracket 15 so that the limiting member 1413 is at least partially fixed in the first rail 121, and the limiting member 1413 can mate with the first operating member 1412 so that the first operating member 1412 switches between the linkage position 144 and the separated position 145.

For example, the support member 1411 includes at least a first accommodation groove 1414 capable of being clamped with the limiting end and a second accommodation groove 1415 for allowing the first operating member 1412 to move. The first accommodation groove 1414 is disposed on an upper side of the second accommodation groove 1415 along the up and down direction, that is to say, when the pull rod 11 is at the first locked position 1343, through the preceding arrangement, the user can be easily in contact with the first operating member 1412 so that the first operating member 1412 switches between the linkage position 144 and the separated position 145. In this example, the support member 1411 is made of a flexible material.

Figure 21:
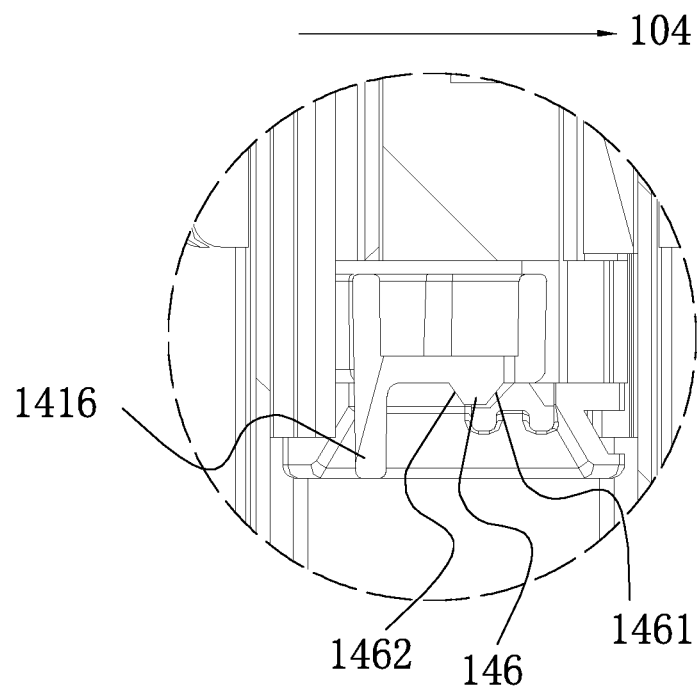
FIG. 21 is a partial enlarged view of the sectional view shown in FIG. 11.
Figure 22:
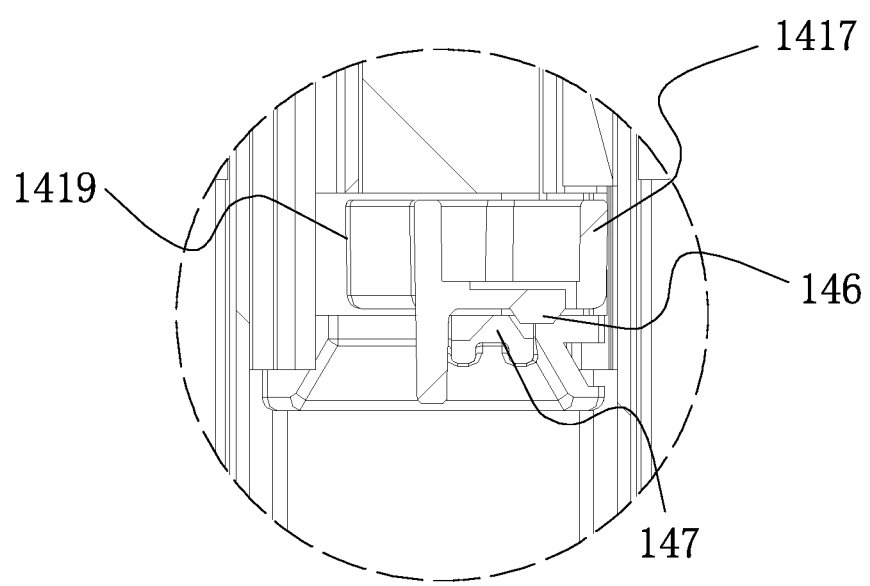
FIG. 22 is a partial enlarged view of the sectional view shown in FIG. 12.

Referring to FIGS. 21 and 22, the first operating member 1412 includes a grip 1416, a first stopper portion 1417, a second stopper portion 1418, a third stopper portion 1419, and a switching portion 146 that are fixedly connected or integrally formed. In this example, the grip 1416, the first stopper portion 1417, the second stopper portion 1418, the third stopper portion 1419, and the switching portion 146 are integrally formed. The grip 1416 can be driven by the user. The switching portion 146 is used for mating with the support member 1411 so as to achieve position switching. The first stopper portion 1417 can mate with the limiting member 1413. The second stopper portion 1418 can mate with the support member 1411. The user pushes the grip 1416 forward along a first direction 104, and the switching portion 146 is forced to move forward along the first direction 104 against a stopping force provided by the support member 1411 until the second stopper portion 1418 abuts against the support member 1411. At this time, the first stopper portion 1417 of the first operating member 1412 at least partially extends out of the support member 1411, and the first operating member 1412 extending out of the support member 1411 can abut against the limiting member 1413 so that the first connecting rod 114 cannot be separated from the first rail 121 when moving along the extension direction of the first connecting rod 114.

When the user separates the pull rod 11 from the toolbox system 100 as required, the user only needs to pull the grip 1416 backward along the first direction 104, and the switching portion 146 is forced to move backward along the first direction 104 against the stopping force provided by the support member 1411 until the third stopper portion 1419 abuts against the first connecting rod 114. The first stopper portion 1417 is basically fully retracted within the support member 1411. At this time, the user pulls the pull rod 11 along the extension direction of the first connecting rod 114, and the pull rod 11 can be separated from the first rail 121.

A shift portion 147 is provided on the support member 1411 and used for mating with the first operating member 1412 so that the first operating member 1412 switches between the linkage position 144 and the separated position 145. The shift portion 147 is fixedly connected to or integrally formed with the support member 1411. In this example, the shift portion 147 is integrally formed with the support member 1411. Along a front and rear direction, a section of the shift portion 147 has a trapezoidal shape, that is, the shift portion 147 has a first inclined surface and a second inclined surface, where an extension direction of the first inclined surface obliquely intersects with an extension direction of the second inclined surface, and the first inclined surface is disposed on a front side of the second inclined surface. To mate with the shift portion 147 of the support member 1411, the switching portion 146 of the first operating member 1412 has the corresponding first mating surface 1461 and second mating surface 1462, where the first mating surface 1461 is disposed on a front side of the second mating surface 1462, and along the front and rear direction, the section of the shift portion 147 has the trapezoidal shape. When the user switches the first operating member 1412 from the separated position 145 to the linkage position 144, the switching portion 146 is forced so that the first mating surface 1461 of the switching portion 146 moves forward against resistance of the second inclined surface of the shift portion 147 until the second stopper portion 1418 abuts against the support member 1411. To prevent the first operating member 1412 from being retracted during the movement of the pull rod 11, the first inclined surface of the shift portion 147 is disposed on a path along which the first operating member 1412 is retracted, and the first inclined surface is used for abutting against the second mating surface 1462. In the case where the first operating member 1412 is not driven by an external force, the first operating member 1412 is prevented from moving backward along the first direction 104 so that the first stopper portion 1417 always extends out of the support member 1411. That is, when the first operating member 1412 is at the linkage position 144, the first mating surface 1461 and the second mating surface 1462 of the switching portion 146 are both disposed on a front side of the first inclined surface of the shift portion 147. When the user switches the first operating member 1412 from the linkage position 144 to the separated position 145, the switching portion 146 is forced so that the second mating surface 1462 of the switching portion 146 moves backward against resistance of the first inclined surface of the shift portion 147 until the third stopper portion 1419 abuts against the first connecting rod 114. Similarly, to prevent the first operating member 1412 from extending out during the movement of the pull rod 11, the second inclined surface of the shift portion 147 is disposed on a path along which the first operating member 1412 extends out of the support member 1411, and the second inclined surface is used for abutting against the first mating surface 1461. In the case where the first operating member 1412 is not driven by an external force, the first operating member 1412 is prevented from moving forward along the first direction 104 so that the first stopper portion 1417 is always retracted within the support member 1411. That is, when the first operating member 1412 is at the separated position 145, the first mating surface 1461 and the second mating surface 1462 of the switching portion 146 are both disposed on a rear side of the second inclined surface of the shift portion 147.

The first operating member 1412 is disposed on a lower side of the second locking hole 1342, that is to say, along the extension direction of the first connecting rod 114, the first operating member 1412, the second locking hole 1342, and the first locking hole 1341 are arranged in sequence. When the first operating member 1412 is at the separated position 145 and the user pulls the pull rod 11 upward along the extension direction of the first connecting rod 114, the pull rod 11 goes through the first locked position 1343, the active state 111, the second locked position 1344, and the separated state 113 in sequence. When the toolbox system 100 stands still, the pull rod 11 is generally at the first locked position 1343. When the user needs to drag the toolbox system 100, the user toggles the separation assembly 14 to the linkage position 144 and then drives the first transmission member 131 of the locking assembly 13 with one hand so that the limiting end exits from the first locking hole 1341, and the user releases the pull rod 11 and holds the grip rod 116 of the pull rod 11 with the other hand so that the pull rod 11 can freely move along the extension direction of the first connecting rod 114, which may be referred to as the pull rod 11 being in the active state 111. When the user holds and moves the pull rod 11 upward, the first transmission member 131 may be released until the limiting end penetrates through the second locking hole 1342 due to a driving force from the biasing member 135 so that the pull rod 11 is at the second locked position 1344. When the pull rod 11 is in the active state, the user may continually press the first transmission member 131. Since the biasing member 135 always has a driving force on the limiting end, the limiting end continually abuts against the first connecting rod 114 after the user releases the first transmission member 131. The user continually presses the first transmission member 131 so that the user can move the pull rod 11 upward in a more labor-saving manner.

When the toolbox system 100 needs to be stored or carried, the pull rod 11 needs to be separated from the toolbox system 100. After the user locates the pull rod 11 at the first locked position 1343, the user toggles the separation assembly 14 to the separated position 145 and then continually presses the first transmission member 131 of the locking assembly 13 with one hand so that the limiting ends exits from the first locking hole 1341, and the user releases the pull rod 11 and holds the grip rod 116 of the pull rod 11 with the other hand so that the pull rod 11 may freely move upward along the extension direction of the first connecting rod 114 until the pull rod 11 is in the separated state 113.

When the toolbox system 100 stands still as shown in FIG. 1, a distance D1 between the connecting bracket 15 and the support plane P along the up and down direction is greater than 0 mm and less than or equal to 550 mm. When the user works, the toolbox system 100 is carried from a tool storage place to a work site, the tool storage place is generally relatively far from the work site, and the user needs to transport the toolbox system 100 to the work site through a vehicle so that the user sets the pull rod 11 at the first locked position 1343 and then carries the toolbox system 100 onto the vehicle. Since some vehicles have a problem of height limitation, the toolbox system 100 cannot be placed directly in the vehicle. The distance D1 between the connecting bracket 15 and the support plane P is set to be within the preceding range through the preceding arrangement so that after the user pulls the pull rod 11 out of the toolbox system 100, the user can directly carry the toolbox system 100 into the vehicle, which is convenient for the user to transport the toolbox system 100.

The storage box 31 includes multiple sidewalls extending basically along the up and down direction and a bottom wall 327 and the upper cover 33 which are opposite to each other and basically close the multiple sidewalls, where the multiple sidewalls, the bottom wall 327, and the upper cover 33 surround the accommodation cavity 310. As shown in FIGS. 4, 5, 6, and 32, the housing 32 of the storage box 31 includes a front sidewall 323 and a rear sidewall 324 opposite to each other, a left sidewall 325 and a right sidewall 326 opposite to each other, the bottom wall 327 connected to the front sidewall 323, the rear sidewall 324, the left sidewall 325, and the right sidewall 326, and the upper cover 33 for closing the accommodation cavity 310 surrounded by the front sidewall 323, the rear sidewall 324, the left sidewall 325, and the right sidewall 326. In this example, the front sidewall 323, the rear sidewall 324, the left sidewall 325, and the right sidewall 326 basically extend along the up and down direction. An auxiliary handle device 20a further includes a connecting handle 23a, where the connecting handle 23a is fixedly connected to or integrally formed with the front sidewall 323. Along the up and down direction, a ratio of a distance H2 between the support plane P and the upper cover 33 of the storage box 31 to a distance H1 between the connecting handle 23a and the support plane P is greater than or equal to 5.5 and less than or equal to 35 so that the connecting handle 23a is disposed near a lower end of the storage box 31, and when the storage box 31 is at a high position, the user can directly pull the storage box 31 by pulling the connecting handle 23a. Further, the distance H1 between the connecting handle 23a and the support plane P is greater than or equal to 15 mm and less than or equal to 100 mm. It is to be noted that the distance H1 between the connecting handle 23a and the support plane P refers to a distance between an uppermost end of the connecting handle 23a along the up and down direction and the support plane P. In this example, the connecting handle 23a is a cylindrical metal structure, and two ends of the connecting handle 23a are fixedly connected to the front sidewall 323.

The rear sidewall 324 protrudes backward to form the first hollow portion 321 and the second hollow portion 322 spaced apart. A pedal 328 is provided between the first hollow portion 321 and the second hollow portion 322 and disposed near the lower through hole. The pedal 328 is fixedly connected to or integrally formed with the rear sidewall 324 at a certain downward inclination angle. In this example, the pedal 328 is integrally formed with the rear sidewall 324. In some working conditions where the user needs to go uphill and perform transportation, the user may lift a front end of the storage box 31 by stepping on the pedal 328, which is convenient for the user to perform transportation and go uphill.

Further, a hook 34 is provided between the first hollow portion 321 and the second hollow portion 322. Two ends of the hook 34 are fixed to the rear sidewall 324, and the hook 34 can rotate relative to the rear sidewall 324. For example, the hook 34 is made of a metal material. In this example, the hook 34 may mate with the connecting handle 23a on the front sidewall 323, that is, when the user places other items outside the storage box 31, to prevent the items from falling off during transportation, the user may tie and fix the items on the hook 34 and the connecting handle 23a with an elastic rope.

The front sidewall 323 and the right sidewall 326 are fixedly connected to form a first connecting section 35, the front sidewall 323 and the left sidewall 325 are fixedly connected to form a second connecting section 36, the left sidewall 325 and the rear sidewall 324 are fixedly connected to form a third connecting section 37, and the right sidewall 326 and the rear sidewall 324 are fixedly connected to form a fourth connecting section 38. It is also to be understood that the front sidewall 323 and the left sidewall 325 are fixedly connected through the first connecting section 35, the front sidewall 323 and the right sidewall 326 are fixedly connected through the second connecting section 36, the left sidewall 325 and the rear sidewall 324 are fixedly connected through the third connecting section 37, and the right sidewall 326 and the rear sidewall 324 are fixedly connected through the fourth connecting section 38. In this example, guard links 39 are semi-embedded into the first connecting section 35 and the second connecting section 36, and the moving device 20 is mounted on the rear side of the storage box 31 so that the guard links 39 cannot be semi-embedded into the third connecting section 37 and the fourth connecting section 38. In this manner, the structural strength of the storage box 31 on the two connecting sections can be enhanced. The guard links 39 on the first connecting section 35 and the second connecting section 36 are made of a material different from that of the sidewalls of the storage box 31. In the present application, the guard links 39 on the connecting sections are made of a metal material. As another example, the moving device is not mounted on the rear side of the storage box 31 so that the guard links 39 may be semi-embedded into the four connecting sections of the storage box 31.

Figure 3:
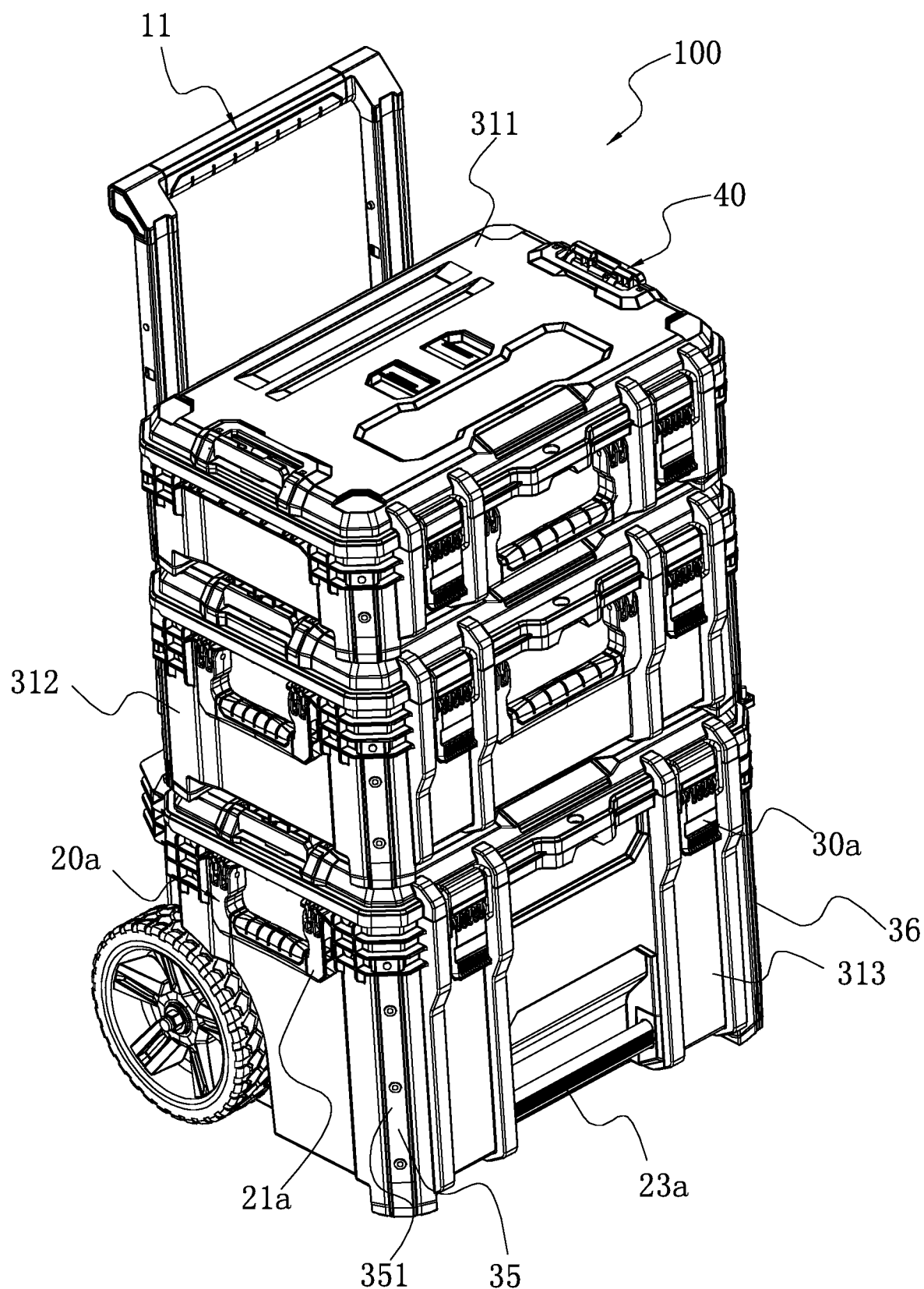
FIG. 3 is a schematic view of the toolbox system in FIG. 1 without an external hanger assembly mounted.
Figure 4:
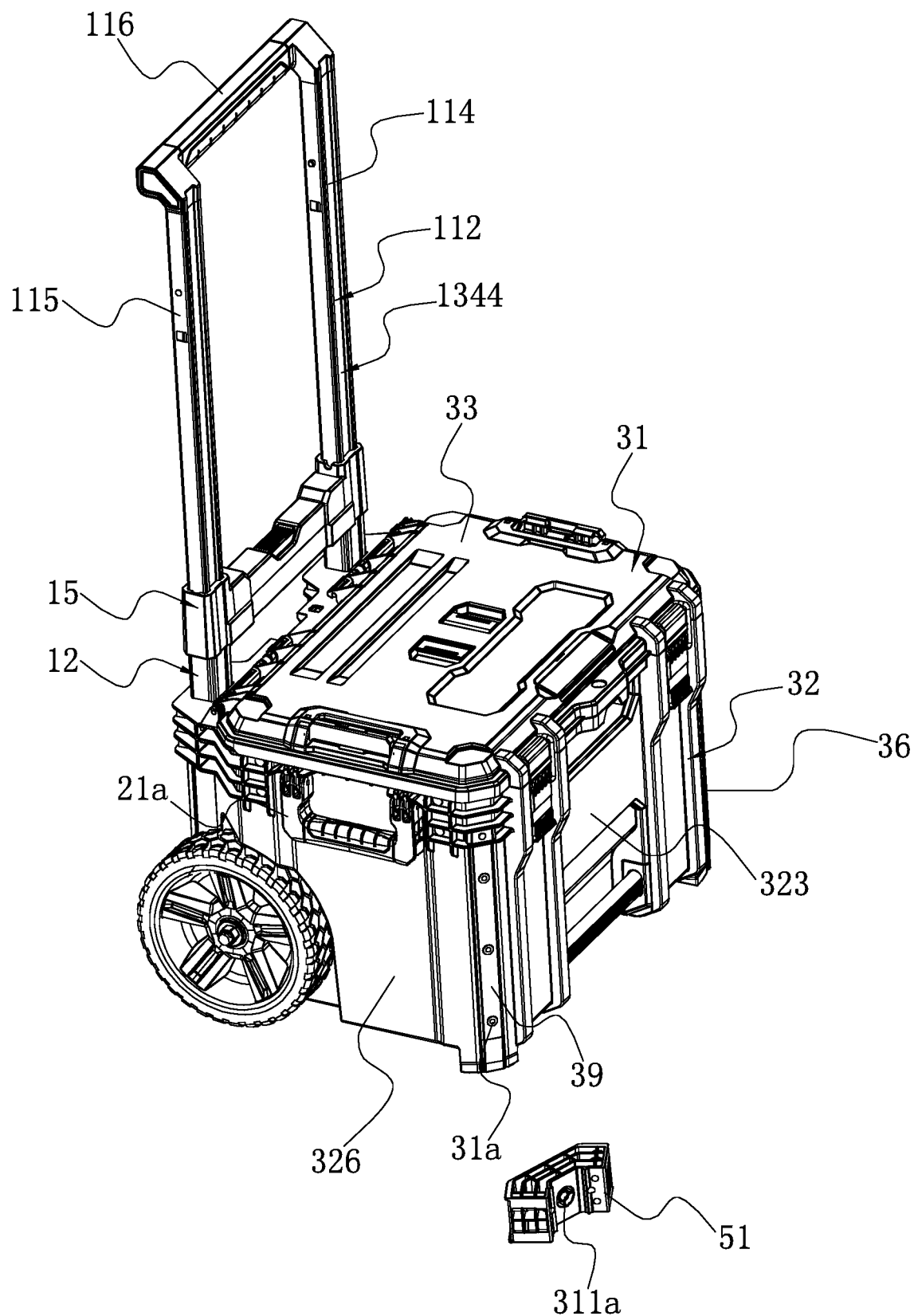
FIG. 4 is a perspective view of a storage box in the toolbox system shown in FIG. 3.
Figure 5:
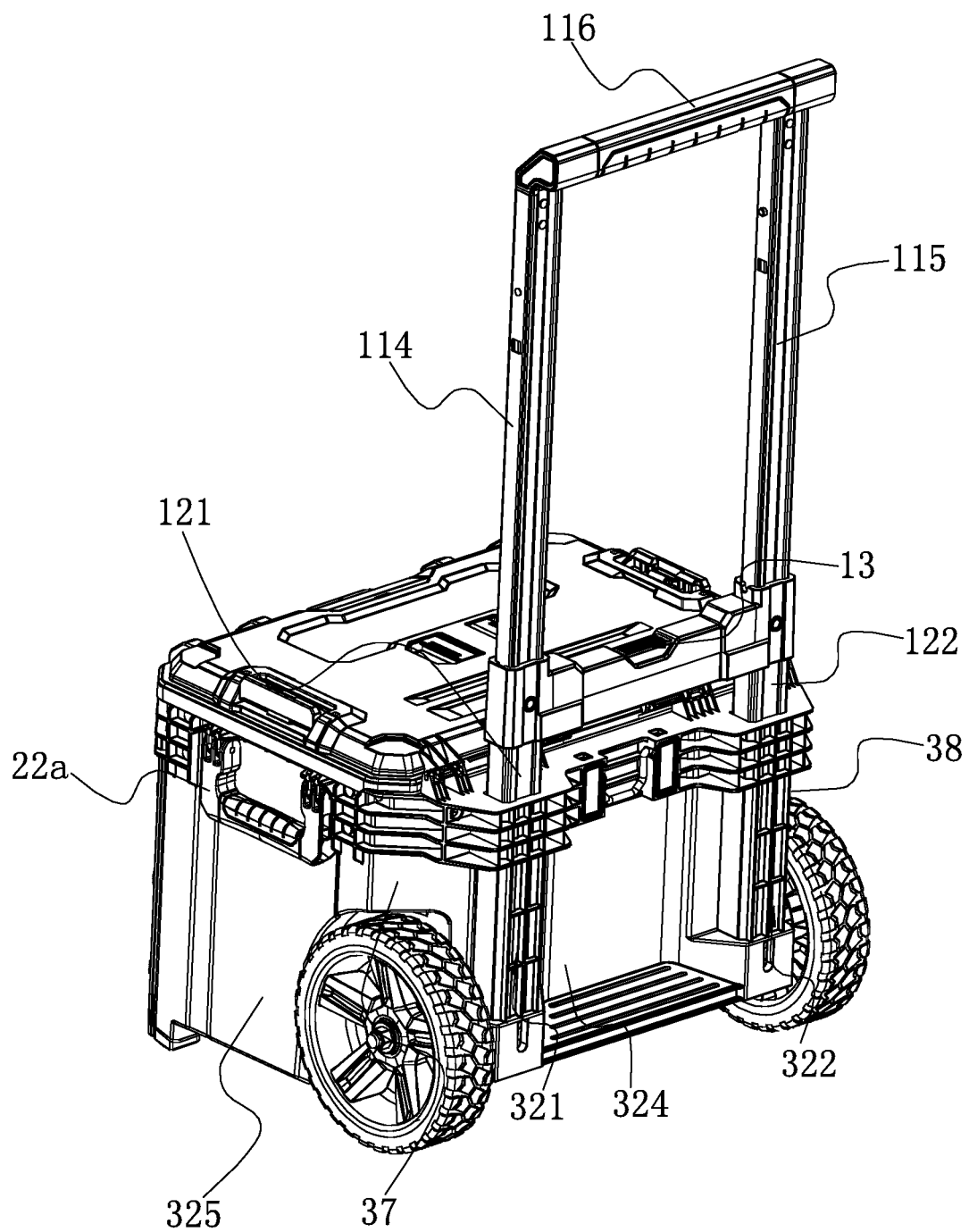
FIG. 5 is a perspective view of the storage box in the toolbox system shown in FIG. 4 with a pull rod in a locked state and at a second locked position.
Figure 6:
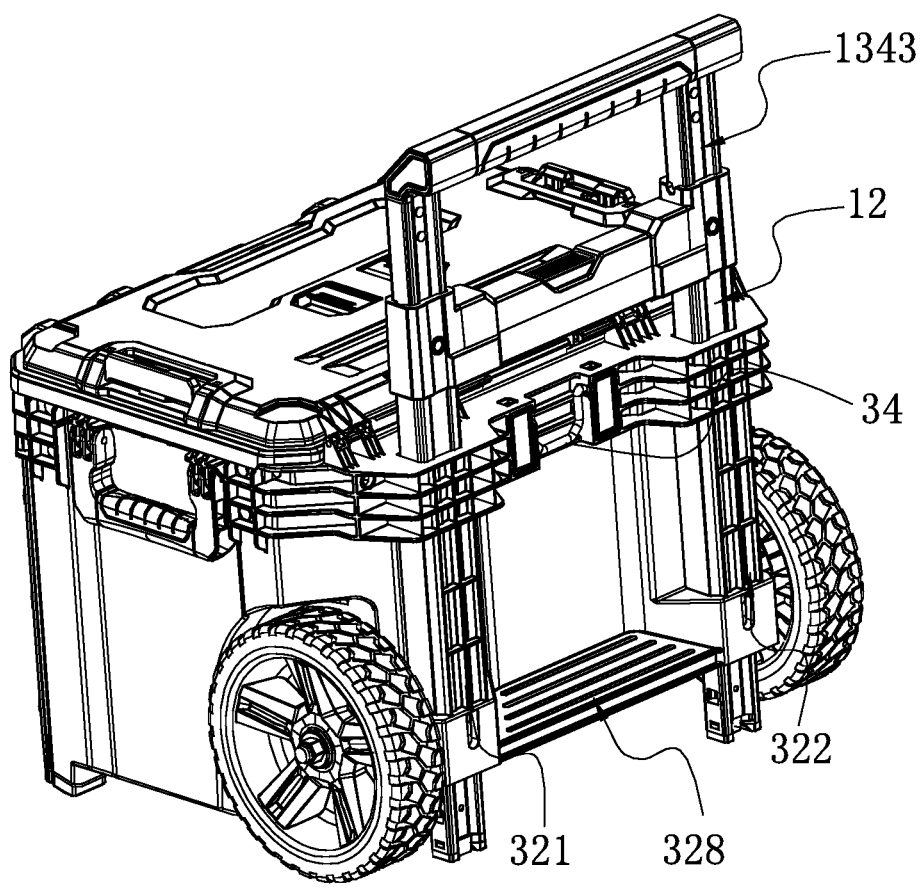
FIG. 6 is a perspective view of the storage box in the toolbox system shown in FIG. 4 with a pull rod in a locked state and at a first locked position.
Figure 7:
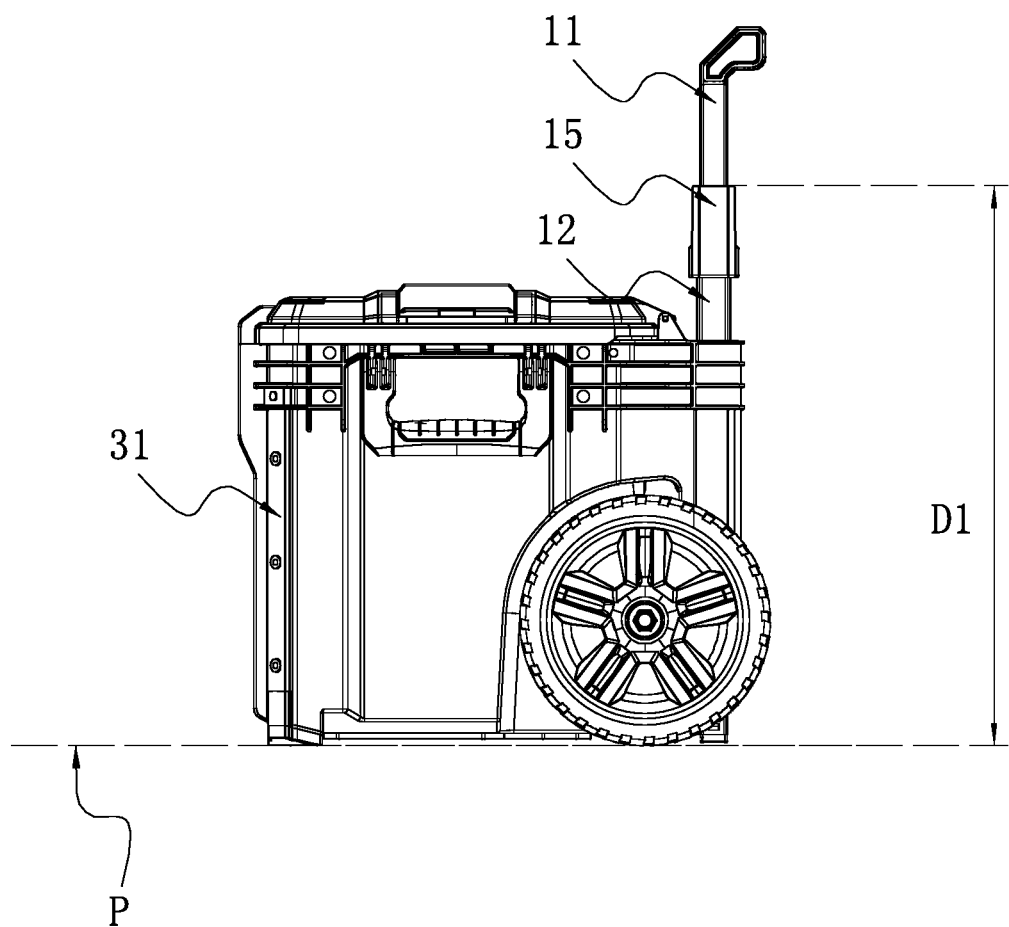
FIG. 7 is a left view of the storage box shown in FIG. 6.
Figure 8:
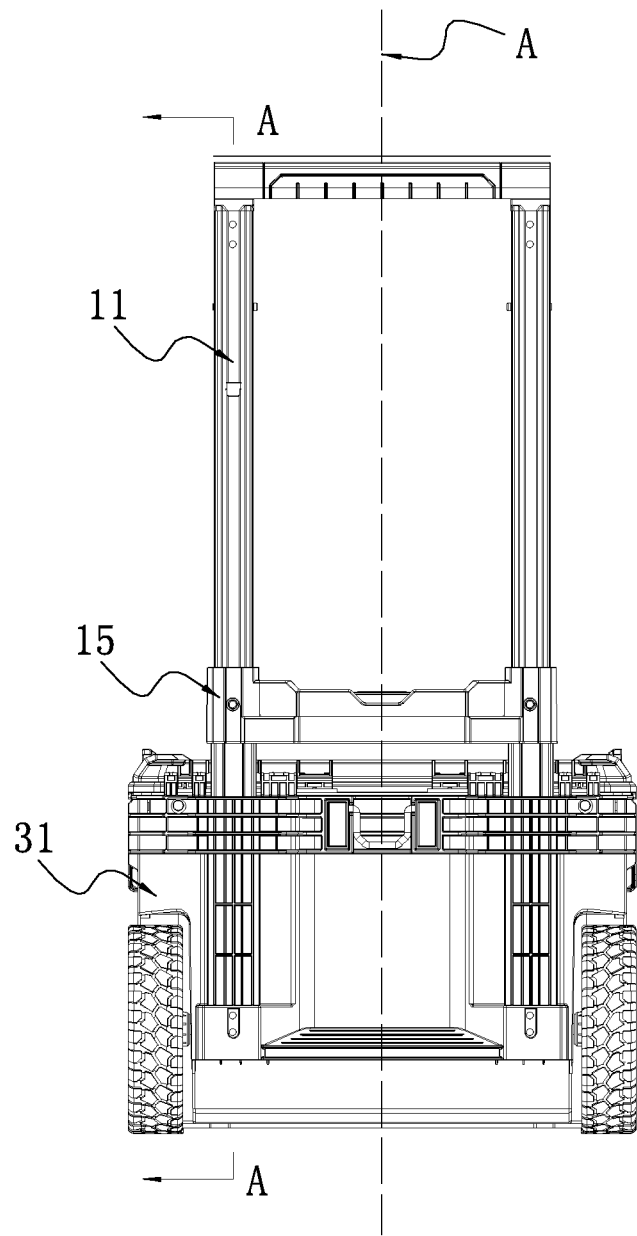
FIG. 8 is a rear view of the storage box shown in FIG. 5.
Figure 9:
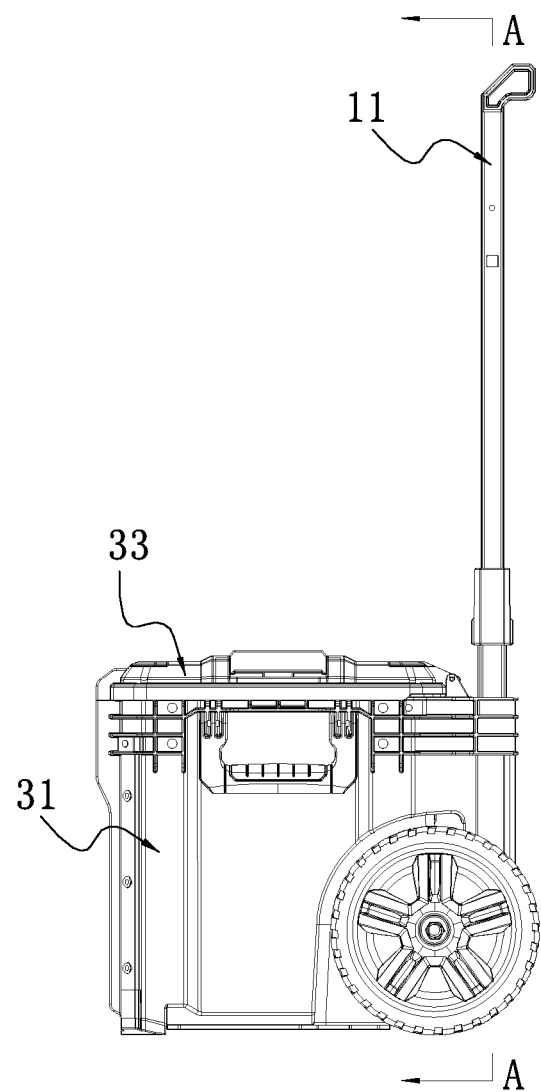
FIG. 9 is a left view of the storage box shown in FIG. 5.
Figure 10:
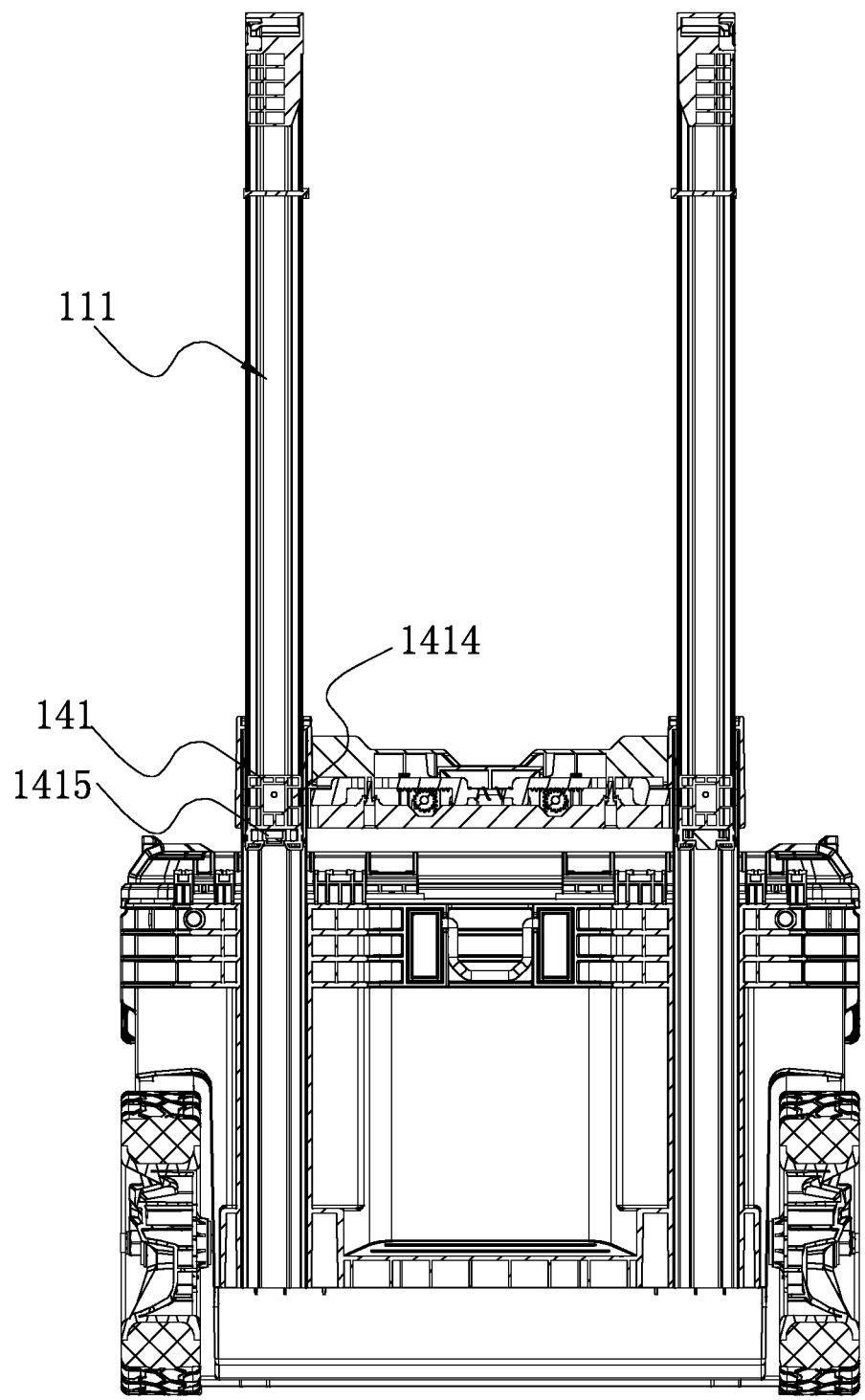
FIG. 10 is a sectional view of the storage box shown in FIG. 9 taken along an A-A direction.
Figure 11:
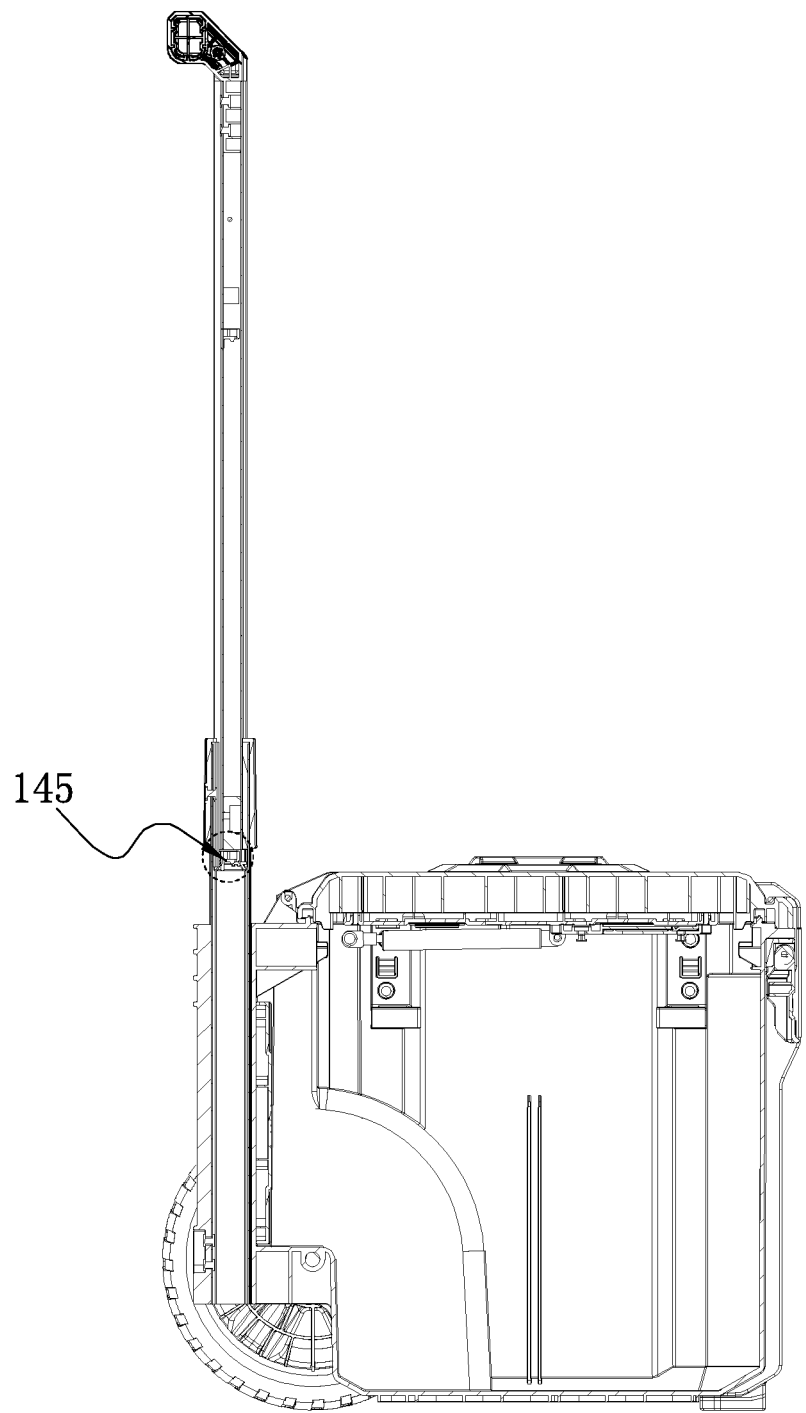
FIG. 11 is a sectional view of the storage box shown in FIG. 8 taken along an A-A direction with a pull rod at a separated position.
Figure 12:
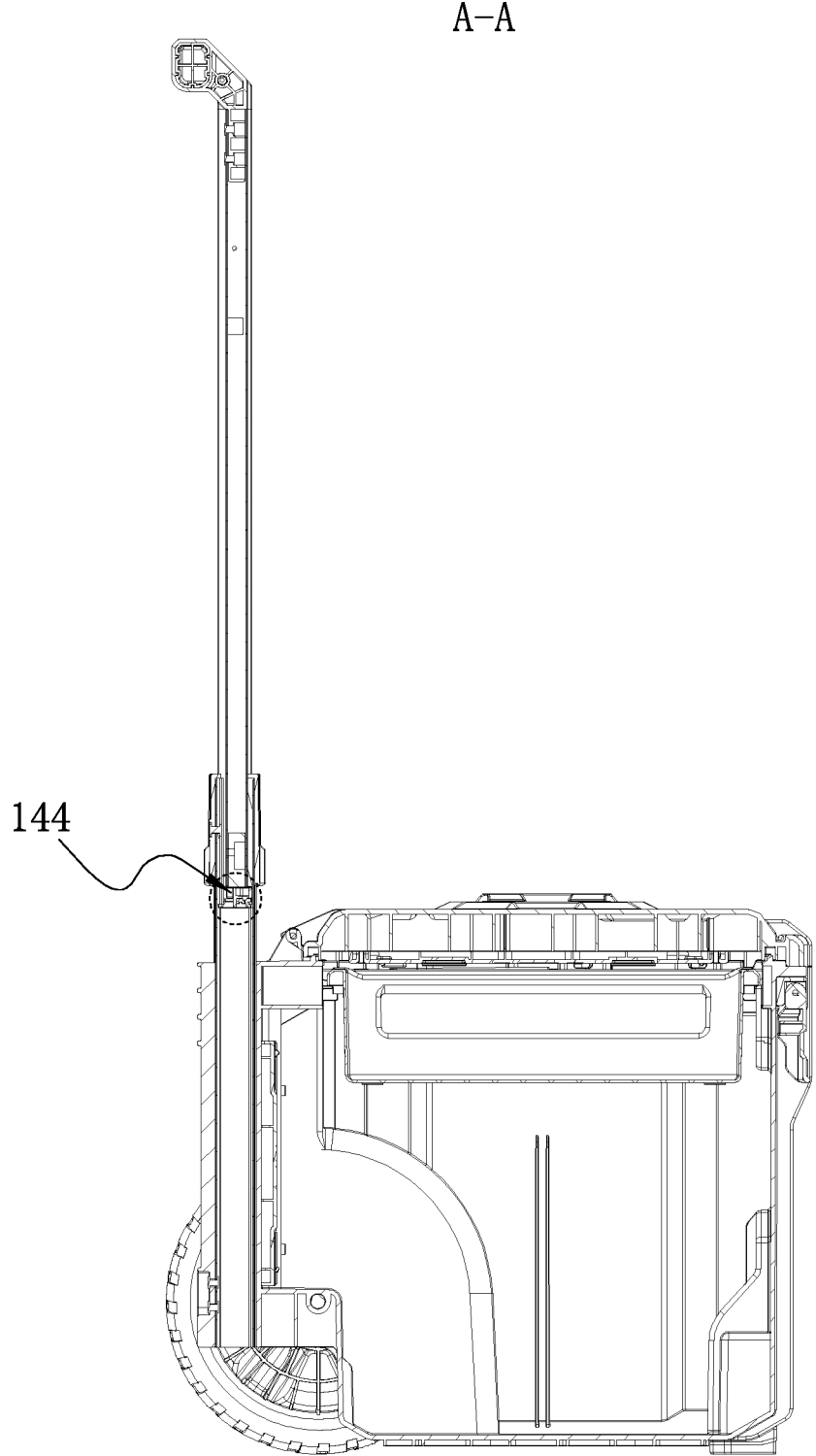
FIG. 12 is a sectional view of the storage box shown in FIG. 8 taken along an A-A direction with a pull rod at a linkage position.
Figure 13:
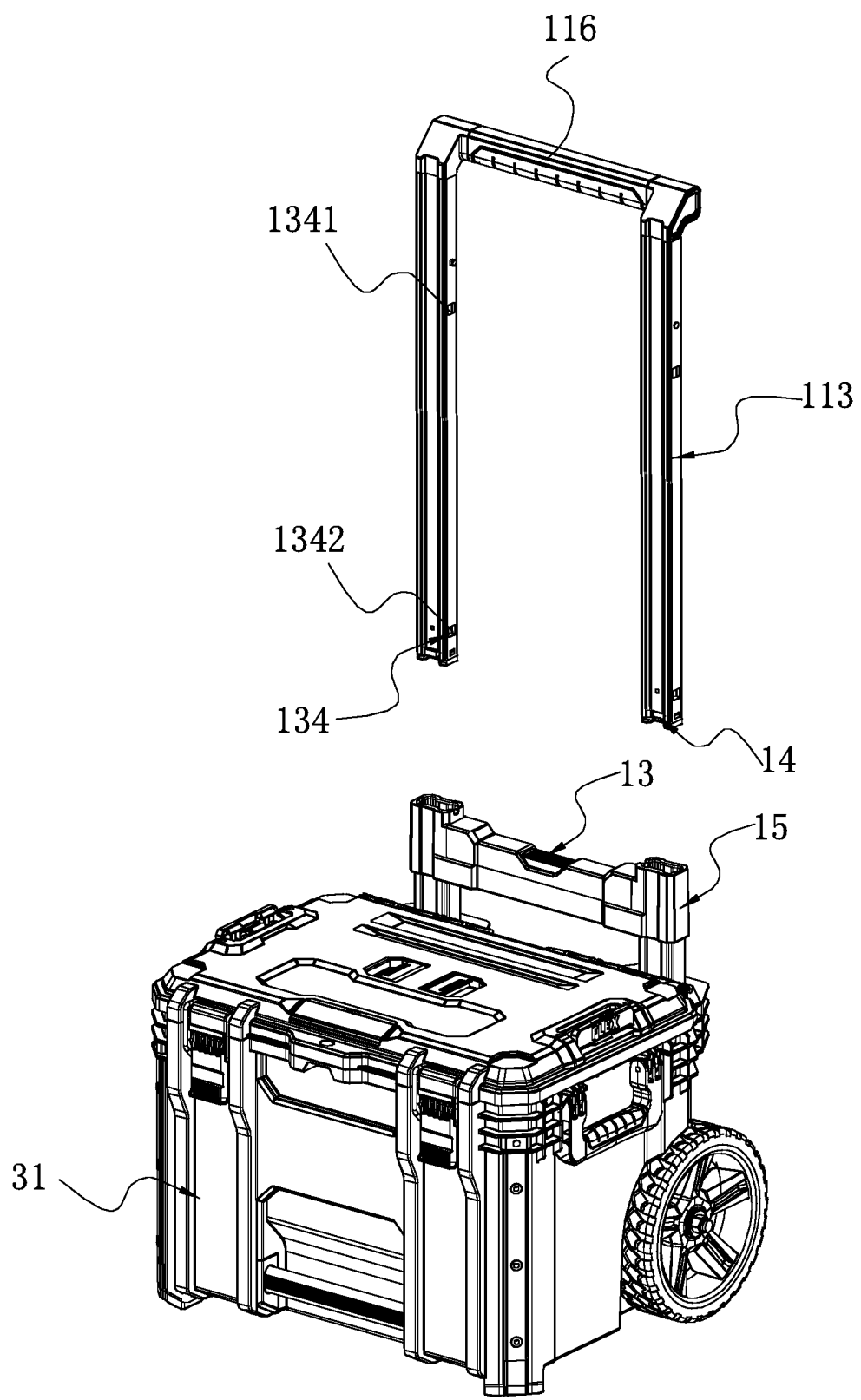
FIG. 13 is a perspective view of the storage box in the toolbox system shown in FIG. 4 with a pull rod in a separated state.
Figure 14:
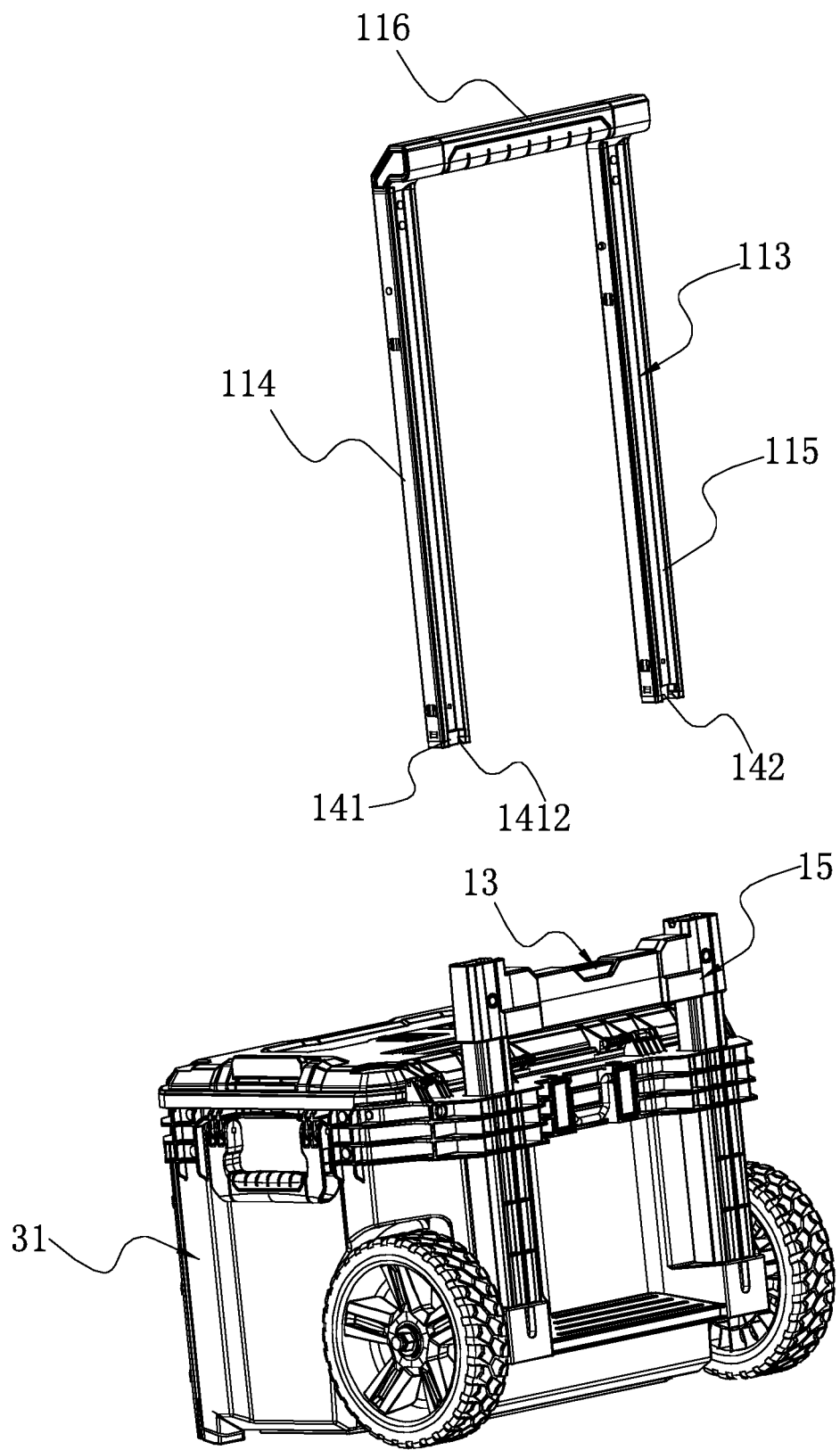
FIG. 14 is a perspective view of the storage box shown in FIG. 13 from another perspective.
Figure 15:
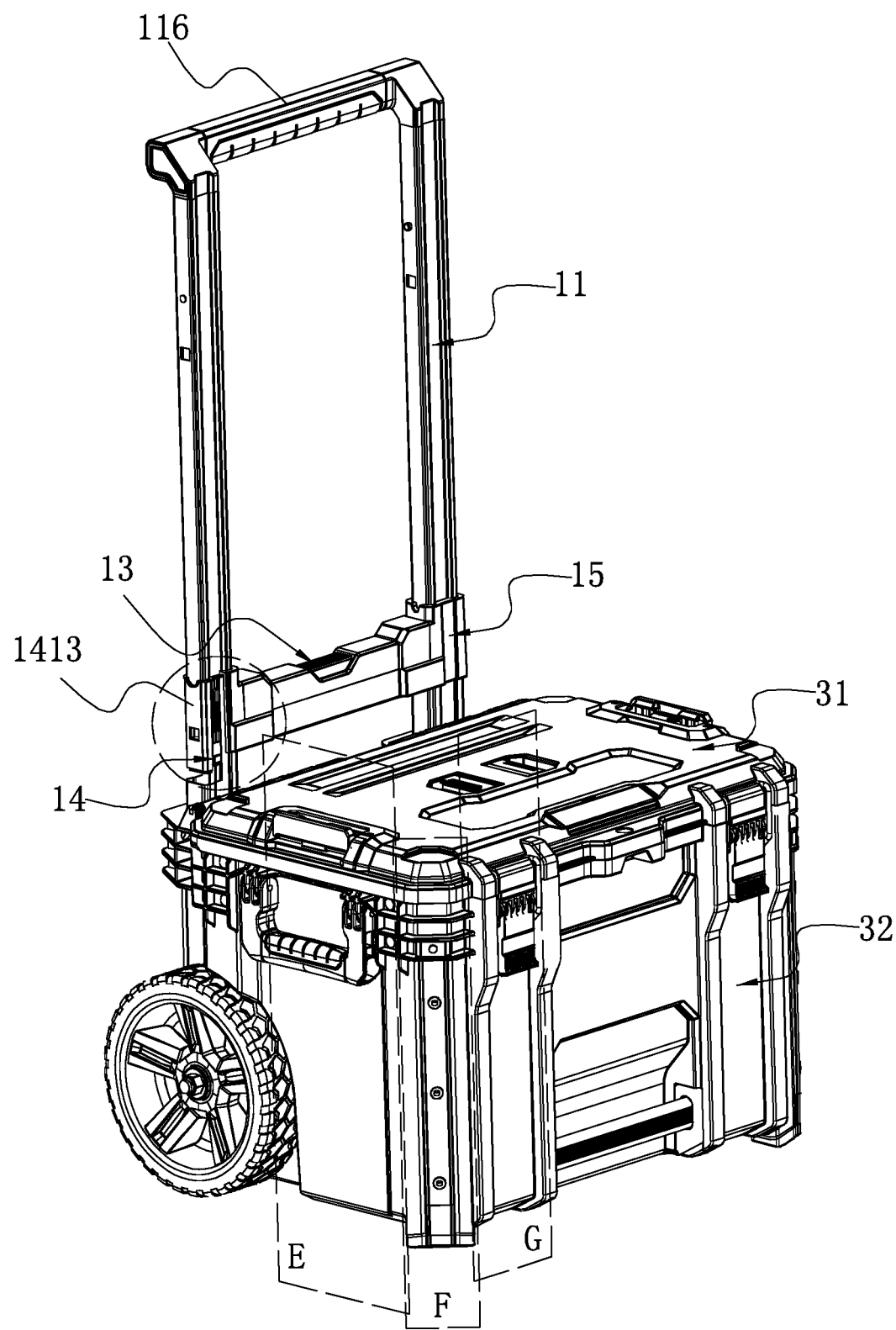
FIG. 15 is a view of a structure of the storage box shown in FIG. 5 with the pull rod at a linkage position.
Figure 16:
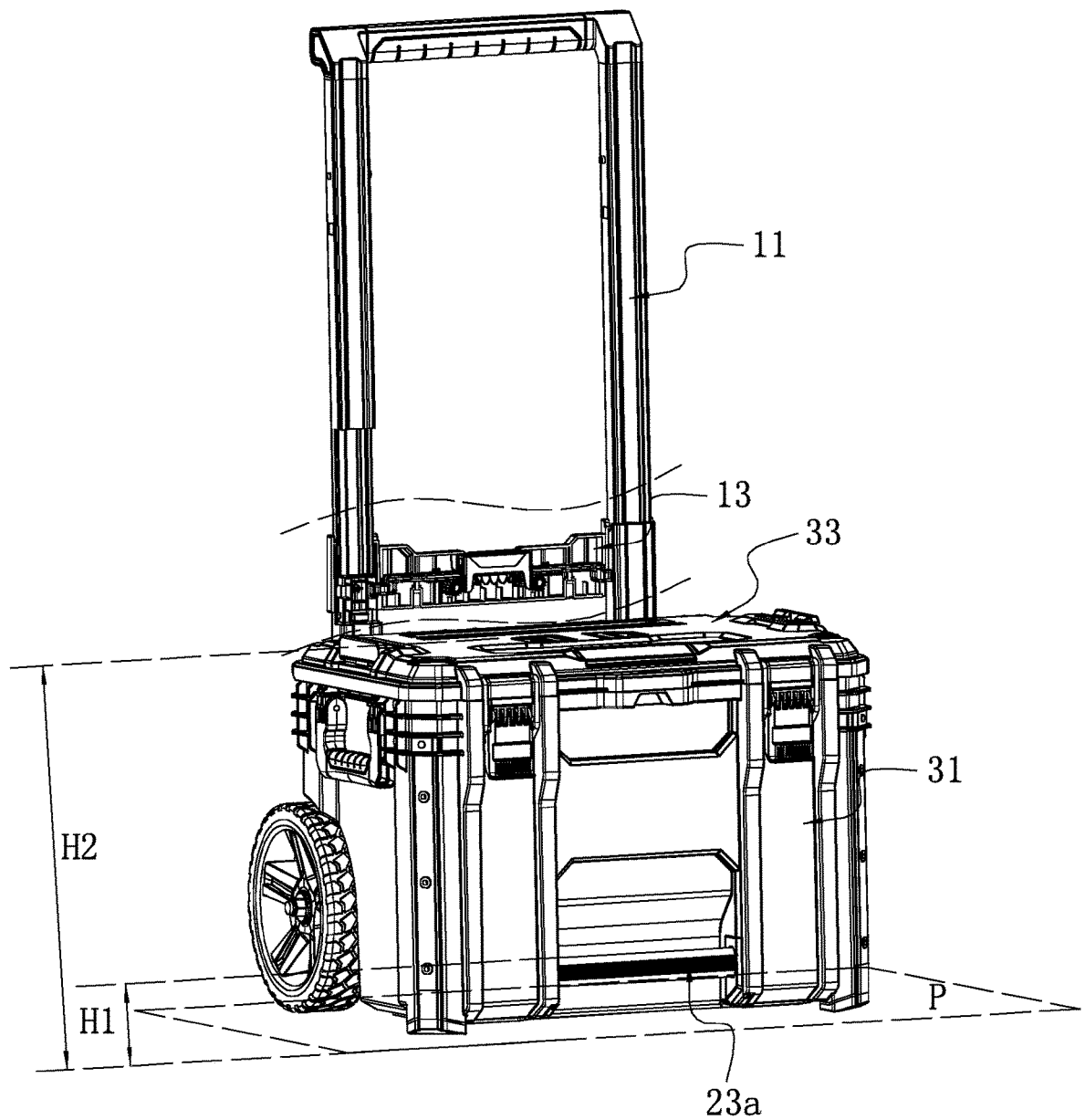
FIG. 16 is a perspective view of a structure of the storage box shown in FIG. 5 when a connecting bracket is opened.
Figure 17:
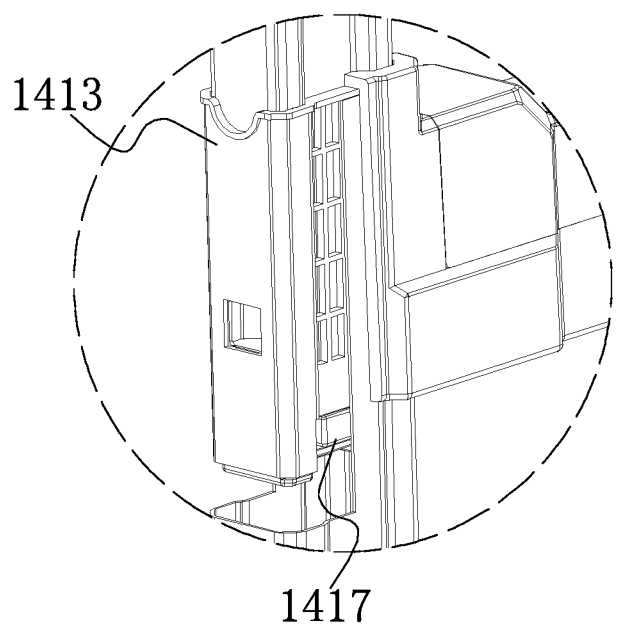
FIG. 17 is a partial enlarged view of the sectional view of part of the structure shown in FIG. 15.
Figure 18:
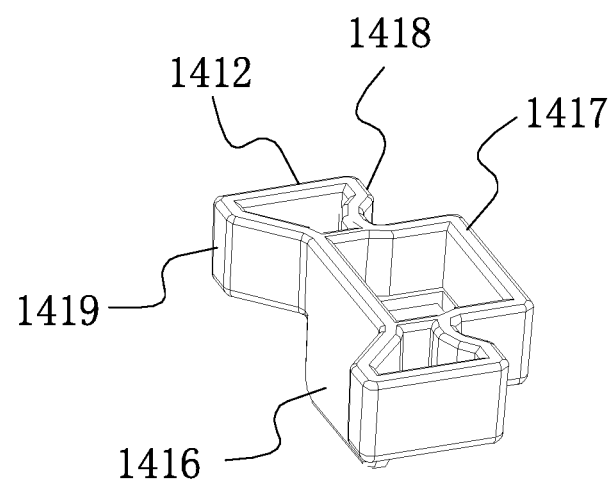
FIG. 18 is a perspective view of a first operating member in the storage box shown in FIG. 15.
Figure 19:
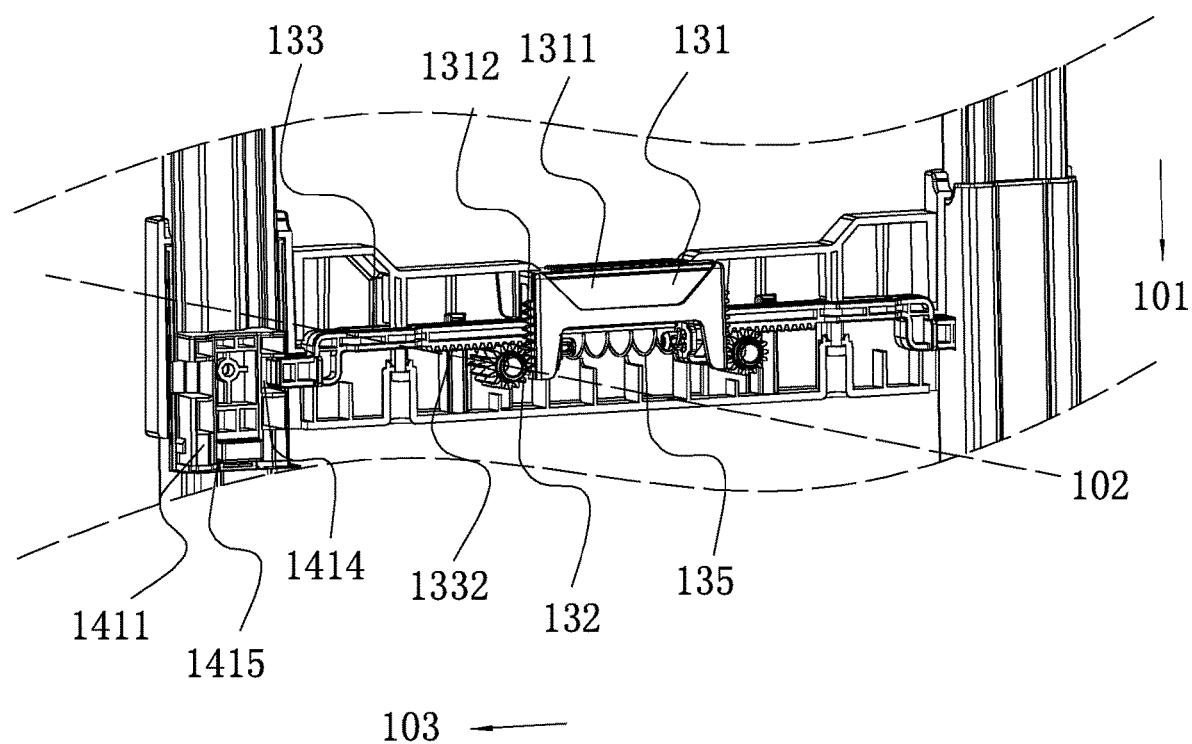
FIG. 19 is a partial enlarged view of the sectional view of part of the structure shown in FIG. 16.
Figure 20:
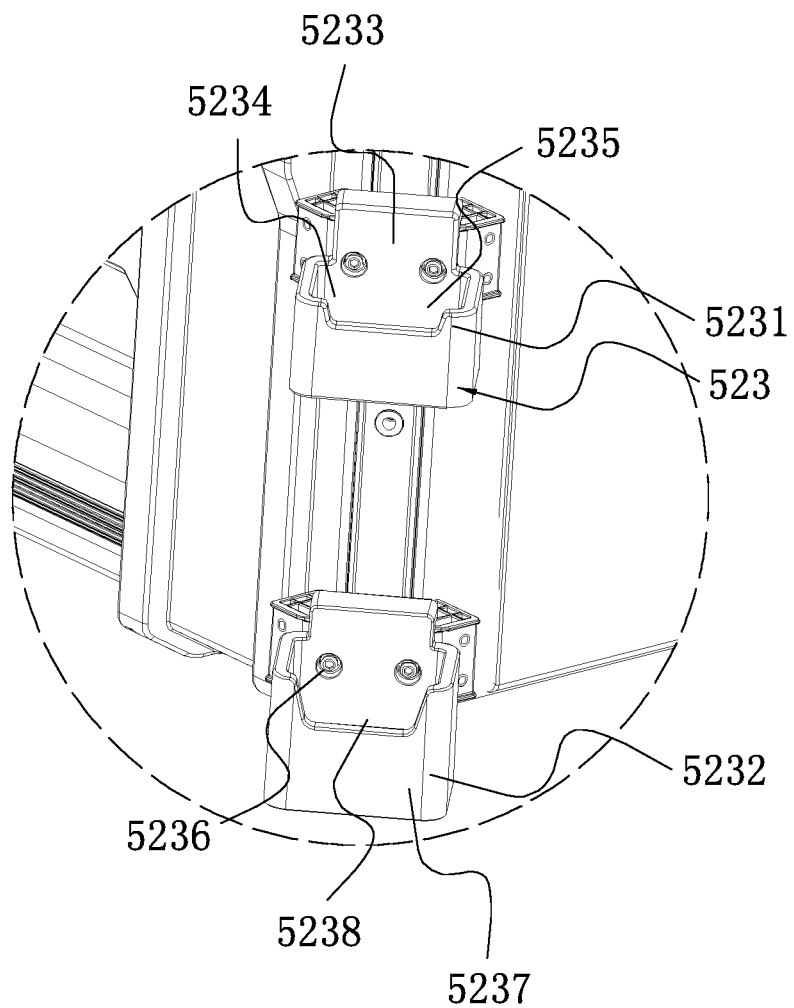
FIG. 20 is a partial enlarged view of the schematic view shown in FIG. 1.

As shown in FIG. 3, the toolbox system 100 may further include multiple storage boxes 31, where the storage boxes 31 may be interlocked with each other by the interlocking device 40. The user may stack two storage boxes 31, three storage boxes 31, four storage boxes 31, or even more storage boxes 31 as required. In the present application, three storage boxes 31 are mainly described as an example. To distinguish from the description of the storage box 31 described above, the three storage boxes 31 are defined here as a storage bin 311, a compartment box 312, and a deck box 313. Along the up and down direction, the compartment box 312 is disposed on an upper side of the deck box 313, and the storage bin 311 is disposed on an upper side of the compartment box 312. Left and right sidewalls 326 and front and rear sidewalls 324 of the compartment box 312 are connected to form the same four connecting sections and left and right sidewalls 326 and front and rear sidewalls 324 of the storage bin 311 are connected to form the same four connecting sections. Both the compartment box 312 and the storage bin 311 may be detached from the deck box 313 so as to form separate boxes. Since the moving device 20 is not mounted on the compartment box 312 and the storage bin 311, the guard links 39 may be semi-embedded into the third connecting sections 37 and the fourth connecting sections 38 of the compartment box 312 and the storage bin 311, that is, the guard links 39 are semi-embedded into all the four connecting sections of the compartment box 312 and all the four connecting sections of the storage bin 311, where all the guard links 39 are made of the metal material. It is to be specifically noted that the storage box 31 in the present application may refer to any box in the toolbox system 100 unless specifically described.

The toolbox system 100 further includes an external hanger assembly 50 disposed outside the accommodation cavity 310, where the external hanger assembly 50 is used for hanging tools and accessories, such as a power tool, a battery pack, a scale, and a cable, and the external hanger assembly 50 is detachably and fixedly connected to the storage box 31. The external hanger assembly 50 may be connected to the storage box 31 through one or more of a screw, a latch, a rivet, and a movable snap.

The housing of the storage box 31 is formed with a limiting portion 31*a* for mating with a mounting portion of the external hanger assembly 50. The limiting portion 31*a* includes a limiting surface and/or a limiting hole for mating with the mounting portion so as to fix an external hanger 52 to the storage box 31.

The external hanger assembly 50 includes an intermediate piece 51 and the external hanger 52, where the external hanger 52 is capable of detachably connecting the item. The external hanger 52 includes a battery pack hanger 521, a cable hanger 522, a scale hanger 523, a power tool hanger, an accessory hanger, and a support 524, which may be used for separately hanging the battery pack, the cable, the scale, the power tool, the accessory, and the like. Multiple external hangers 52 may be provided on the storage box 31, where the external hanger 52 may be one of or a combination of the battery pack hanger 521, the cable hanger 522, the scale hanger 523, the support 524, and the power tool hanger.

Figure 23:
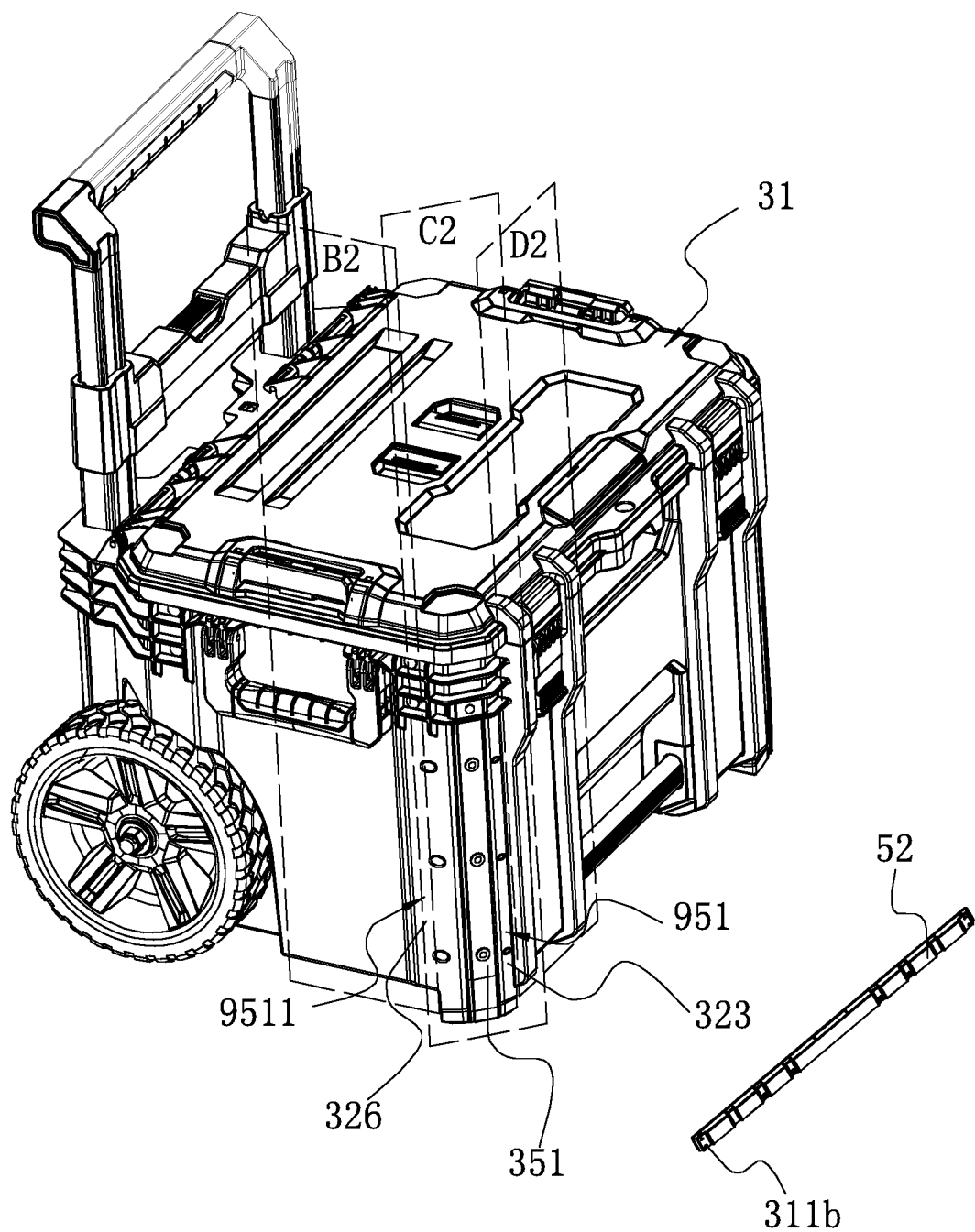
FIG. 23 is a structural view of another storage box.
Figure 24:
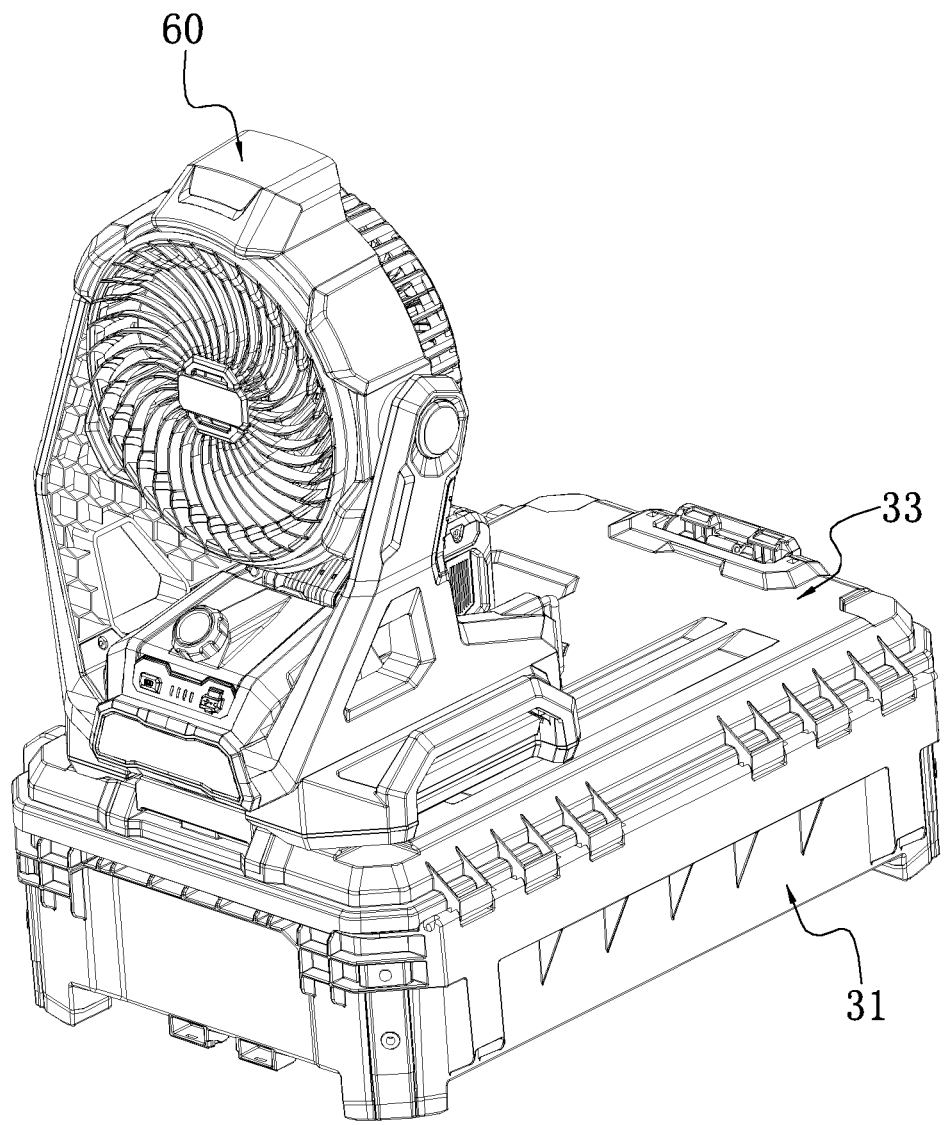
FIG. 24 is a perspective view illustrating that a fan unit is mounted to a storage box in a toolbox system.

The intermediate piece 51 is detachably and fixedly connected to or integrally formed with the storage box 31. As an example of the intermediate piece 51, as shown in FIGS. 1, 2, 20, 29, and 30, the intermediate piece 51 is detachably connected to the storage box 31, that is, the intermediate piece 51 may be connected to the storage box 31 through one or more of the screw, the latch, the rivet, and the movable snap. The external hanger 52 is detachably and fixedly connected to the intermediate piece 51, and the external hanger 52 may be connected to the intermediate piece 51 through one or more of the screw, the latch, the rivet, and the movable snap. As another example of an intermediate piece 951, as shown in FIG. 23, the intermediate piece 951 includes at least an external hanger contact portion 9511 for mounting the external hanger 52. The external hanger contact portion 9511 includes a first contact portion, a second contact portion, and a third contact portion, where at least one external hanger can be mounted to each of the first contact portion, the second contact portion, and the third contact portion. The first contact portion is formed with a first mounting surface, the second contact portion is formed with a second mounting surface, and the third contact portion is formed with a third mounting surface, where the first mounting surface, the second mounting surface, and the third mounting surface are used for mounting at least one external hanger. In this example, the intermediate piece 951 is formed by a corner structure of the storage box 31, and the external hanger 52 is formed with a mounting portion 311*b*, that is, at least part of the right sidewall 326 of the storage box 31 forms the first mounting surface, at least part of a first connecting section surface 351 of the storage box forms the second mounting surface, and at least part of the front sidewall 323 of the storage box forms the third mounting surface. For example, the first mounting surface is at least partially located in a first plane B2, the second mounting surface is at least partially located in a second plane C2, and the third mounting surface is at least partially located in a third plane D2, where the first plane B2, the second plane C2, and the third plane D2 intersect with each other and are not perpendicular to each other. It is also to be understood that the first plane B2, the second plane C2, and the third plane D2 intersect with each other. It is also to be understood that the first mounting surface, the second mounting surface, and the third mounting surface obliquely intersect with each other. The intermediate piece 951 is integrally formed with the storage box 31, and multiple intermediate pieces 951 are formed on the storage box 31. For example, the front sidewall 323, the first connecting section 35, and the left sidewall 325 of the storage box 31 form the intermediate piece 951, that is, one or more external hangers 52 may be mounted on each of the front sidewall 323, the first connecting section 35, and the left sidewall 325 at the same time. Similarly, other sidewalls and a connecting section of the storage box 31 may form the intermediate piece 951. The details are not repeated here.

In the present application, the intermediate piece 51 is detachably and fixed connected to the storage box 31. As shown in FIGS. 1, 2, 20, 29, and 30, the intermediate piece 51 is detachably and fixedly mounted on the connecting section of the storage box 31, and the storage box 31 has multiple connecting sections, that is to say, the intermediate piece 51 is detachably and fixedly mounted on any one or more connecting sections. In addition, multiple intermediate pieces 51 may be fixedly mounted on one connecting section, and the intermediate pieces 51 form a mounting portion 311*a*. The toolbox system 100 may include multiple storage boxes 31, and the intermediate piece 51 may be mounted on the connecting section of another storage box 31. In this example, the toolbox system 100 includes the storage box 31, the compartment box 312, and the storage bin 311 each having the connecting sections, and the intermediate piece 51 may be mounted on any one or more connecting sections of the storage box 31, the compartment box 312, and the storage bin 311. Multiple intermediate pieces 51 may be mounted on one connecting section. The intermediate piece 51 is connected to the connecting section through one or more of the screw, the latch, the rivet, and the movable snap. In this example, the intermediate piece 51 is mounted to the connecting section through a screw connection, that is, the intermediate piece 51 is fixed to the connecting section by the screw. The front sidewall 323 and the left sidewall 325 are fixedly connected to form the first connecting section 35, the front sidewall 323 is formed with a front sidewall surface, the left sidewall 325 is formed with a left sidewall surface, the first connecting section 35 is formed with a first connecting section surface 351, and the front sidewall surface, the first connecting section surface 351, and the left sidewall surface are connected in sequence. That is, the intermediate piece 51 is fixed onto the first connecting section surface 351 by the screw. For example, a first mounting hole is formed on the intermediate piece 51, a first positioning hole is at least formed on the first connecting section surface 351, and the screw penetrates through the first mounting hole and enters the first positioning hole, thereby fixing the intermediate piece 51 on the first connecting section 35. It is to be understood that multiple positioning holes are provided on the first connecting section surface 351, and the user may align first mounting holes on the intermediate piece 51 with the corresponding positioning holes according to requirements and then fix the intermediate piece 51 by screws.

Figure 29:
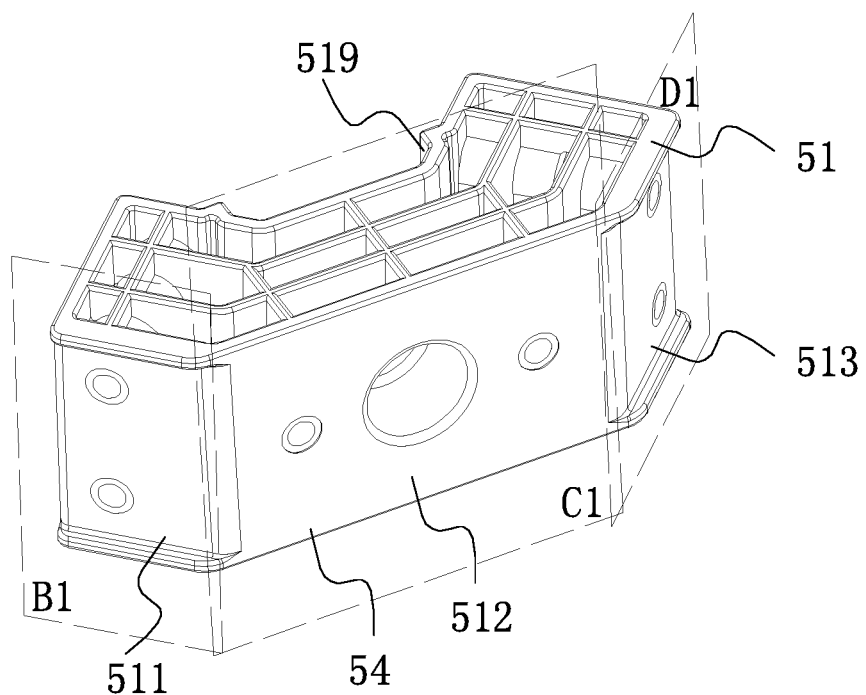
FIG. 29 is a perspective view of an intermediate piece in the toolbox system shown in FIG. 1.
Figure 30:
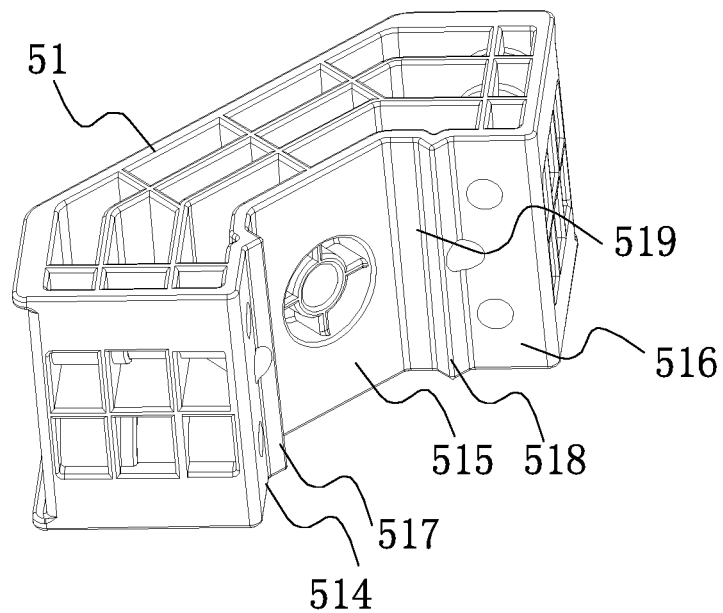
FIG. 30 is a perspective view of the intermediate piece shown in FIG. 29 from another perspective.
Figure 31:
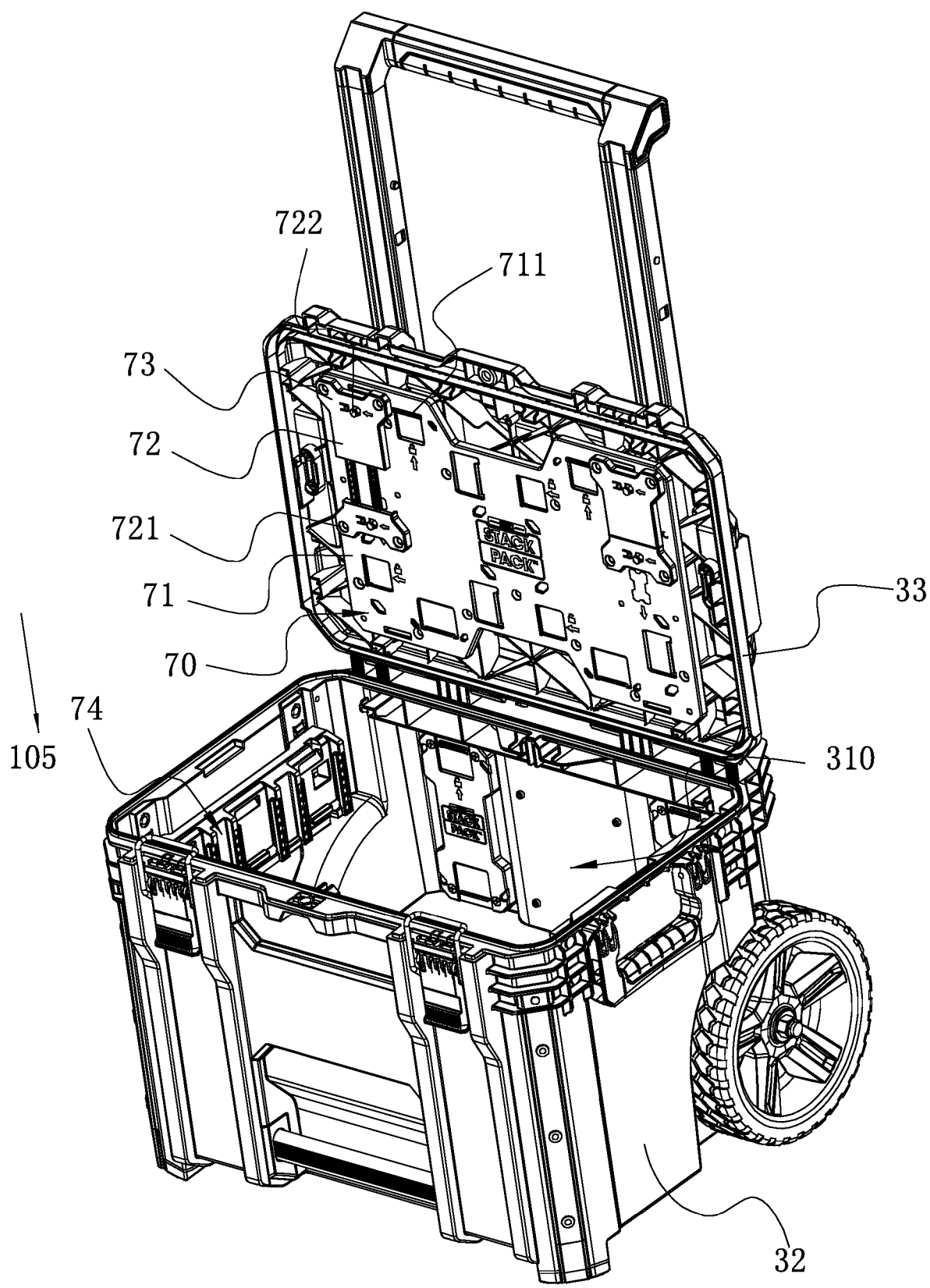
FIG. 31 is a schematic view of a storage box in the toolbox system shown in FIG. 1, where the storage box is at an open position.
Figure 32:
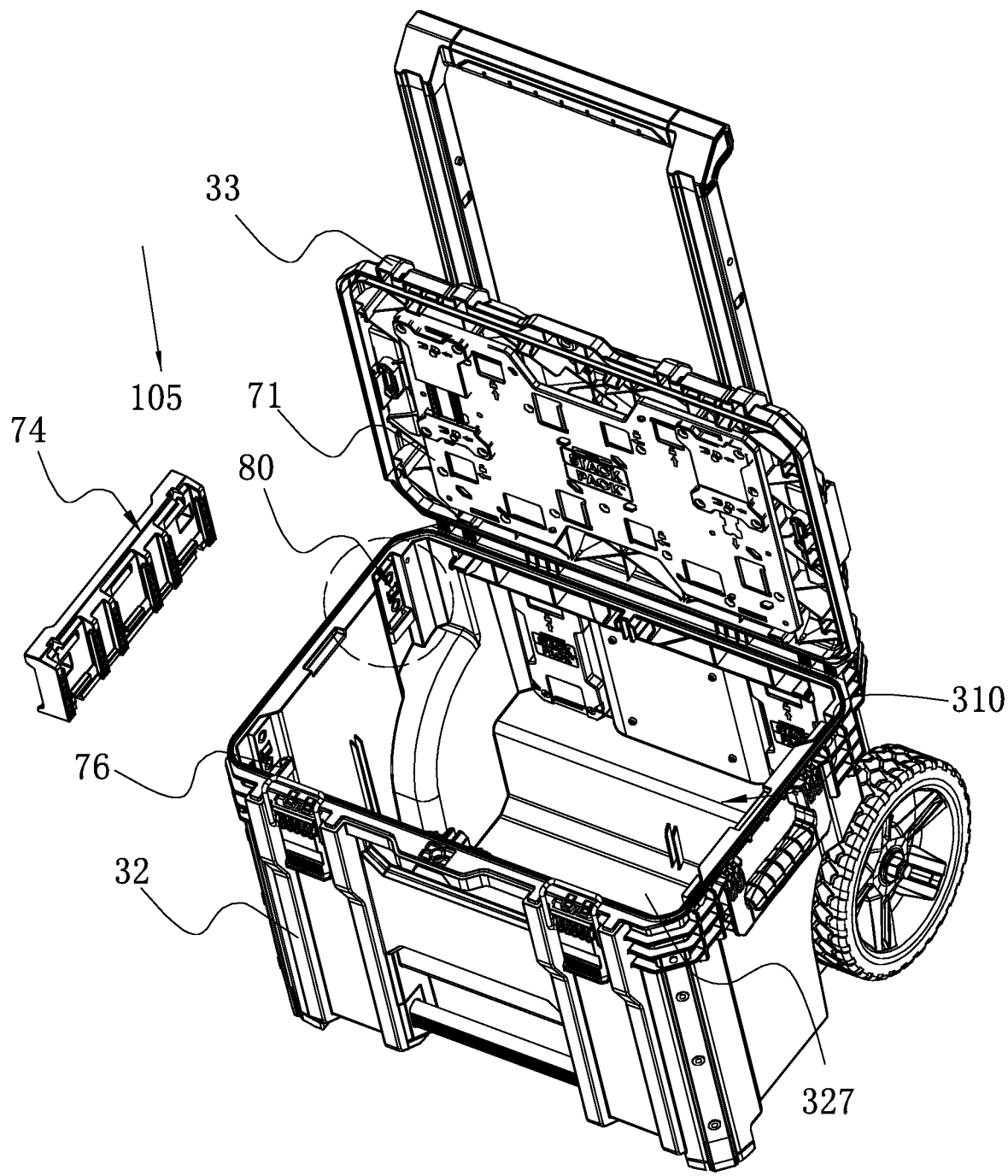
FIG. 32 is a schematic view of an example of a second positioning assembly.
Figure 33:
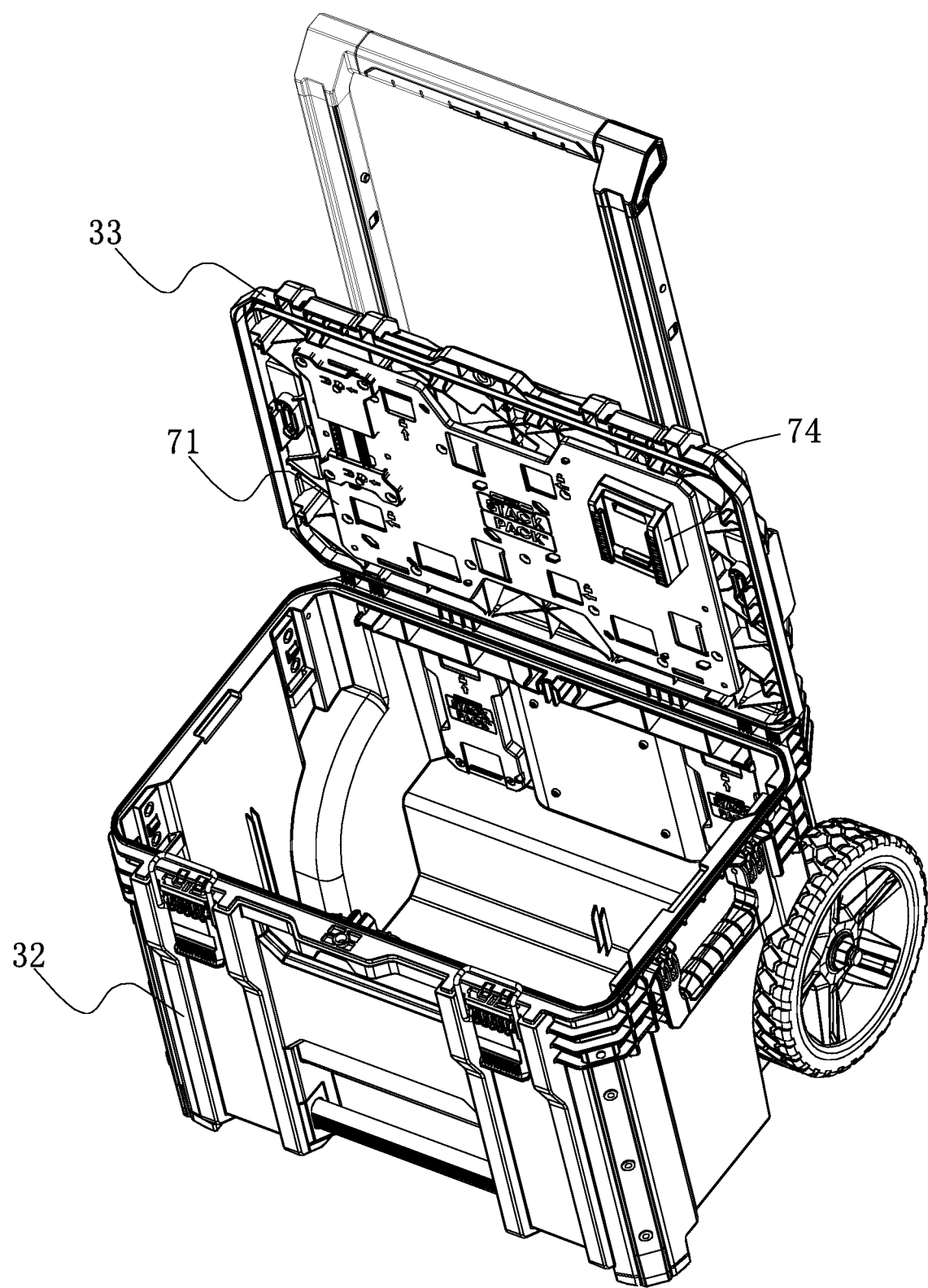
FIG. 33 is a schematic view illustrating that a battery pack insert is mounted on a connector.
Figure 34:
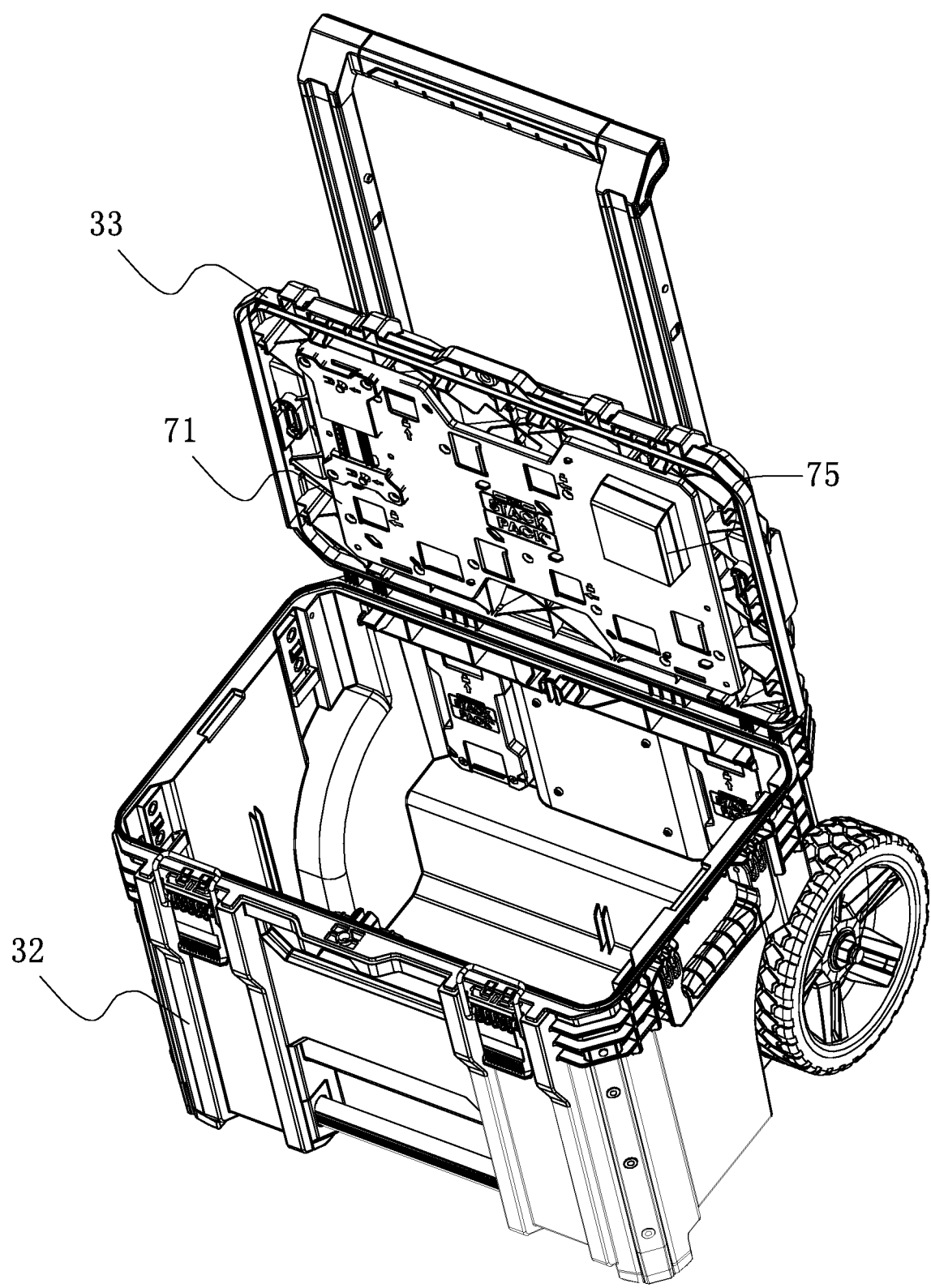
FIG. 34 is a schematic view illustrating that a tool accessory box insert is mounted on a connector.
Figure 35:
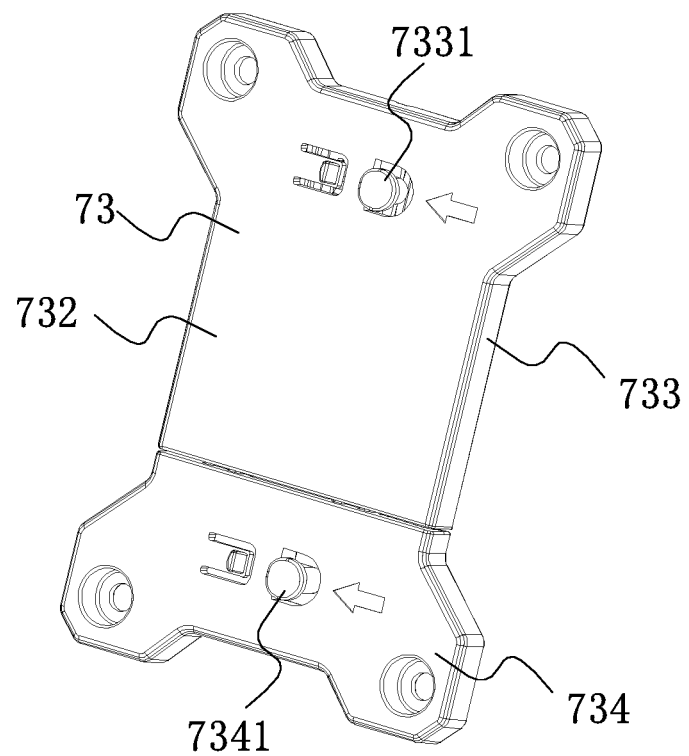
FIG. 35 is a perspective view of a charger insert in a toolbox system, where the charger insert is in a second connection state.
Figure 36:
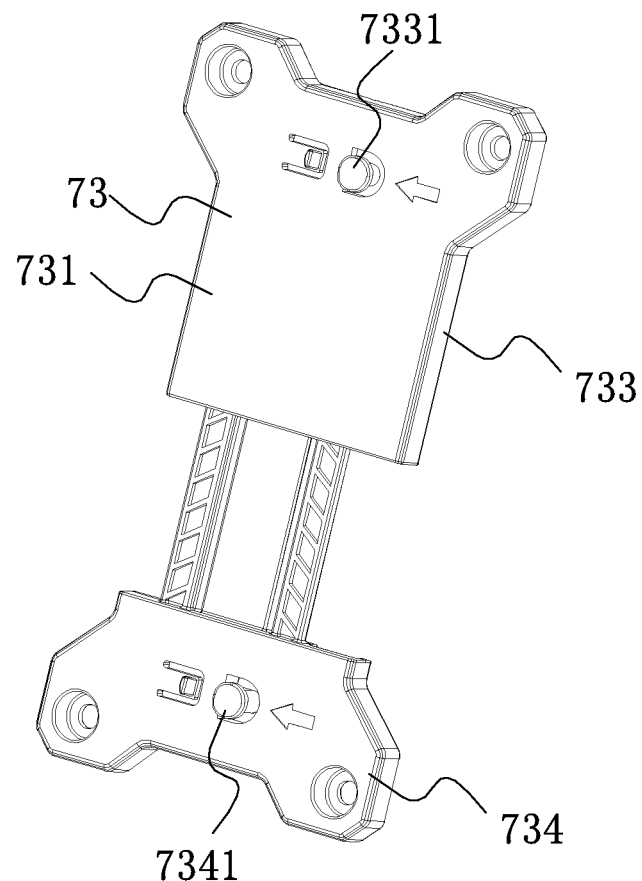
FIG. 36 is a perspective view of the charger insert in FIG. 35 in a first connection state.
Figure 37:
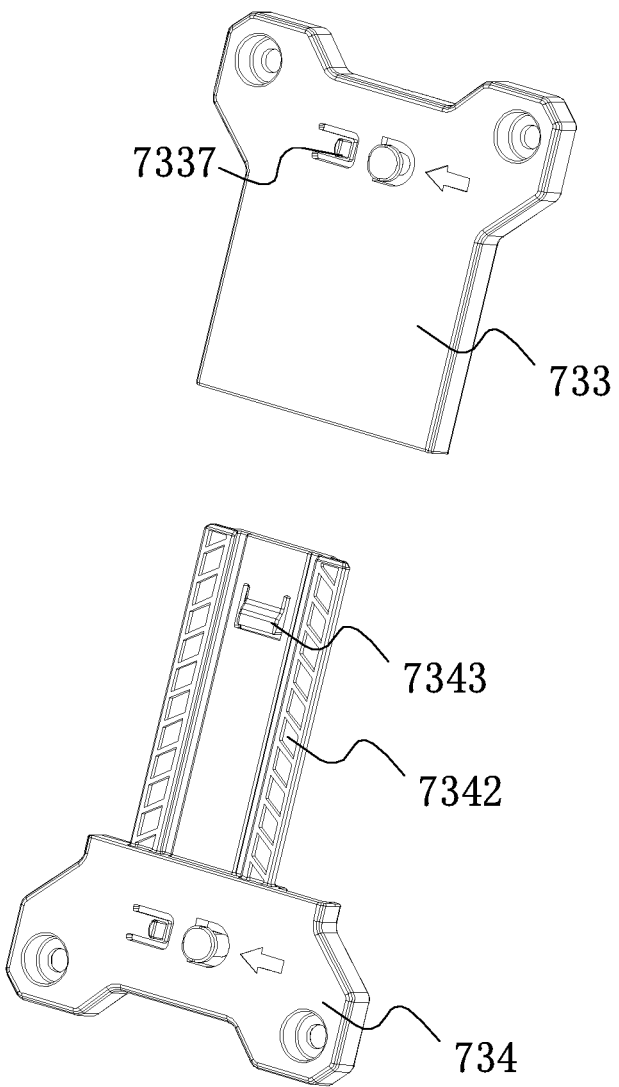
FIG. 37 is a perspective view illustrating that a first charger insert and a second charger insert in FIG. 35 are separated.
Figure 38:
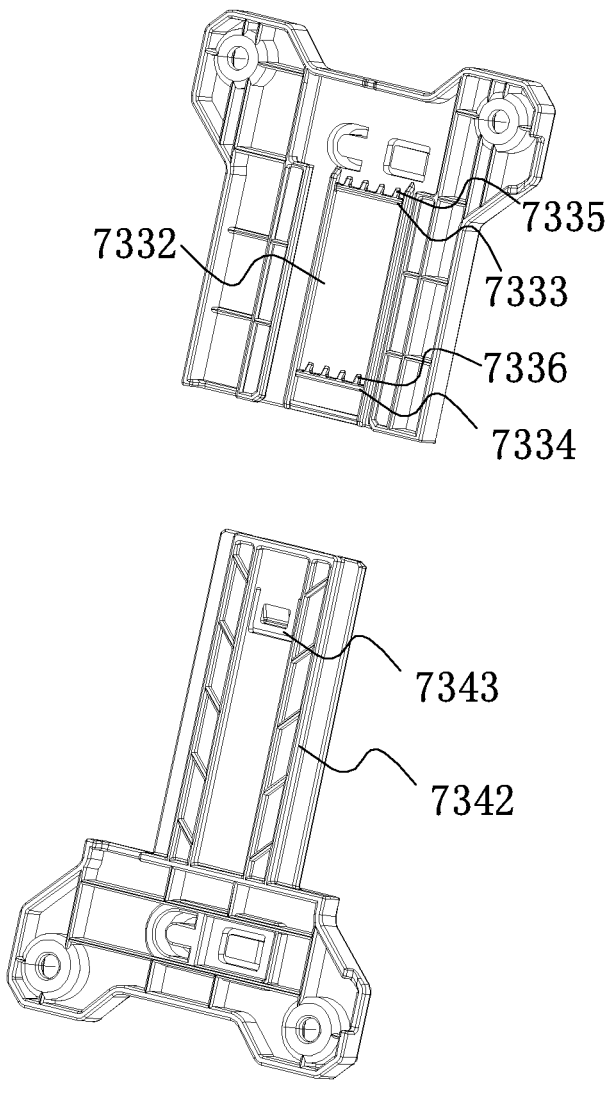
FIG. 38 is a schematic view illustrating that a first charger insert and a second charger insert shown in FIG. 35 are separated.

One or more external hangers 52 are detachably mounted to the intermediate piece 51, that is to say, multiple external hangers 52 may be mounted to the intermediate piece 51 at the same time. The intermediate piece 51 includes at least an external hanger contact portion 54 on which the external hanger 52 can be mounted, where the external hanger contact portion 54 includes the first contact portion and the second contact portion. The first contact portion is formed with a first mounting surface 511, and the second contact portion is formed with a second mounting surface 512, where at least one external hanger 52 can be mounted on each of the first mounting surface 511 and the second mounting surface 512. The first mounting surface 511 is at least partially located in a first plane B1 and the second mounting surface 512 is at least partially located in a second plane C1, where the first plane B1 obliquely intersects with the second plane C1. In this example, the intermediate piece 51 includes the first contact portion, the second contact portion, and the third contact portion, where the first contact portion is formed with the first mounting surface 511, the second contact portion is formed with the second mounting surface 512, and the third contact portion is formed with a third mounting surface 513. It is also to be understood that the intermediate piece 51 includes the first mounting surface 511, the second mounting surface 512, and the third mounting surface 513 on each of which at least one external hanger 52 can be mounted at the same time. In this manner, more external hangers 52 can be conveniently mounted onto the storage box 31. It is to be noted that the first contact portion, the second contact portion, and the third contact portion are not limited to planes and may be curved surfaces, spherical surfaces, or the like. For example, as shown in FIGS. 29 and 30, the intermediate piece 51 includes the first mounting surface 511, the second mounting surface 512, the third mounting surface 513, a first positioning surface 514, a second positioning surface 515, and a third positioning surface 516, where the first mounting surface 511, the second mounting surface 512, and the third mounting surface 513 are used for connecting the external hanger 52, and the second mounting surface 512 is disposed between the first mounting surface 511 and the third mounting surface 513. The first positioning surface 514, the second positioning surface 515, and the third positioning surface 516 are used for being at least partially in contact with the first connecting section surface 351. The second positioning surface 515 is disposed between the first positioning surface 514 and the third positioning surface 516. The second positioning surface 515 is at least partially in contact with the first connecting section surface 351. When the intermediate piece 51 is mounted onto the first connecting section 35, a certain gap exists between the first positioning surface 514 and the surface of the front sidewall 323, and a certain gap exists between the third positioning surface 516 and the surface of the left sidewall 325. In this manner, the intermediate piece 51 is mounted onto the storage box 31 without interference, ensuring smooth installation. The first mounting surface 511, the second mounting surface 512, and the third mounting surface 513 of the intermediate piece 51 are disposed on a side of the intermediate piece 51 facing away from the housing 32 with respect to the first positioning surface 514, the second positioning surface 515, and the third positioning surface 516 of the intermediate piece 51. The first positioning surface 514, the second positioning surface 515, and the third positioning surface 516 are connected in sequence to form a semi-enclosed groove, where an arc along which the groove extends is basically consistent with an arc along which the front sidewall 323, the left sidewall 325, and the first connecting section 35 are connected.

The intermediate piece 51 further includes a first limiting wall 517 and a second limiting wall 518 for being clamped with the first connecting section 35, where the first limiting wall 517 and the second limiting wall 518 are fixedly connected to or integrally formed with the second positioning surface 515. In this example, the first limiting wall 517, the second limiting wall 518, and the second positioning surface 515 are integrally formed into one piece. The first limiting wall 517 and the second limiting wall 518 are disposed in the groove, and the first limiting wall 517 and the second limiting wall 518 are disposed on two sides of the second positioning surface 515. The first limiting wall 517, the second positioning surface 515, and the second limiting wall 518 are integrally formed to basically form a whole, which is defined as a first whole 519. The first whole 519 surrounds at least part of an outer surface of the first connecting section 35. Moreover, when the first whole 519 is mounted to the first connecting section 35, the first limiting wall 517 and the second limiting wall 518 are at least partially in contact with the first connecting section 35. Since the guard link 39 is semi-embedded into the first connecting section 35, that is to say, when the first whole 519 is mounted to the first connecting section 35, the first limiting wall 517 and the second limiting wall 518 are separately disposed on two sides of the guard link 39, and the first limiting wall 517 and the second limiting wall 518 are in contact with at least part of the guard link 39. In this manner, it is convenient for the user to mount the intermediate piece 51 onto the first connecting section 35, the intermediate piece 51 can be mounted onto the storage box 31 without any special alignment, and it is convenient for the user to mount the intermediate piece 51, thereby saving the time of the user and improving working efficiency.

The external hanger 52 may be connected to the mounting surfaces through one or more of the screw, the latch, the rivet, and the movable snap. The external hanger assembly 50 further includes a fastener 53 for fixedly connecting the external hanger 52 to the intermediate piece 51. For example, the fastener 53 may be a screw, that is, the external hanger 52 is fixed to the intermediate piece 51 by the screw. The first mounting surface 511 of the intermediate piece 51 is at least partially located in the first plane B1, the second mounting surface 512 is at least partially located in the second plane C1, and the third mounting surface 513 is at least partially located in a third plane D1, where the first plane B1, the second plane C1, and the third plane D1 intersect with each other, that is to say, none of the first plane B1, the second plane C1, and the third plane D1 are on the same plane, that is, none of the first mounting surface 511, the second mounting surface 512, and the third mounting surface 513 are on the same plane, and the three mounting surfaces are arranged obliquely. In this manner, it is convenient for the user to mount multiple external hangers 52 on the intermediate piece 51, and no interference exists between the external hangers 52 mounted on the mounting surfaces so that the user can place more tools such as the power tool, the battery pack, the scale, the cable, and the tool accessory on the toolbox system 100 through the intermediate piece 51, thereby greatly improving the space utilization rate of the toolbox system. As another example, one or more mounting surfaces for mounting the external hangers 52 may be provided on the first mounting surface 511 along the up and down direction, and similarly, one or more mounting surfaces for mounting the external hangers 52 may be provided on each of the second mounting surface 512 and the third mounting surface 513 along the up and down direction. In this manner, the user may mount one or more external hangers 52 on the intermediate piece 51 according to requirements, thereby increasing a selection range of the user and facilitating the operation of the user. It is to be noted that the first plane B1, the second plane C1, and the third plane D1 are all virtual planes.

The surface of the left sidewall 325 is at least partially located in a left side plane E, the surface of the front sidewall 323 is at least partially located in a front side plane G, and the first connecting section surface 351 is at least partially located in a first connecting plane F. The first plane B1 is basically parallel to the left side plane E, the second plane C1 is basically parallel to the first connecting plane F, and the third plane D1 is basically parallel to the front side plane G, that is, extension directions of the first mounting surface 511, the second mounting surface 512, and the third mounting surface 513 are basically consistent with the corner structure of the storage box 31. In this manner, the user may mount the external hanger 52 on the intermediate piece 51 without interference; further, after tools such as the power tool, the battery pack, the scale, the cable, and the tool accessory are placed on the external hanger 52, excessive tool-to-tool interference that prevents the tools from being separated does not occur. It is to be noted that the left side plane E, the front side plane G, and the first connecting plane F are all virtual planes.

As described above, the external hanger 52 includes the scale hanger 523, where one or more scale hangers 523 may mate so as to place the scale. As an example, only one scale hanger 523 is fixed to the storage box 31 and the scale is placed in a cavity in the shape of a long cylinder and formed by the scale hanger 523. As another example, multiple scale hangers 523 may mate so as to place the scale, and the scale is placed in a cavity in the shape of a long cylinder and formed by the multiple scale hangers 523. In the examples shown in FIGS. 1 and 20, two external hangers 52 may mate so as to place the scale.

For ease of description, the two external hangers 52 are defined as a first scale hanger 5231 and a second scale hanger 5232, where the first scale hanger 5231 and the second scale hanger 5232 are fixedly mounted onto the corresponding intermediate pieces 51 separately. When the first scale hanger 5231 and the second scale hanger 5232 are mounted onto the intermediate pieces 51, the first scale hanger 5231 is disposed on an upper side of the second scale hanger 5232 along the up and down direction. Since the scale is relatively long in a length direction of the scale, a length of the scale generally exceeds the height of one storage box 31, that is, for the stability of scale placement, the first scale hanger 5231 and the second scale hanger 5232 are generally spaced apart. The first scale hanger 5231 may be mounted on the storage bin 311 or the compartment box 312 according to requirements of the user. In this example, the first scale hanger 5231 and the second scale hanger 5232 are both mounted on the deck box 313, and the first scale hanger 5231 and the second scale hanger 5232 are mounted on different intermediate pieces 51 separately.

The first scale hanger 5231 includes a first mounting portion 5233 and a first accommodation portion 5234, where the first mounting portion 5233 and the first accommodation portion 5234 are fixedly connected or integrally formed, and the first mounting portion 5233 may be mounted onto the intermediate piece 51. For example, the first mounting portion 5233 may be connected to the second mounting surface 512 through one or more of the screw, the latch, the rivet, and the movable snap. Further, the first scale hanger 5231 is fixedly mounted onto the intermediate piece 51 by the screw. The first accommodation portion 5234 is formed with a channel cavity 5235, where the scale may penetrate through the channel cavity 5235 along the up and down direction, and a dimension of the channel cavity 5235 along the up and down direction is greater than or equal to 1 mm and less than or equal to 10 mm, that is to say, a length of the channel cavity 5235 in the up and down direction is relatively small. On the premise that the scale can be placed, the first scale hanger 5231 has a smaller structure, thereby not only saving a cost but also saving the space for the scale hanger 523. The second scale hanger 5232 includes a second mounting portion 5236 and a second accommodation portion 5237. Similarly, the second mounting portion 5236 and the second accommodation portion 5237 are fixedly connected or integrally formed, and the second mounting portion 5236 is mounted on the intermediate piece 51. For example, the second mounting portion 5236 may be connected to the second mounting surface 512 of another immediate piece 51 through one or more of the screw, the latch, the rivet, and the movable snap. Further, the second scale hanger 5232 is fixedly mounted onto the intermediate piece 51 by the screw. The second accommodation portion 5237 is formed with a stopper cavity 5238, where the stopper cavity 5238 is semi-enclosed. When the scale is placed in the stopper cavity 5238, a bottom of the stopper cavity 5238 abuts against the scale, so as to prevent the further downward movement of the scale, that is to say, the channel cavity 5235 of the first scale hanger and the stopper cavity 5238 of the second scale hanger mate with each other to form the preceding cavity in which the scale is placed. A dimension of the stopper cavity 5238 along the up and down direction is greater than or equal to 3 mm and less than or equal to 10 mm, that is, a length of the stopper cavity 5238 in the up and down direction is relatively small. To more stably place the scale on the toolbox system 100, two or more scale hangers 523 may be used and mate with each other. If only one scale hanger 523 is used, a relatively long cavity for accommodating the scale is required, the scale hanger 523 needs to be relatively long in the length direction to form the cavity for accommodating the scale, and thus the scale hanger 523 is relatively large in appearance. The preceding structure is used for separating the scale hangers 523 for forming the cavity so that, on the one hand, the scale can be placed on the toolbox system 100 and, on the other hand, the scale hanger 523 have a compact structure and is easy to store.

Figure 2:
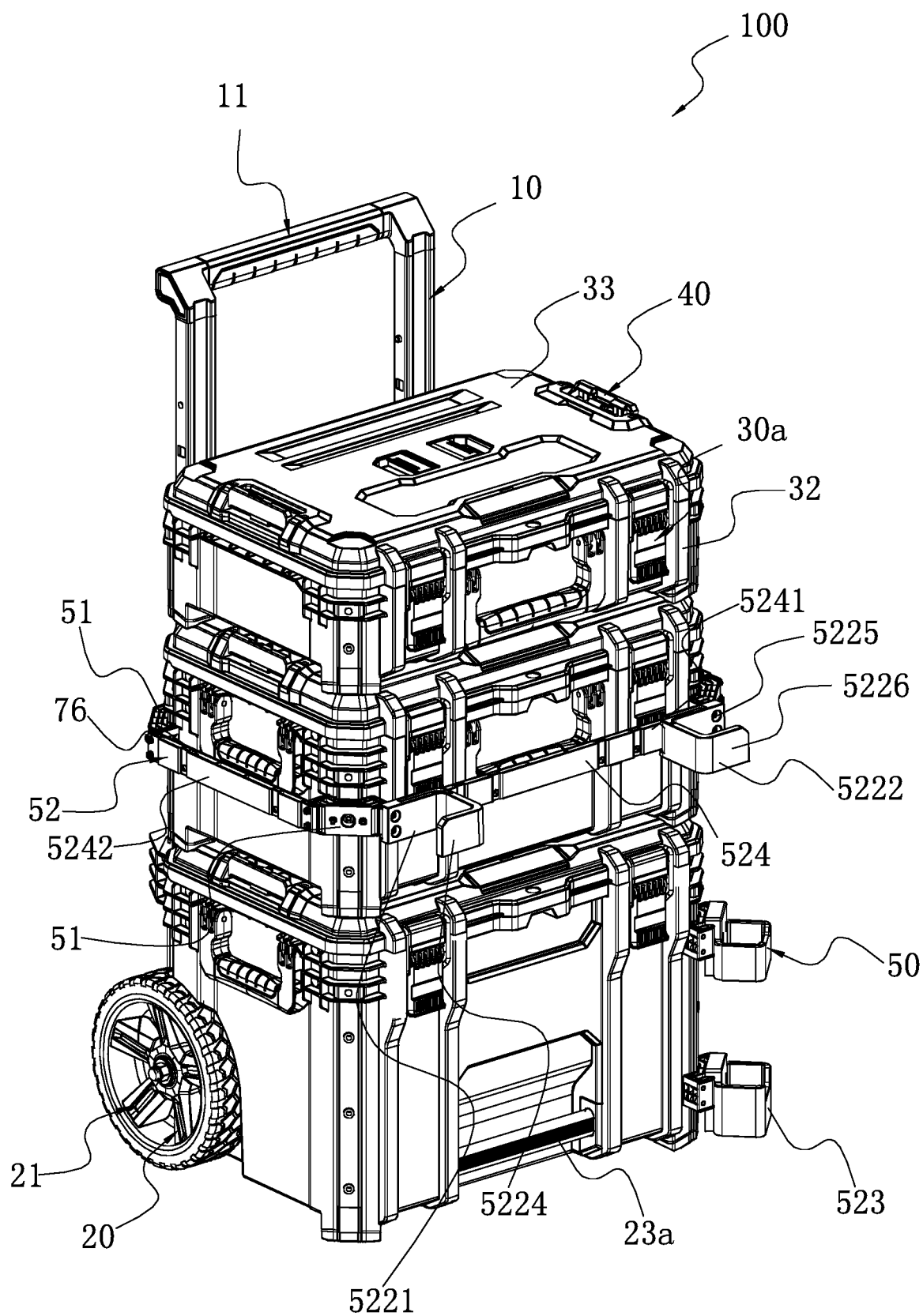
FIG. 2 is a schematic view of the toolbox system in FIG. 1 from another perspective.

As shown in FIGS. 1 and 2, the external hanger 52 includes the cable hanger 522, which is disposed on at least one sidewall of the storage box 31, the user may wind the cable onto the cable hanger 522, and the cable hanger 522 may be connected to the storage box 31 through one or more of the screw, the latch, the rivet, and the movable snap, that is, the cable hanger 522 may be disposed on the storage bin 311, the compartment box 312, and the deck box 313. The cable hanger 522 is provided on the front sidewall 323 of the storage box 31, where the cable hanger 522 includes a first cable hanger 5221 and a second cable hanger 5222 that are mounted on the intermediate pieces 51. The intermediate pieces 51 are mounted at two ends of the front sidewall 323, and the first cable hanger 5221 and the second cable hanger 5222 are separately mounted on different intermediate pieces 51, that is, the first cable hanger 5221 and the second cable hanger 5222 are spaced apart. The first cable hanger 5221 includes a third mounting portion 5223 and a first hook portion 5224 that are fixedly connected or integrally formed. Similarly, the second cable hanger 5222 includes a fourth mounting portion 5225 and a second hook portion 5226 that are fixedly connected or integrally formed. The third mounting portion 5223 may be connected to the third mounting surface 513 of the intermediate piece 51 through one or more of the screw, the latch, the rivet, and the movable snap. The fourth mounting portion 5225 may be connected to the first mounting surface 511 of another intermediate piece 51 through one or more of the screw, the latch, the rivet, and the movable snap. The first hook portion 5224 and the second hook portion 5226 face away from each other, which is convenient to limit the cable on the hook 34 of the cable hanger 522. The third mounting portion 5223 and the fourth mounting portion 5225 are mounted onto the intermediate pieces 51 through screw connections.

Figure 41:
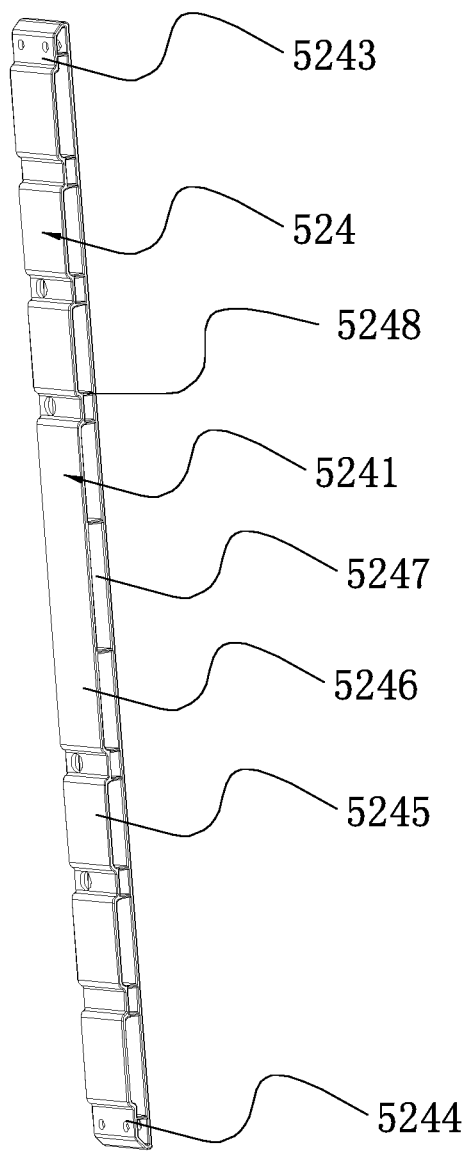
FIG. 41 is a perspective view of a support in a toolbox system.
Figure 42:
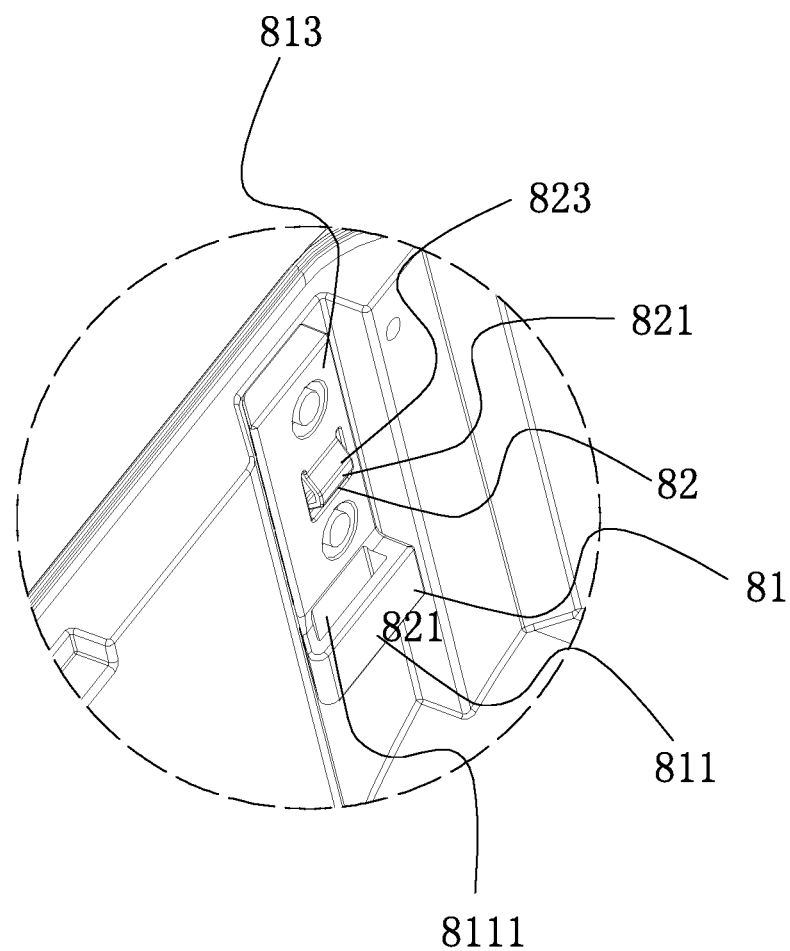
FIG. 42 is a partial enlarged view of the schematic view shown in FIG. 32.

Referring to FIG. 41, the external hanger 52 further includes the support 524 for connecting or supporting the power tool, a power tool accessory, the battery pack, a fan unit 60, a charger, or the like. For example, the support 524 includes a main support member 5241 and an auxiliary support member 5242, that is, the main support member 5241 and the auxiliary support member 5242 are used for connecting or supporting the power tool, the power tool accessory, the battery pack, the fan unit 60, the charger, or the like. The main support member 5241 and the auxiliary support member 5242 may be detachably and fixedly connected to the deck box 313, the compartment box 312, or the storage bin 311. The main support member 5241 and the auxiliary support member 5242 may be provided on each of the deck box 313, the compartment box 312, and the storage bin 311, which is not limited here, and the user may mount the main support member 5241 and the auxiliary support member 5242 according to requirements. Main support members 5241 may be disposed on front and rear sides of the housing 32 of the storage box 31, and auxiliary support members 5242 may be disposed on left and right sides of the housing 32 of the storage box 31, that is to say, the main support members 5241 are mounted on the front and rear sidewalls 324 of the housing 32 of the storage box 31, and the auxiliary support members 5242 are mounted on the left and right sidewalls 326 of the storage box 31. It is to be noted that since the moving device 20 is mounted on the deck box 313, interference may exist when the main support member 5241 is mounted on a rear side of the deck box 313, so normally the main support member 5241 is mounted on the front sidewall 323 of the deck box 313; however, the moving device 20 is not provided on the storage bin 311 and the compartment box 312, so the main support member 5241 may be disposed on the rear sidewall 324 of the storage bin 311 and the rear sidewall 324 of the compartment box 312. Similarly, the wheels 21 are present at the left sidewall 325 and the right sidewall 326 of the deck box 313, and interference may exist when the auxiliary support members 5242 are mounted on the left sidewall 325 and the right sidewall 326 of the deck box 313, so normally the auxiliary support members 5242 are not provided on the left sidewall 325 and the right sidewall 326 of the deck box 313. However, interference does not exist on the left sidewalls 325 and the right sidewalls 326 of the storage bin 311 and the compartment box 312, so the auxiliary support members 5242 may be disposed on the left sidewalls 325 and the right sidewalls 326 of the storage bin 311 and the compartment box 312.

Figure 39:
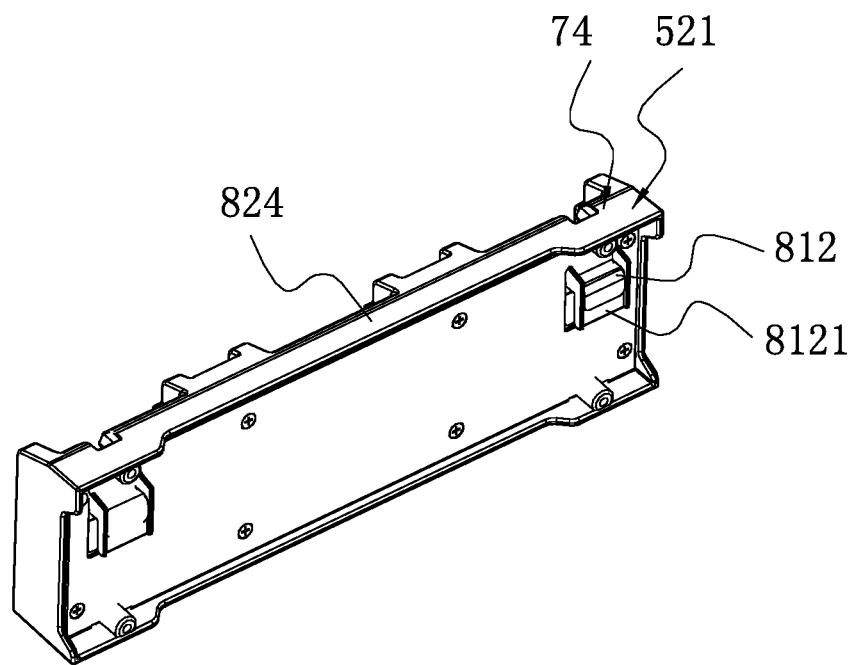
FIG. 39 is a perspective view of a battery pack insert in a toolbox system.
Figure 40:
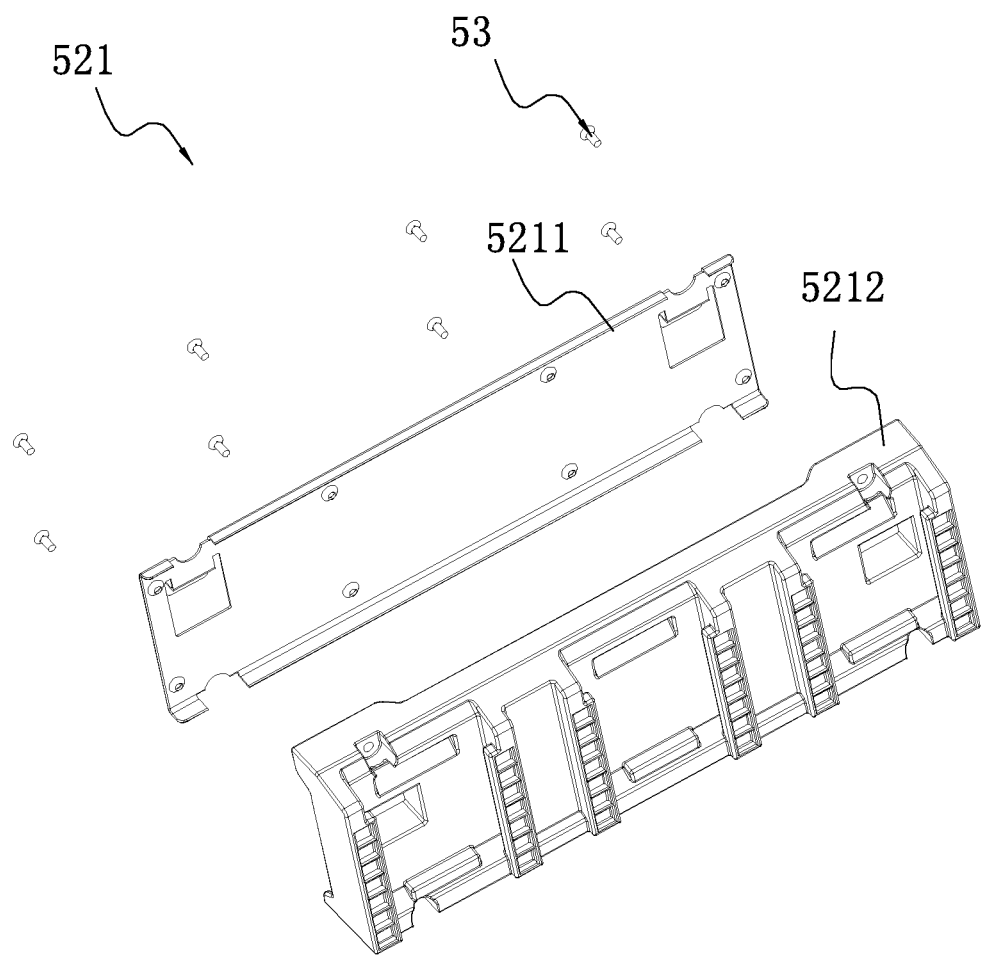
FIG. 40 is an exploded view of the battery pack insert shown in FIG. 39.

Referring to FIGS. 39 and 40, the external hanger 52 further includes the battery pack hanger 521 for connecting the battery pack, where the battery pack hanger 521 may be fixedly connected to the main support member 5241 or the auxiliary support member 5242. The battery pack mounted on the battery pack hanger 521 can supply power to any power tool in the toolbox system 100. The battery pack hanger 521 includes a main connecting plate 5211 and a battery pack mounting plate 5212, where the battery pack mounting plate 5212 is fixedly connected to the main connecting plate 5211, multiple battery pack connecting seats are formed on the battery pack mounting plate 5212, and the battery pack may be mounted on the battery pack connecting seat. The main connecting plate 5211 is detachably and fixedly connected to the main support member 5241 or the auxiliary support member 5242. The main connecting plate 5211 is made of a first material and the battery pack mounting plate 5212 is made of a second material, where hardness of the first material is greater than hardness of the second material. In this example, the main connecting plate 5211 is made of metal and the battery pack mounting plate 5212 is made of plastic. The main connecting plate 5211 is made of metal so that the stability of the connection of the battery pack hanger 521 to the toolbox system 100 can be ensured. The battery pack mounting plate 5212 is made of plastic so that the cost can be saved and the weight of the toolbox system 100 can be reduced in the case where the battery pack can be connected. It is to be noted that, in the present application, the battery pack hanger 521 mounted outside the storage box 31 may also be mounted inside the storage box 31.

The main support member 5241 and the auxiliary support member 5242 are detachably fixed on the storage box 31, and the main support member 5241 may be connected to the storage box 31 through one or more of the screw, the latch, the rivet, and the movable snap. Similarly, the auxiliary support member 5242 may be connected to the storage box 31 through one or more of the screw, the latch, the rivet, and the movable snap. Further, the main support member 5241 is connected to the intermediate piece 51 through one or more of the screw, the latch, the rivet, and the movable snap and then fixedly connected to the connecting section of the storage box 31 by the intermediate piece 51. Similarly, the auxiliary support member 5242 is connected to the intermediate piece 51 through one or more of the screw, the latch, the rivet, and the movable snap and then fixedly connected to the connecting section of the storage box 31 by the intermediate piece 51. For ease of description, the structures of the main support member 5241 and the auxiliary support member 5242 are described in detail by using the compartment box 312 as an example. The main support member 5241 may be mounted on the front sidewall 323 of the compartment box 312, an end of the main support member 5241 may be connected to the first connecting section 35 of the compartment box 312, the other end of the main support member 5241 may be connected to the second connecting section 36 of the compartment box 312, and the main support member 5241 includes a first connecting portion 5243, a second connecting portion 5244, and a spacer portion 5245. The spacer portion 5245 is disposed between the first connecting portion 5243 and the second connecting portion 5244, and the first connecting portion 5243 and the second connecting portion 5244 are fixedly connected to or integrally formed with the spacer portion 5245. In this example, the first connecting portion 5243 and the second connecting portion 5244 are integrally formed with the spacer portion 5245 into one component. The first connecting portion 5243 is mounted on the intermediate piece 51 on the first connecting section 35. The second connecting portion 5244 is mounted on the intermediate piece 51 on the second connecting section 36. The first connecting portion 5243 is fixedly connected to the third mounting surface 513 of the intermediate piece 51 by the screw. The second connecting portion 5244 is fixedly connected to the first mounting surface 511 of the intermediate piece 51 by the screw. For example, a connecting hole is at least provided on each of the first mounting surface 511, the second mounting surface 512, and the third mounting surface 513 of the intermediate piece 51. Similarly, a through hole corresponding to the connecting hole is provided on each of the first connecting portion 5243 and the second connecting portion 5244, that is, the screw penetrates through the through hole on the first connecting portion 5243 to fix the first connecting portion 5243 to the connecting hole on the third mounting surface 513, thereby fixing the first connecting portion 5243 of the main support member 5241 to the third mounting surface 513 of the intermediate piece 51. Similarly, the screw penetrates through the through hole on the second connecting portion 5244 to fix the second connecting portion 5244 to the first mounting surface 511 of the intermediate piece 51. The spacer portion 5245 is used for connecting or supporting the power tool, the power tool accessory, the battery pack, the charger, or the like. The spacer portion 5245 may be connected to the battery pack hanger 521. The spacer portion 5245 includes two long plates connected to the first connecting portion 5243 and the second connecting portion 5244, which are separately defined as a first long plate 5246 and a second long plate 5247, where the first long plate 5246 and the second long plate 5247 are spaced apart from each other, the first long plate 5246 is disposed on an outer side, the second long plate 5247 is disposed between the first long plate 5246 and the front sidewall 323, and a gap formed between the first long plate 5246 and the second long plate 5247 may be used for connecting or supporting the power tool, the power tool accessory, the battery pack, the charger, or the like. For example, a hook structure is connected to the power tool, the power tool accessory, the fan unit 60, the battery pack, or the charger and hung into the gap formed between the long plates. When multiple power tools are hung into the gap, to avoid collision between the power tools due to the movement of the toolbox system 100, multiple spacer plates 5248 are provided in the gap so that when the power tools are hung into the gap, positions of the power tools will not change randomly, thereby ensuring the stability of the connections between the power tools and the main support member 5241. Similarly, the structure and principle of the auxiliary support member 5242 are basically the same as the structure and principle of the main support member 5241, and a dimension of the main support member 5241 in a length direction is different from a dimension of the auxiliary support member 5242 in a length direction. Both the main support member 5241 and the auxiliary support member 5242 may be made of a metal material.

As shown in FIGS. 24 to 28, the toolbox system 100 includes at least a fan unit 60 for generating an airflow, where the fan unit 60 is detachably and fixedly connected to the storage box 31, that is, the fan unit 60 is disposed outside the accommodation cavity 310. It is to be understood that the fan unit 60 may be separated from the storage box 31 into an independent tool. When the user carries the toolbox system 100 from the tool storage place to the work site, a variety of tools, accessories, fan units 60, and the like that need to be used are bound to be stored in the storage box 31. The user needs to carry more tools to a work site having a more complicated working condition, so the user needs to travel between the tool storage place and the work site for multiple times, seriously affecting the working efficiency of the user. Through the preceding arrangement, the user can directly fix the fan unit 60 on the storage box 31 during transportation, the fan unit 60 does not need to be placed in the accommodation cavity 310, the space in the accommodation cavity 310 is freed, and the user can place more tools in the accommodation cavity 310, thereby improving the space utilization rate of the storage box 31, reducing the number of times the user travels back and forth, and improving the efficiency of the user. The detachable and fixed connection means that the fan unit 60 is separated from the storage box 31 without destroying the original structures of the fan unit 60 and the storage box 31. For example, the fan unit 60 and the storage box 31 form a snap connection, a threaded connection, a screw connection, and the like, and may form a combination of multiple connection manners. The toolbox system 100 further includes a snap assembly by which the fan unit 60 is connected to the storage box 31. For example, the fan unit 60 may be connected to the sidewall of the storage box 31 or the upper cover 33 of the storage box 31 through the snap assembly.

A contact surface 61 at least exists between the fan unit 60 and the storage box 31, and a distance µl between the contact surface 61 and the support plane P along the up and down direction is greater than or equal to 100 mm, that is to say, the contact surface 61 between the fan unit 60 and the storage box 31 may be disposed at any place with a distance of greater than or equal to 100 mm from the support plane P as long as the connection between the fan unit 60 and the storage box 31 is stable and the fan unit 60 is not separated from the storage box 31 when the toolbox system 100 stands still or moves. Further, in this example, the toolbox system 100 may include one or more storage boxes 31, where the fan unit 60 can be detachably and fixedly connected to any storage box 31, that is to say, the user may stack one or more storage boxes 31 on an upper side of the storage box 31 according to requirements, thereby achieving height adjustment on the fan unit 60. When the user places the fan unit 60 at the work site, the fan unit 60 is generally hung at a high position or placed directly on the ground, that is to say, the fan unit 60 is placed at a relatively fixed position before. Through the preceding arrangement, by using the function of detachability between the storage boxes 31, the height of the storage box 31 may be adjusted to a height required by the user, and then the fan unit 60 is fixed on the storage box 31, thereby improving the diversity of choices of the user. Meanwhile, the toolbox system 100 includes the moving device 20, that is, the user may directly fix the fan unit 60 on the storage box 31 and then push the storage box 31 so that the fan unit 60 moves along with the storage box 31. In some working conditions where the user changes work sites for a short distance, the user may directly push the storage box 31 or carry the storage box 31 to make the fan unit 60 blow against the user, and the user does not need to find a place to place or hang the fan unit 60, thereby improving the working efficiency of the user.

The snap assembly includes a first snap assembly 41 and a second snap assembly 45 mating for locking the fan unit 60, and the fan unit 60 is detachably and fixedly connected to the upper cover 33 of the storage box 31. The first snap assembly 41 is disposed on the upper cover 33, and the first snap assembly 41 includes a first snap piece 42, a positioning member 43, and an elastic member 44. The positioning member 43 is fixedly connected to or integrally formed with the fan unit 60. The first snap piece 42 is mounted on the upper cover 33. A clamping groove 331 is formed on the upper cover 33. The first snap piece 42 is disposed in the clamping groove 331. The first snap piece 42 can move relative to the clamping groove 331. The elastic member 44 is disposed on the upper cover 33, and the elastic member 44 is connected to the first snap piece 42. The first snap piece 42 has at least a first position and a second position relative to the upper cover 33. When the first snap piece 42 is at the first position, the positioning member 43 remains separated from the first snap piece 42. When the first snap piece 42 is at the second position, the first snap piece 42 and the positioning member 43 are interlocked. When no external force is applied to the first snap piece 42, the elastic member 44 may apply an elastic force to the first snap piece 42 to keep the first snap piece 42 at the second position, that is to say, when the first snap piece 42 moves from the second position to the first position, the elastic force of the elastic member 44 needs to be overcome.

Further, the first snap piece 42 switches between the first position and the second position through rotation. The first snap piece 42 is at the second position, that is, the positioning member 43 may be interlocked with the first snap piece 42 from top to bottom. The first snap piece 42 is at the first position, that is, the positioning member 43 is released from being interlocked with the first snap piece 42 and the positioning member 43 is separated from the first snap piece 42. The first position is a position to which the first snap piece 42 rotates by a certain angle in a direction away from the positioning member 43 until the first snap piece 42 is separated from the positioning member 43. The second position is a position where the first snap piece 42 mates with the positioning member 43 by rotating in a direction toward the positioning member 43 and cannot continue to rotate in this direction. When implementing the function of interlocking the first snap piece 42 and the positioning member 43, the user only needs to insert the positioning member 43 into the clamping groove 331 of the upper cover 33 from top to bottom. At this time, the first snap piece 42 is at the second position. When the positioning member 43 moves downward into the clamping groove 331, the positioning member 43 abuts against the first snap piece 42 and pushes the first snap piece 42 to rotate in the direction away from the positioning member 43. As the positioning member 43 sinks, the first snap piece 42 is pushed by the positioning member 43 to gradually rotate from the second position to the first position. When the first snap piece 42 reaches the first position, the positioning member 43 completely enters the clamping groove 331 and no longer abuts against the first snap piece 42, and the positioning member 43 cannot continue to push the first snap piece 42 to rotate. After the positioning member 43 no longer abuts against and pushes the first snap piece 42, the first snap piece 42 springs back from the first position to the second position under the action of the elastic member 44, thereby locking the positioning member 43 in the clamping groove 331. It can be seen that the user only needs to insert the positioning member 43 into the clamping groove 331 from top to bottom so that the first snap piece 42 automatically switches from the second position to the first position and then back to the second position, so as to automatically complete the interlocking between the first snap piece 42 and the positioning member 43. When the first snap piece 42 is detached from the positioning member 43, the first snap piece 42 is rotated to the first position, and the positioning member 43 may be separated from the first snap piece 42 so that the first snap piece 42 is detached from the positioning member 43, that is, both the installation and disassembly processes of the fan unit 60 are very convenient.

The first snap piece 42 is hingedly connected into the clamping groove 331, that is, the first snap piece 42 includes a body 421, a hinge portion 422, a snap hook 423, a hinge rod 424, a stopper 427, an operating portion 428, and a limiting protrusion 429. The snap hook 423 is fixedly connected to or integrally formed with the body 421, the snap hook 423 is disposed at an upper end of the body 421, and the snap hook 423 is used for being engaged with an interlocking hole formed by the positioning member 43 to achieve the interlocking between the fan unit 60 and the upper cover 33. The hinge portion 422 is fixedly connected to or integrally formed with the body 421, the hinge portion 422 is disposed at a lower end of the body 421, and the hinge portion 422 is used for being connected to the clamping groove 331. The hinge rod 424 penetrates through both the hinge portion 422 and the clamping groove 331 so that the first snap piece 42 can rotate relative to the clamping groove 331. The operating portion 428 is fixedly connected to or integrally formed with the body 421 and used for being driven by the user. The stopper 427 is disposed on an inner side of the body 421, that is, disposed on a side of the body 421 facing the positioning member 43, the stopper 427 may mate with the positioning member 43, and the stopper 427 is used for keeping the first snap piece 42 at the first position. The limiting protrusion 429 is fixedly connected to or integrally formed with the body 421 and used for limiting a rotation angle of the first snap piece 42 and preventing the first snap piece 42 from being separated from the clamping groove 331, that is, the limiting protrusion 429 abuts against an end of the elastic member 44, and the other end of the elastic member 44 abuts against the upper cover 33. In this example, the user drives the first snap piece 42 to rotate, the limiting protrusion 429 rotates with the first snap piece 42, and the limiting protrusion 429 compresses the elastic member 44 until the limiting protrusion 429 abuts against the upper cover 33. For example, the elastic member 44 is a torsion spring.

The stopper 427 includes a body portion 4271 mounted on the body 421, a telescopic member 4272 disposed in the body portion 4271, and a telescopic elastic member 4273 disposed in the body portion 4271 and connected to the telescopic member 4272. The body portion 4271 is connected to the body 421, and the stopper 427 may rotate with the first snap piece 42. The body portion 4271 is cylindrical, the telescopic elastic member 4273 and the telescopic member 4272 are disposed in the body portion 4271, and two telescopic members 4272 are provided and separately abut against two ends of the telescopic elastic member 4273. In this example, the telescopic elastic member 4273 is a telescopic spring. Due to an elastic force of the telescopic elastic member 4273, in a natural state, ends of the two telescopic members 4272 facing away from the telescopic elastic member 4273 extend out of the body portion 4271. When external forces are applied to the ends of the two telescopic members 4272 exposed out of the body portion 4271, the two telescopic members 4272 may overcome the elastic force of the telescopic elastic member 4273, is retracted, and may even be completely hidden in the body portion 4271. Since the first snap piece 42 can spring back, the user needs to continuously control the first snap piece 42 to prevent the first snap piece 42 from springing back and meanwhile lifts up the fan unit 60 to make the fan unit 60 separated from the first snap piece 42, which is inconvenient for the user to operate. Through the preceding arrangement, the stopper 427 is disposed on the first snap piece 42 and may mate with the positioning member 43 to keep the first snap piece 42 at the first position so that the user does not need to manually control the first snap piece 42 to keep the first snap piece 42 at the first position all the time, and it is more convenient to detach the fan unit 60 from the upper cover 33. That is to say, when the first snap piece 42 is at the first position, the interlocking hole is no longer in contact with the snap hook 423, the positioning member 43 and the first snap piece 42 are in an unlockable state, and the first snap piece 42 does not automatically spring back to the second position. In this case, the fan unit 60 can be conveniently removed by the user.

The snap hook 423 is disposed on an inner side of the first snap piece 42, that is, disposed on a side of the first snap piece 42 facing the positioning member 43 and is basically triangular. In this example, two snap hooks 423 are provided and symmetrically disposed at two ends of the body 421. The operating portion 428 is disposed between the two snap hooks 423. The user may toggle the operating portion 428 so that the snap hooks 423 are separated from interlocking holes. Since two snap hooks 423 are provided, two corresponding interlocking holes engaged with the snap hooks 423 are provided and are a first interlocking hole 431 and a second interlocking hole 432 separately. The first interlocking hole 431 and the second interlocking hole 432 are spaced apart from each other, the stopper 427 is disposed between the snap hooks 423, and the stopper 427 is disposed between the first interlocking hole 431 and the second interlocking hole 432. When the first interlocking hole 431 and the second interlocking hole 432 that are spaced apart from each other are located in the clamping groove 331 and separately mate with the snap hooks 423 to lock the fan unit 60 and the upper cover 33, the body portion 4271 is located between the first interlocking hole 431 and the second interlocking hole 432, and a distance between the first interlocking hole 431 and the second interlocking hole 432 is not less than a length of the body portion 4271. A mating surface 433 is provided on a side of each of the first interlocking hole 431 and the second interlocking hole 432 facing the body portion 4271, and a first groove 434 and a second groove 435 are separately provided at a lower end of the mating surface 433, that is, an end of the mating surface 433 facing the first snap piece 42, where the first groove 434 faces an opening direction of the first interlocking hole 431, the second groove 435 faces away from the opening direction of the first interlocking hole 431, and the first groove 434 and the second groove 435 are spaced by a protrusion 436. A distance between protrusions 436 of the first interlocking hole 431 and the second interlocking hole 432 is less than a distance between second grooves 435 of the first interlocking hole 431 and the second interlocking hole 432.

Before the positioning member 43 completely enters the clamping groove 331, the first snap piece 42 is at the second position, the telescopic members 4272 on the positioning member 43 protrude and are exposed out of the body portion 4271 under the elastic force of the telescopic elastic member 4273, and the telescopic members 4272 are away from the protrusions 436 of the first interlocking hole 431 and the second interlocking hole 432. When the positioning member 43 enters the clamping groove 331 from top to bottom, as the positioning member 43 and the snap hooks 423 abut against each other, the positioning member 43 pushes the first snap piece 42 to rotate from the second position to the first position, and the positioning member 43 rotates together with the first snap piece 42. During this process, the telescopic member 4272 remains in a state of extending out of the body portion 4271 and rotates with the first snap piece 42 within the second groove 435 until the telescopic member 4272 rotates to a position of the protrusion 436 and abuts against the protrusion 436. At this time, the first snap piece 42 rotates to the first position and the snap hook 423 no longer abuts against the corresponding interlocking hole. After no longer abutting against the positioning member 43, the first snap piece 42 may automatically spring from the first position back to the second position under the elastic force of the elastic member 44, the telescopic member 4272 rotates from a position where the telescopic member 4272 abuts against the protrusion 436 to an initial position where the telescopic member 4272 is away from the protrusion 436. At the same time, the snap hook 423 is embedded into the interlocking hole on the positioning member 43, so as to achieve the locking between the fan unit 60 and the upper cover 33. During the locking process, the telescopic member 4272 always rotates within the second groove 435 as the first snap piece 42 rotates.

When the fan unit 60 needs to be unlocked from the upper cover 33, the user may pull the first snap piece 42 by the operating portion 428 on the first snap piece 42 to overcome the elastic force of the elastic member 44 and rotate the first snap piece 42 from the second position to the first position until the snap hook 423 completely exits the interlocking hole and the telescopic member 4272 abuts against the protrusion 436. The force continues to be applied to the first snap piece 42 to make the first snap piece 42 continue to rotate, and the telescopic members 4272 rotate together with the first snap piece 42 and are pressed by the protrusions 436 so that the two telescopic members 4272 are retracted into the body portion 4271 against the elastic force of the telescopic elastic member 4273. After the two telescopic members 4272 are no longer pressed by the protrusions 436, the two telescopic members 4272 automatically extend and are exposed out of the body portion 4271 under the elastic force of the telescopic elastic member 4273. At this time, the user stops applying the force to the first snap piece 42, and the first snap piece 42 automatically rotates to the second position under the elastic force of the elastic member 44 until the telescopic member 4272 abuts against the protrusion 436. After the user no longer applies an external force to the first snap piece 42, the telescopic member 4272 can no longer overcome the elastic force of the telescopic elastic member 4273 and be retracted so that the telescopic member 4272 cannot go across the protrusion 436 and enter the second groove 435. The protrusion 436 abuts against the telescopic member 4272 in the first groove 434, thereby keeping the first snap piece 42 at the first position. At this time, an end of the telescopic member 4272 facing away from the telescopic elastic member 4273 remains in the state of extending and being exposed out of the body portion 4271. In this manner, the fan unit 60 can be conveniently removed by the user, and after the user removes the fan unit 60, the first snap piece 44 returns to the second position under the action of the elastic member 44.

To ensure the stability of the connection of the fan unit 60, two snap assemblies need to be provided. More snap assemblies may be provided. In this example, two snap assemblies are provided. Two ends of the fan unit 60 are detachably and fixedly connected to the upper cover 33. The upper cover 33 further includes a third snap assembly 46, where the first snap assembly 41 and the third snap assembly 46 have the same structure. For example, the upper cover 33 is provided with the first snap assembly 41 and the third snap assembly 46 along the left and right direction, and the first snap assembly 41 and the third snap assembly 46 are disposed at two ends of the upper cover 33. The user may lock the fan unit 60 through the first snap assembly 41 and the third snap assembly 46. The user may lock the power tool, the lighting device, the charger, the storage box 31, an adapter, an energy device, a milling station, and the like on the upper cover 33 through the first snap assembly 41 and the third snap assembly 46. The upper cover 33 here does not refer to the upper cover 33 of the storage box 31 alone and may also refer to the upper cover 33 of the storage bin 311 or the compartment box 312 locked on the storage box 31. Since the structure and principle of the first snap assembly 41 are similar to the structure and principle of the third snap assembly 46, the locking method and operation method of the third snap assembly 46 are not described in detail herein. It is to be noted that the structure of a combination of the first snap assembly 41 and the third snap assembly 46 for locking the power tool, the lighting device, the storage box 31, the charger, the energy device, the adapter, and the milling station is the preceding interlocking device 40.

As another example, the specific structures of the first snap assembly 41 and the third snap assembly 46 may be different. To distinguish the third snap assembly 46 from the first snap assembly 41, the third snap assembly is referred to as the second snap assembly 45 here, where the first snap assembly 41 and the second snap assembly 45 mate for locking the fan unit 60, that is, each of the first snap assembly 41 and the second snap assembly 45 locks one end of the fan unit 60.

Figure 26:
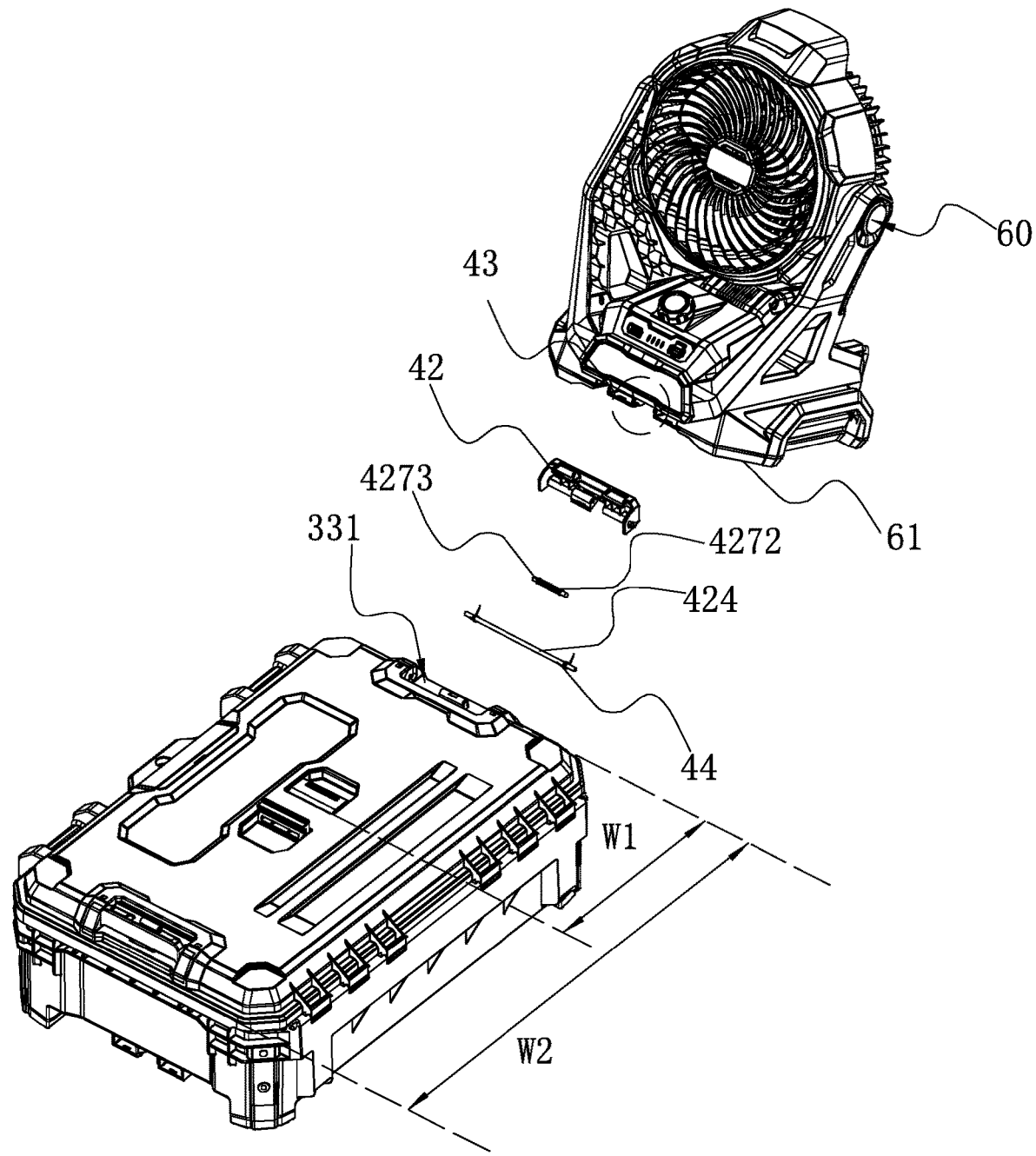
FIG. 26 is an exploded view of a first snap assembly in the toolbox system shown in FIG. 25.
Figure 27:
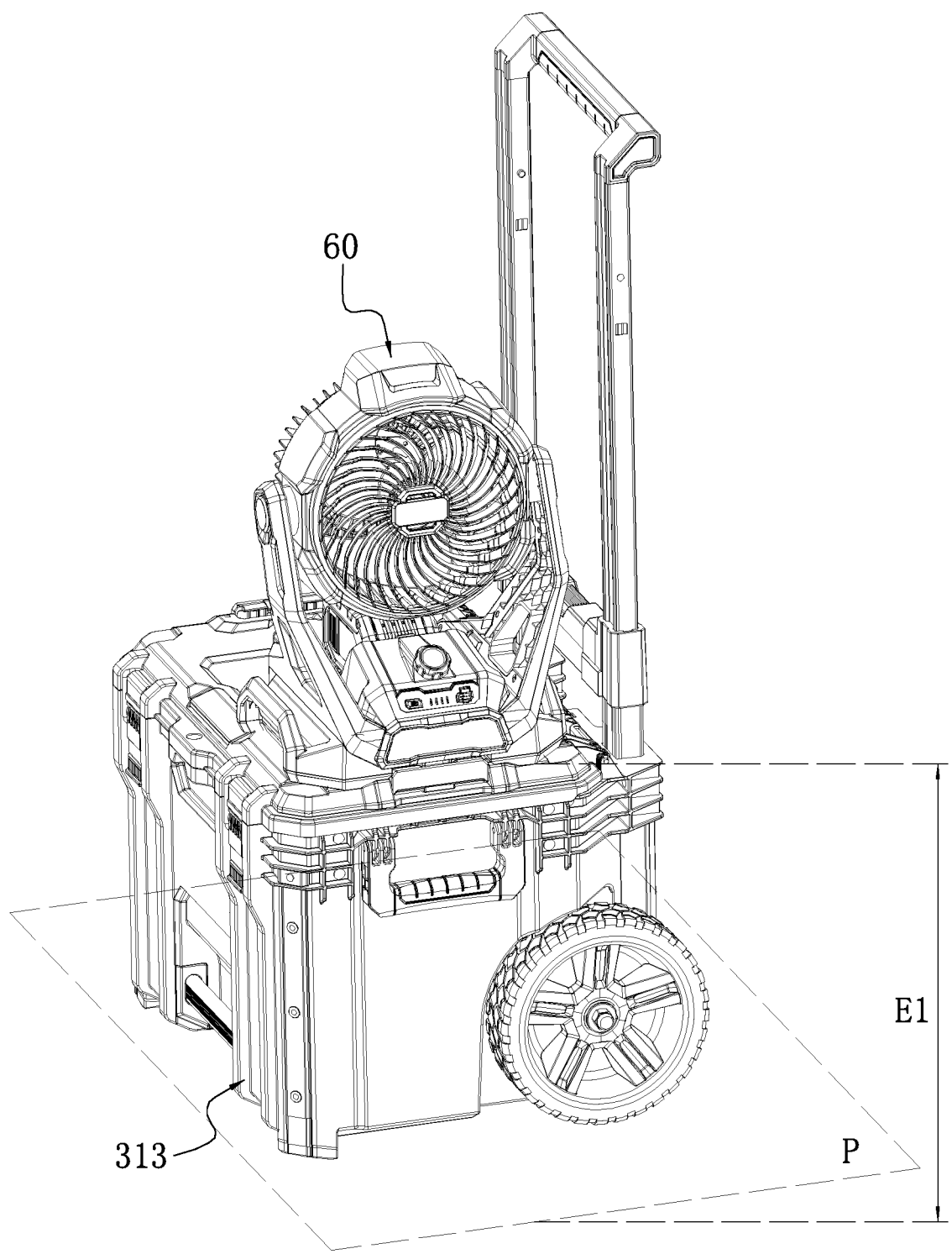
FIG. 27 illustrates that the fan unit in FIG. 25 is mounted to the storage box.
Figure 28:
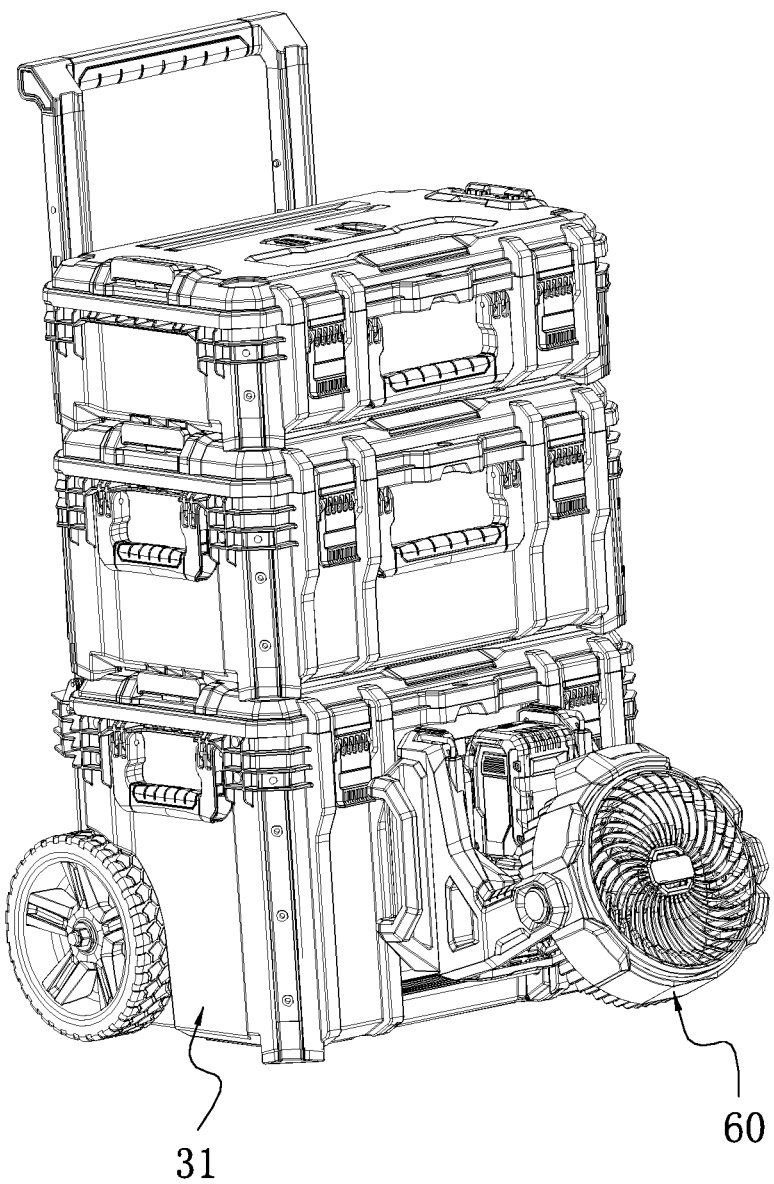
FIG. 28 is a schematic view illustrating that a fan unit is mounted on a sidewall of a storage box.

As shown in FIGS. 25 and 26, a distance between the first snap assembly 41 and the second snap assembly 45 along an extension direction of the upper cover 33 is defined as a first distance W1, a length of the upper cover 33 along the extension direction of the upper cover 33 is defined as a second distance W2, and a ratio of the first distance W1 to the second distance W2 is greater than or equal to 0.4 and less than or equal to 1. The first snap assembly 41 is disposed at an end of the upper cover, and the ratio of the distance between the second snap assembly 45 and the first snap assembly 41 to the length of the upper cover 33 is set to be within the preceding range, that is to say, the second snap assembly 45 may be disposed in the middle, at an end, or at multiple positions of the upper cover 33. As an example, multiple snap assemblies with different distances may be provided on the upper cover so that the user may select the snap assemblies with different distances according to requirements, a dimension of a tool, and the like, thereby facilitating the operation of the user.

The second snap assembly 45 includes a stop 452 and a rotary member 451. The rotary member 451 is connected to the upper cover 33 of the storage box 31, and the rotary member 451 is rotatable relative to the upper cover 33. The stop 452 is fixedly connected to or integrally formed with the fan unit 60. In this example, the fan unit 60 is integrally formed with the stop 452, that is, the stop 452 is part of the fan unit 60. Both the stop 452 and the positioning member 43 are disposed on the fan unit 60 and adjacent to the contact surface 61. It is to be understood that the user may lock the power tool, the lighting device, the charger, the storage box 31, the adapter, the energy device, the milling station, and the like on the upper cover 33 through the first snap assembly 41 and the second snap assembly 45, and the principle, structure, and operation manner are the same as those of the fan unit 60. The first snap assembly 41 and the second snap assembly 45 mate for locking the fan unit 60, and the rotary member 451 is rotatable relative to the upper cover 33, that is, the rotary member 451 has an open state and a closed state, and the user may toggle the rotary member 451 so that the rotary member 451 switches between the open state and the closed state. When the rotary member 451 is in the closed state, the rotary member 451 is lower than or flush with a surface of the upper cover 33. When the rotary member 451 is in the open state, the rotary member 451 is at least partially higher than the surface of the upper cover 33.

When the fan unit 60 is completely locked on the upper cover 33, the rotary member 451 is in the open state and the first snap piece 42 is at the second position. To lock the fan unit 60 to the upper cover 33, the user needs to toggle the rotary member 451 to the open state and incline a side of the stop 452 on the fan unit 60 downward to abut against the rotary member 451. At this time, a side of the positioning member 43 on the fan unit 60 is inclined and lifted up. After the stop 452 and the rotary member 451 abut against each other in place, the user may release the fan unit 60, and the fan unit 60 may interlock the first snap piece 42 and the positioning member 43 by using the gravity of the fan unit 60. To unlock the fan unit 60 from the upper cover 33, the first snap piece 42 is simply toggled to be at the first position so that the fan unit 60 can be removed from the upper cover 33.

Figure 49:
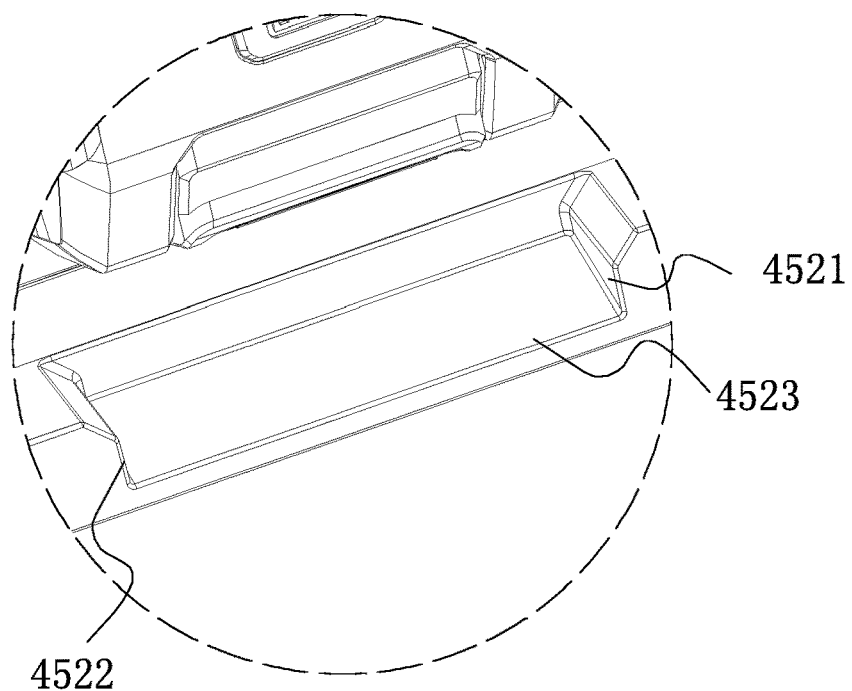
FIG. 49 is a partial enlarged view of the schematic view shown in FIG. 25.
Figure 50:
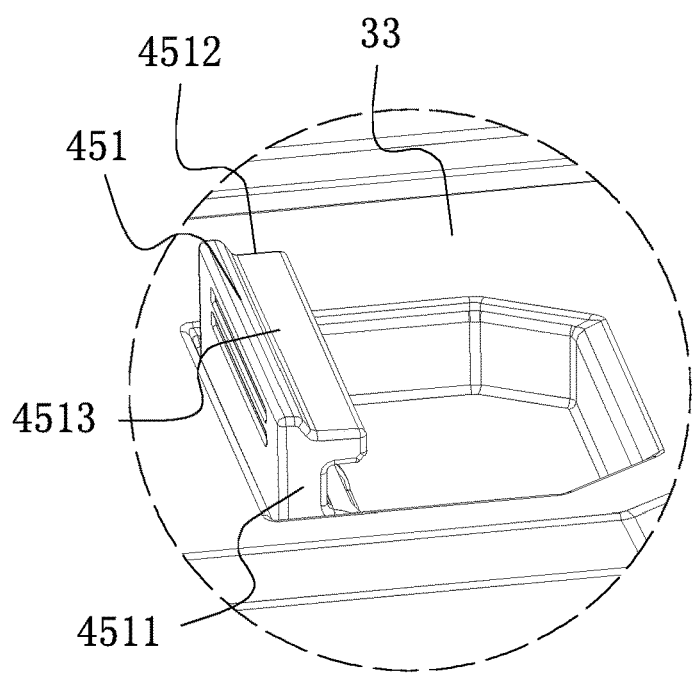
FIG. 50 is a partial enlarged view of the schematic view shown in FIG. 25.

Referring to FIGS. 49 and 50, the stop 452 includes a first abutting portion 4521, a second abutting portion 4522, and a third abutting portion 4523 disposed between the first abutting portion 4521 and the second abutting portion 4522, where the first abutting portion 4521 and the second abutting portion 4522 are fixedly connected to or integrally formed with the third abutting portion 4523, the first abutting portion 4521 and the second abutting portion 4522 are disposed on two sides of the third abutting portion 4523, and the first abutting portion 4521 and the second abutting portion 4522 are at least partially higher than the third abutting portion 4523, that is, a concave groove is formed between the first abutting portion 4521, the third abutting portion 4523, and the second abutting portion 4522. The rotary member 451 includes a first limiting portion 4511 and a second limiting portion 4512 opposite to each other and a third limiting portion 4513 disposed between the first limiting portion 4511 and the second limiting portion 4512, where the first limiting portion 4511 and the second limiting portion 4512 are fixedly connected to or integrally formed with the third limiting portion 4513, the first limiting portion 4511 and the second limiting portion 4512 are disposed on two sides of the third limiting portion 4513, and the third limiting portion 4513 at least partially protrudes from an upper surface of the upper cover 33, that is, the first limiting portion 4511, the third limiting portion 4513, the second limiting portion 4512, and at least part of the upper cover 33 form a semi-enclosed groove so that the stop 452 and the rotary member 451 abut against each other when the stop 452 is in contact with the rotary member 451. When the fan unit 60 is locked on the upper cover 33, at least part of the rotary member 451 is located in the groove formed by the stop 452, and the rotary member 451 limits the stop 452 so that the fan unit 60 is prevented from being separated from the upper cover 33 when the fan unit 60 wobbles due to an external force.

In the present application, a distance between the rotary member 451 and the first snap piece 42 along the left and right direction is less than a length of the upper cover 33 along the left and right direction. It is also to be understood that the rotary member 451 is disposed in a region between the two ends of the upper cover 33. In this manner, the snap assemblies may be provided at the two ends of the upper cover 33, that is, the second snap assembly 45 is disposed between the first snap assembly 41 and the third snap assembly 46. A fourth snap assembly with the same structure as the second snap assembly 45 may be provided. Similarly, the fourth snap assembly is disposed between the first snap assembly 41 and the third snap assembly 46. In this manner, the first snap assembly 41 and the second snap assembly 45 mate for locking, the third snap assembly 46 and the fourth snap assembly mate for locking, and the first snap assembly 41 and the third snap assembly 46 mate for locking. Through the preceding arrangement, the user can lock the power tool, the lighting device, the charger, the storage box 31, the adapter, the energy device, the milling station, and the like on the upper cover 33 according to requirements.

Further, a ratio of the distance between the rotary member 42 and the first snap piece 42 along the left and right direction to the distance of the upper cover 33 along the left and right direction is greater than or equal to 0.4 and less than or equal to 0.6, that is, the distance between the rotary member 451 and the first snap piece 42 along the left and right direction substantially occupies half of the upper cover 33 so that the overall layout is reasonable.

As shown in FIGS. 31 to 42, the upper cover 33 is pivotally connected to the housing 32 of the storage box 31. That is, the upper cover 33 is rotatable relative to the housing 32 of the storage box 31, and the upper cover 33 has at least an open position and a closed position during rotation. When the upper cover 33 is at the open position, the housing 32 of the storage box 31 is in an open state. When the upper cover 33 is at the closed position, the housing 32 of the storage box 31 is in a closed state. When the upper cover 33 is at the open position, the user may see the inside of the storage box 31 and may store the item in the storage box 31 or remove the item from the storage box 31.

The toolbox system 100 further includes an interposer assembly 70 for connecting the item. The interposer assembly 70 is detachably and fixedly connected into the storage box 31. The interposer assembly 70 includes a connector 71 and an interposer 72, where at least one interposer 72 can be detachably mounted to the connector 71. Multiple interposers 72 may be provided. The interposer 72 includes one of or a combination of a charger insert 73, a battery pack insert 74, a tool pouch insert, a tool insert, an accessory insert, and a tool accessory box insert 75, that is, the interposer 72 is used for connecting a charger, a battery pack, a tool pouch, a tool, an accessory, and a tool accessory box. The connector 71 is fixedly connected to or integrally formed with the storage box 31.

As an example, the connector 71 is detachably and fixedly connected to the storage box 31. The interposer 72 is detachably and fixedly connected to the connector 71. The interposer 72 includes an access portion 721 and an outlet portion 722, where the outlet portion 722 is capable of detachably connecting the charger, the accessory, the tool accessory box, the tool pouch, the tool, and the battery pack, and the outlet portion 722 is used for mating with the connector 71. As another example, the connector 71 is integrally formed with the storage box 31, that is, the connector 71 is formed by the storage box 31. In this manner, the interposer 72 may be fixed directly to the storage box 31. In the present application, the connector 71 is detachably and fixedly connected to the storage box 31. It is to be noted that the structure described below is also applicable to the connector 71 and the storage box 31 integrally formed. The interposer assembly 70 further includes the fastener 53, where the connector 71 is fixedly connected to the storage box 31 through the fastener 53, and the fastener 53 may be one or more of the screw, the latch, the rivet, and the movable snap. Similarly, the interposer 72 may be fixedly connected to the connector 71 through the fastener 53, that is to say, the interposer assembly 70 includes multiple fasteners 53. As another example, the interposer 72 is integrally formed with the charger, the battery pack, the tool pouch, the tool, the accessory, and the tool accessory box, that is, it is to be understood that the charger, the battery pack, the tool pouch, the tool, the accessory, and the tool accessory box are directly formed with the outlet portion 722 for mating with the connector 71.

In this manner, the user can directly fix the charger, the battery pack, the tool pouch, the tool, the accessory, and the tool accessory box to the connector 71 without separately mounting a part.

The connector 71 is fixedly mounted onto the upper cover 33 of the storage box 31 and includes an adapter portion 711 for mating with the access portion 721 of the interposer 72, so as to detachably fix the interposer 72 to the connector 71. Multiple adapter portions 711 may be provided on the connector 71, that is, at least one interposer 72 may be mounted on the connector 71. In this example, multiple interposers 72 may be mounted on the connector 71. As another example, the connector 71 may be fixedly connected to the sidewall of the storage box 31, that is, the connector 71 is fixedly connected to the sidewall. Similarly, at least one interposer 72 may be mounted on the connector 71.

As described above, the interposer 72 includes the charger insert 73, where the charger insert 73 has a first connection state 731 and a second connection state 732. When the charger insert 73 is in the first connection state 731, a first type of charger is connectable to the charger insert 73. When the charger insert 73 is in the second connection state 732, a second type of charger is connectable to the charger insert 73. The first type of charger and the second type of charger have different sizes. That is to say, different types of chargers can be mounted to the charger insert 73 when the charger insert 73 is in different states. The toolbox system 100 has multiple types of power tools, and battery packs of different types and with different capacities are bound to exist so that different types of chargers need to be prepared to charge different types of battery packs. The charger insert 73 with multiple states is provided for mounting different types of chargers, thereby avoiding the need to provide multiple charger inserts 73 of different types and simplifying the structure. It is to be noted that the charger in the present application can charge multiple battery packs at the same time.

Clamping ends are provided on the charger insert 73 and used for connecting the charger. For example, a first clamping end 7331 and a second clamping end 7341 are provided on the charger insert 73 and mate for fixing the charger. When the charger insert 73 is in the first connection state 731, a first length exists between the first clamping end 7331 and the second clamping end 7341. When the charger insert 73 is in the second connection state 732, a second length exists between the first clamping end 7331 and the second clamping end 7341, where the first length is greater than the second length, that is, when the charger insert 73 is in different states, chargers of different sizes can be mounted to the charger insert 73. The charger inserts 73 in different states can be mounted on the connector 71, that is to say, chargers of different sizes may be mounted on the connector 71 at the same time. The chargers mounted on the connector 71 can charge the battery packs in the toolbox system 100.

The charger insert 73 includes a first charger insert 733 and a second charger insert 734, where the first charger insert 733 and the second charger insert 734 are movable relative to each other so that the charger insert 73 switches between the first connection state 731 and the second connection state 732. In this example, the charger insert 73 is mounted onto the connector 71 by the screw, that is, the fastener 53 may be the screw. Access portions 721 on the first charger insert 733 and the second charger insert 734 may be screw holes, multiple holes are provided on the first charger insert 733 and the second charger insert 734, and the user penetrates screws through the holes to fix the charger insert 73 on the connector 71. For the switching of different states of the charger insert 73, the user adjusts the state of the charger insert 73 according to requirements and then fixedly connects the charger insert 73 in the adjusted state to the connector 71.

The clamping end is provided on each of the first charger insert 733 and the second charger insert 734. For example, the first charger insert 733 is fixedly connected to or integrally formed with the first clamping end 7331, and similarly, the second charger insert 734 is fixedly connected to or integrally formed with the second clamping end 7341, that is, the first clamping end 7331 moves with the first charger insert 733, and similarly, the second clamping end 7341 moves with the second charger insert 734. In this manner, when the user switches the states, the user can switch the states of the charger insert 73 by simply driving the first charger insert 733 or the second charger insert 734. For example, the first charger insert 733 is formed with a guide groove 7332 for guiding the second charger insert 734 to move along a first sliding direction, and the second charger insert 734 is formed with a slide portion 7342, where the slide portion 7342 can be driven to slide in the guide groove 7332. The guide groove 7332 is provided with a first blocking portion 7333 and a second blocking portion 7334 on a sliding path of the slide portion 7342. An abutting portion 7343 is provided on the slide portion 7342 and mates with the first blocking portion 7333 and the second blocking portion 7334. When the first blocking portion 7333 mates with the abutting portion 7343, the charger insert 73 remains in the second connection state 732, and the first blocking portion 7333 is used for keeping the first charger insert 733 and the second charger insert 734 connected so as to prevent the first charger insert 733 from being separated from the second charger insert 734. When the second blocking portion 7334 mates with the abutting portion 7343, the charger insert 73 remains in the first connection state 731. For example, the first blocking portion 7333 and the second blocking portion 7334 are fixedly connected to or integrally formed with the first charger insert 733. The first blocking portion 7333 and the second blocking portion 7334 are both protrusions basically perpendicular to the first charger insert 733. The first blocking portion 7333 is provided with a first blocking surface 7335, and the second blocking portion 7334 is provided with a second blocking surface 7336. When the abutting portion 7343 is in contact with the first blocking surface 7335, the charger insert 73 is in the second connection state 732. When the second blocking surface 7336 is in contact with the abutting portion 7343, the charger insert 73 is in the first connection state 731.

The first charger insert 733 further includes an elastic button 7337 drivable by the user. For example, when the charger insert 73 is in the second connection state 732, the user may press the elastic button 7337, the abutting portion 7343 is separated from the first blocking surface 7335, the user may hold the second charger insert 734 and pull the second charger insert 734 out, and the abutting portion 7343 is separated from the first blocking portion 7333 and moves toward the second blocking portion 7334 until the abutting portion 7343 is in contact with the second blocking surface 7336, so that the charger insert 73 is in the first connection state 731, thereby switching the charger insert 73 from the second connection state 732 to the first connection state 731. When the user needs to switch the charger insert 73 to the second connection state 732, the user only needs to push the second charger insert 734 inward until the abutting portion 7343 is in contact with the first blocking surface 7335.

As for mounting manners of the charger insert 73 in different states, one example is that the user adjusts the charger insert 73 to a different state and then fixedly mounts the charger insert 73 onto the connector 71 with the screw. The charger insert 73 may be directly fixedly mounted onto the upper cover 33 or the sidewall. As another example, the user may fix the charger insert 73 to the connector 71, the upper cover 33, or the sidewall, and when the charger needs to be connected, the user may adjust the state of the charger insert 73 according to requirements, so as to adapt to different chargers.

The interposer 72 further includes the tool accessory box insert 75 fixedly connected to or integrally formed with the tool accessory box. In this example, the tool accessory box insert 75 is integrally formed with the tool accessory box. One of the tool accessory box and the adapter portion 711 is provided with an embedded groove and the other one of the tool accessory box and the adapter portion 711 is provided with a flexible member, where the flexible member is insertable into the embedded groove so that the tool accessory box and the adapter portion 711 are fixed. As shown in FIGS. 31, 32, 43, 44, 47, and 48, the interposer 72 further includes the battery pack insert 74. In the present application, the battery pack insert 74 has the same structure as the preceding battery pack hanger 521, that is, it is to be understood that the preceding battery pack hanger 521 may be fixedly disposed in the storage box 31. That is, the structural description of the battery pack hanger 521 is applicable to the battery pack insert 74, which is not described here, and other structures of the battery pack insert 74 are described below.

Referring to FIG. 2, the toolbox system 100 further includes a battery pack mounting portion 76 for detachably connecting the battery pack insert 74. The battery pack mounting portion 76 may be disposed outside the accommodation cavity 310 or disposed inside the accommodation cavity 310, that is, it is to be understood that the battery pack insert 74 may be mounted outside the accommodation cavity 310 or mounted inside the accommodation cavity 310.

The battery pack mounting portion includes a positioning device 80 for detachably fixing the battery pack insert 74. The positioning device is used for guiding the battery pack insert 74 to be detachably connected into the accommodation cavity 310 along a first guiding direction 105. In this example, the positioning device 80 is used for guiding the battery pack insert 74 to be detachably fixed into the accommodation cavity 310 along the up and down direction and includes a first positioning assembly 81 and a second positioning assembly 82, where the first positioning assembly 81 and the second positioning assembly 82 mate with each other for fixing the battery pack insert 74. The first positioning assembly 81 limits the downward movement of the battery pack insert 74 and the second positioning assembly 82 limits the upward movement of the battery pack insert 74 in a case where the battery pack insert 74 is not driven by an external force. In this manner, the battery pack insert 74 mounted in the accommodation cavity 310 does not wobble during the movement and transportation of the toolbox system 100, thereby preventing the battery pack mounted on the battery pack insert 74 from being dropped due to the wobble and damaged and ensuring the stability of the connection of the battery pack insert 74 in the accommodation cavity 310.

The battery pack insert 74 may be mounted on any sidewall of the storage box 31 or may be mounted on multiple sidewalls or the upper cover. For ease of description, the right sidewall 326 of the storage box 31 is described in detail as an example, that is, the battery pack insert 74 is mounted on the right sidewall 326.

The first positioning assembly 81 includes at least a pair of a first connection end 811 and a second connection end 812 mating with each other, where one of the first connection end 811 and the second connection end 812 is fixedly connected to or integrally formed with the right sidewall 326 and the other one of the first connection end 811 and the second connection end 812 is fixedly connected to or integrally formed with the battery pack insert 74. To ensure the stability of the connection, the first positioning assembly 81 is provided with two pairs of connection ends mating with each other, and the structures of the two pairs of connection ends are consistent. To avoid repeated description, only one pair of connection ends are described here as an example. The first positioning assembly 81 further includes a support element 813, where the support element 813 is fixedly connected to the right sidewall 326, the support element 813 is fixedly connected to or integrally formed with the first connection end 811, the first connection end 811 is formed with a support groove 8111, the battery pack insert 74 is connected to the second connection end 812, the second connection end 812 is bent outward to form an overhang 8121, a width of the support groove is greater than a width of the overhang 8121, the overhang 8121 may be hung into the support groove 8111, a length direction of the support groove 811 extends along the up and down direction, and the support groove 8111 is used for guiding the overhang 8121 to move along the first guiding direction 105. The user may insert the overhang 8121 of the battery pack insert 74 into the support groove 8111 along the up and down direction. When a top surface of the support groove is in contact with a bottom surface of the overhang 8121, the overhang 8121 stops moving downward so that the battery pack insert 74 is preliminarily fixed in the accommodation cavity 310.

As an example, the second positioning assembly 82 includes at least a pair of a first positioning end 821 and a second positioning end 822 mating with each other, where one of the first positioning end 821 and the second positioning end 822 is disposed on the right sidewall 326 and the other one of the first positioning end 821 and the second positioning end 822 is disposed on the battery pack insert 74. To ensure the stability of the connection, the second positioning assembly 82 is provided with two pairs of positioning ends mating with each other, and the structures of the two pairs of positioning ends are consistent. To avoid repeated description, only one pair of positioning ends are described here as an example. The first positioning end 821 is disposed on the support element 813, and the second positioning end 822 is disposed on the battery pack insert 74. When the overhang 8121 is connected to the support groove 8111, the first positioning end 821 is in contact with the second positioning end 822, and the first positioning end 821 limits the upward movement of the battery pack insert 74. The first positioning end 821 is formed by the support element 813, and the second positioning end 822 is formed by the battery pack insert 74. For example, the first positioning end 821 is an elastic protrusion 823 formed by the support element 813, and the second positioning end 822 is an upper surface 824 of the battery pack insert 74. When the overhang 8121 is connected to the support groove 8111, the elastic protrusion 823 abuts against the upper surface 824 of the battery pack insert 74, thereby limiting the upward movement of the battery pack insert 74. When the user wants to lift up the battery pack insert 74, the battery pack insert 74 can be removed from the right sidewall 326 by continuing lifting up the battery pack insert 74 against an abutting force of the elastic protrusion 823. Similarly, when the user wants to mount the battery pack insert 74 onto the right sidewall 326, a force needs to be applied to the elastic protrusion 823 to deform the elastic protrusion 823. When the battery pack insert 74 is mounted in place, the elastic protrusion 823 is restored so that the elastic protrusion 823 just abuts against the upper surface 824.

Figure 43:
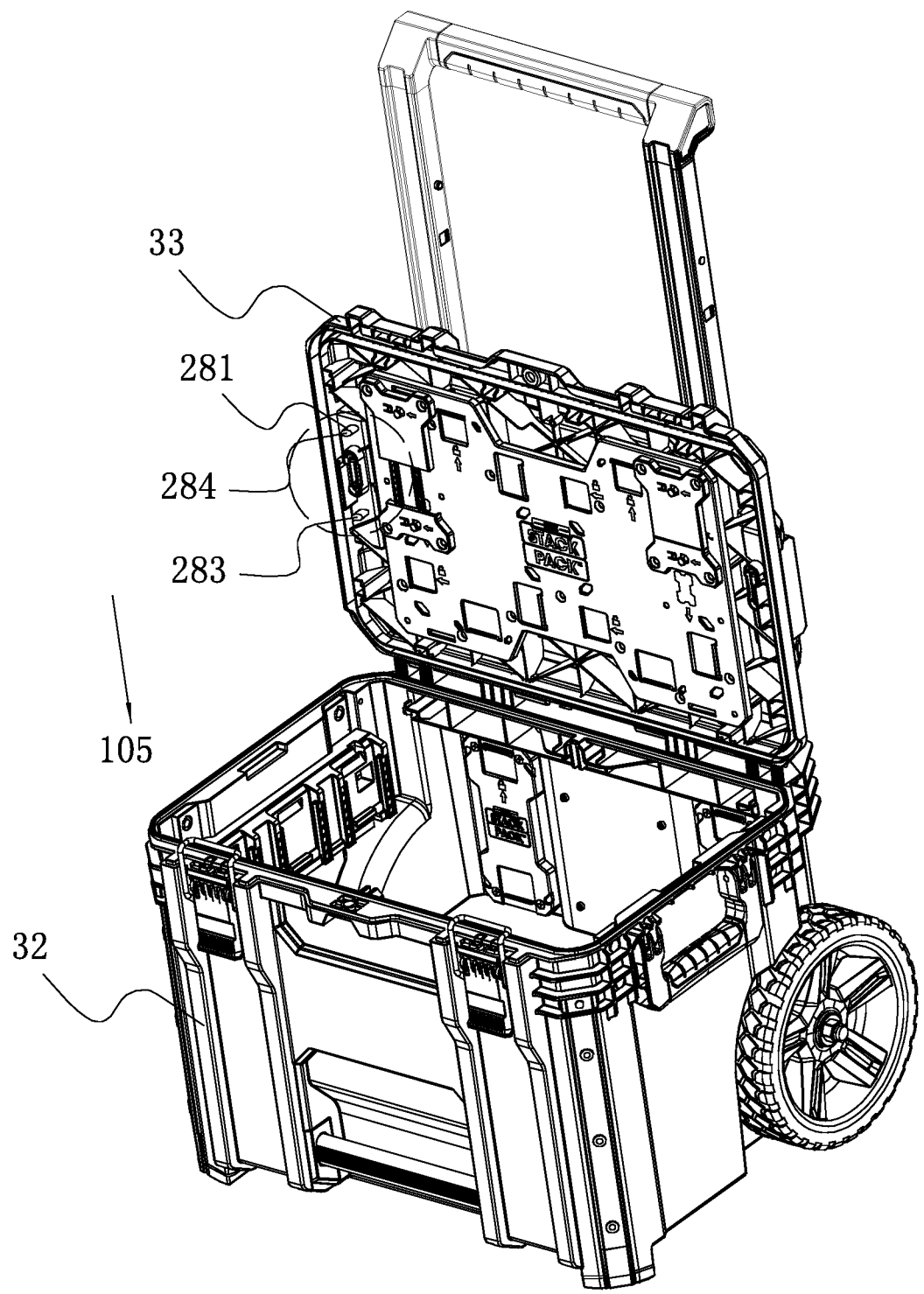
FIG. 43 is a perspective view of another example of a second positioning assembly.
Figure 47:
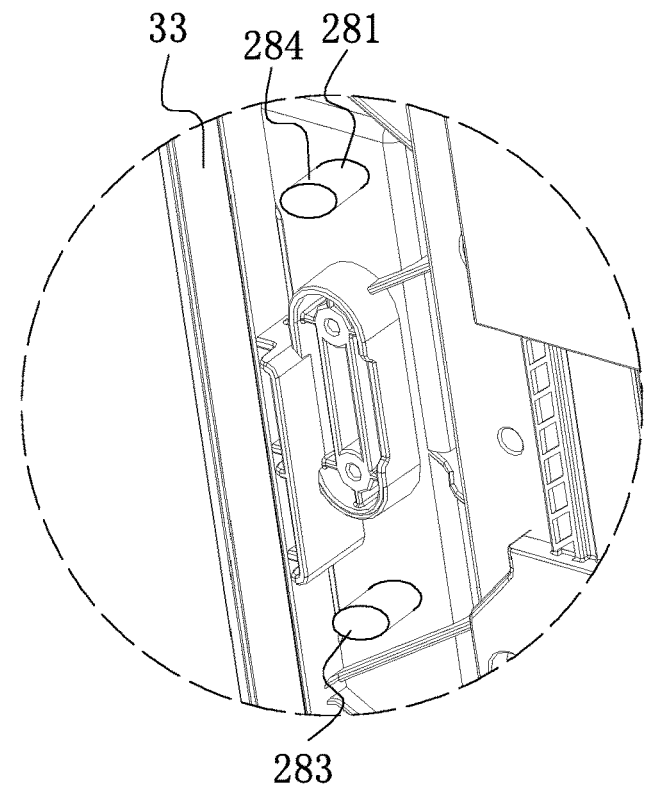
FIG. 47 is a partial enlarged view of the perspective view shown in FIG. 43.

As shown in FIGS. 43 and 47, as another example, a second positioning assembly 281 includes at least a pair of a first positioning end and a second positioning end 283 mating with each other, where one of the first positioning end and the second positioning end 283 is disposed on the right sidewall and the other one of the first positioning end and the second positioning end 283 is disposed on the battery pack insert. Similarly, to ensure the stability of the connection, the second positioning assembly 281 is provided with two pairs of positioning ends mating with each other, and the structures of the two pairs of positioning ends are consistent. To avoid repeated description, only one pair of positioning ends are described here as an example. One of the first positioning end and the second positioning end 283 is fixedly connected to or integrally formed with the upper cover and the other one of the first positioning end and the second positioning end 283 is fixedly connected to or integrally formed with the battery pack insert. When the upper cover is at the closed position, the first positioning end and the second positioning end 283 abut against each other and limit the upward movement of the battery pack insert, thereby ensuring the stability of the connection of the battery pack insert. For example, the upper cover is provided with an elastic protrusion 284. When the upper cover rotates to the closed position, the elastic protrusion 284 abuts against the upper surface of the battery pack insert, so as to limit the upward movement of the battery pack insert. In this manner, the battery pack insert is prevented from being dropped due to the wobble in the process of carrying and transporting the toolbox system. When the upper cover rotates to the open position, the elastic protrusion 284 is separated from the upper surface of the battery pack insert so that the user can conveniently detach the battery pack insert from the right sidewall.

Figure 44:
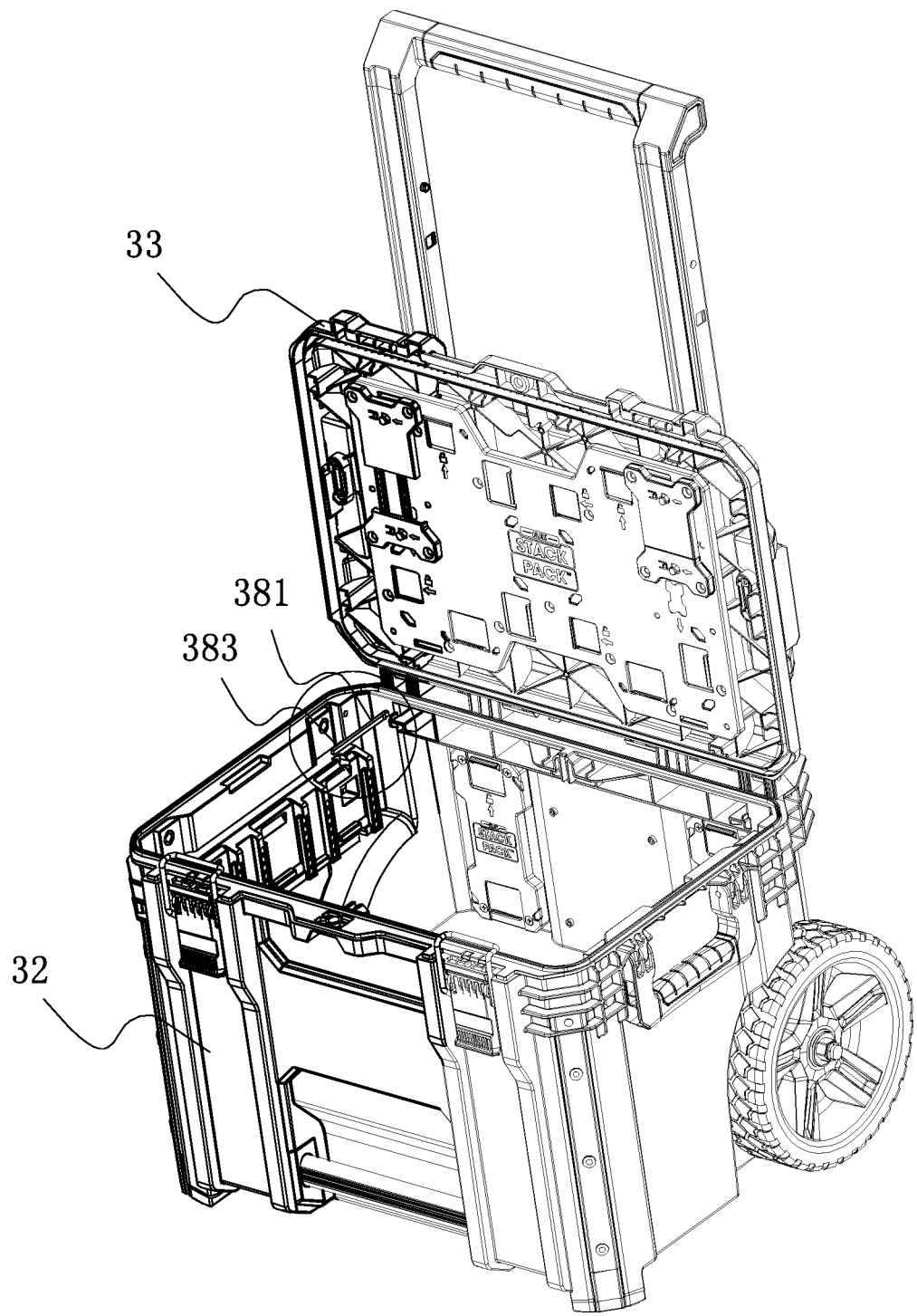
FIG. 44 is a perspective view of another example of a second positioning assembly.
Figure 45:
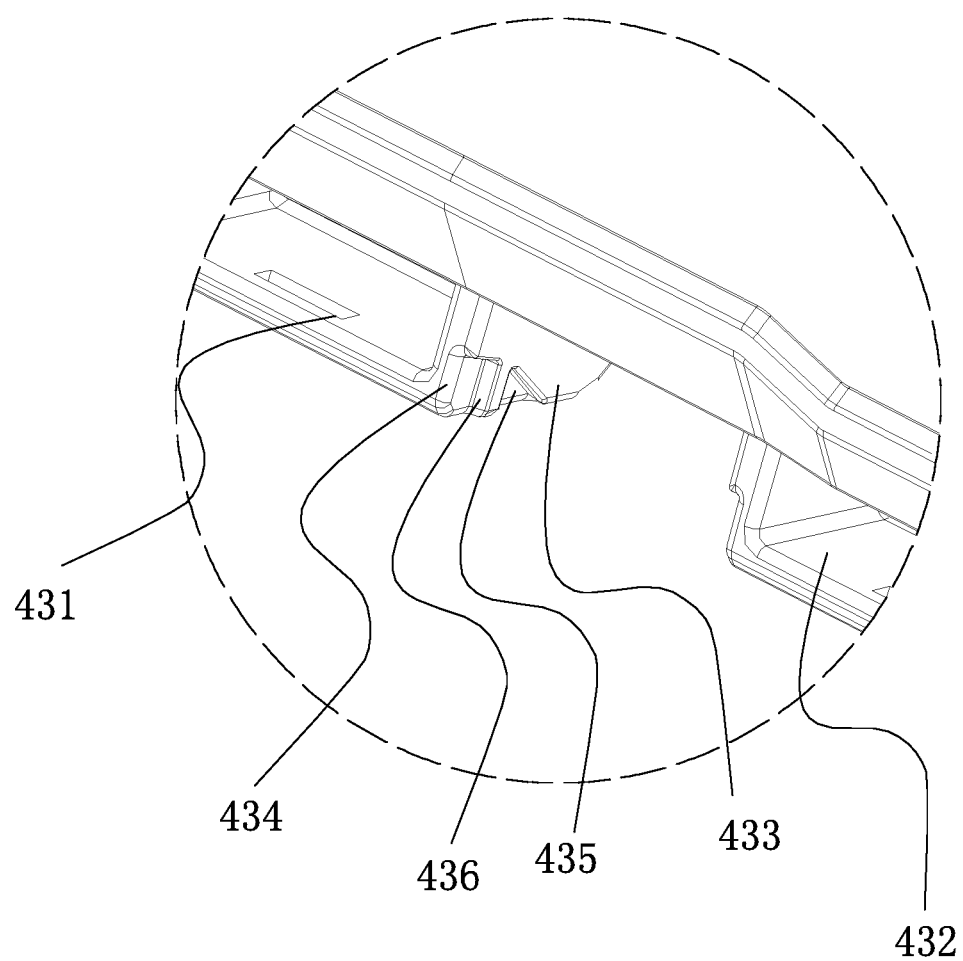
FIG. 45 is a partial enlarged view of the exploded view shown in FIG. 26.
Figure 46:
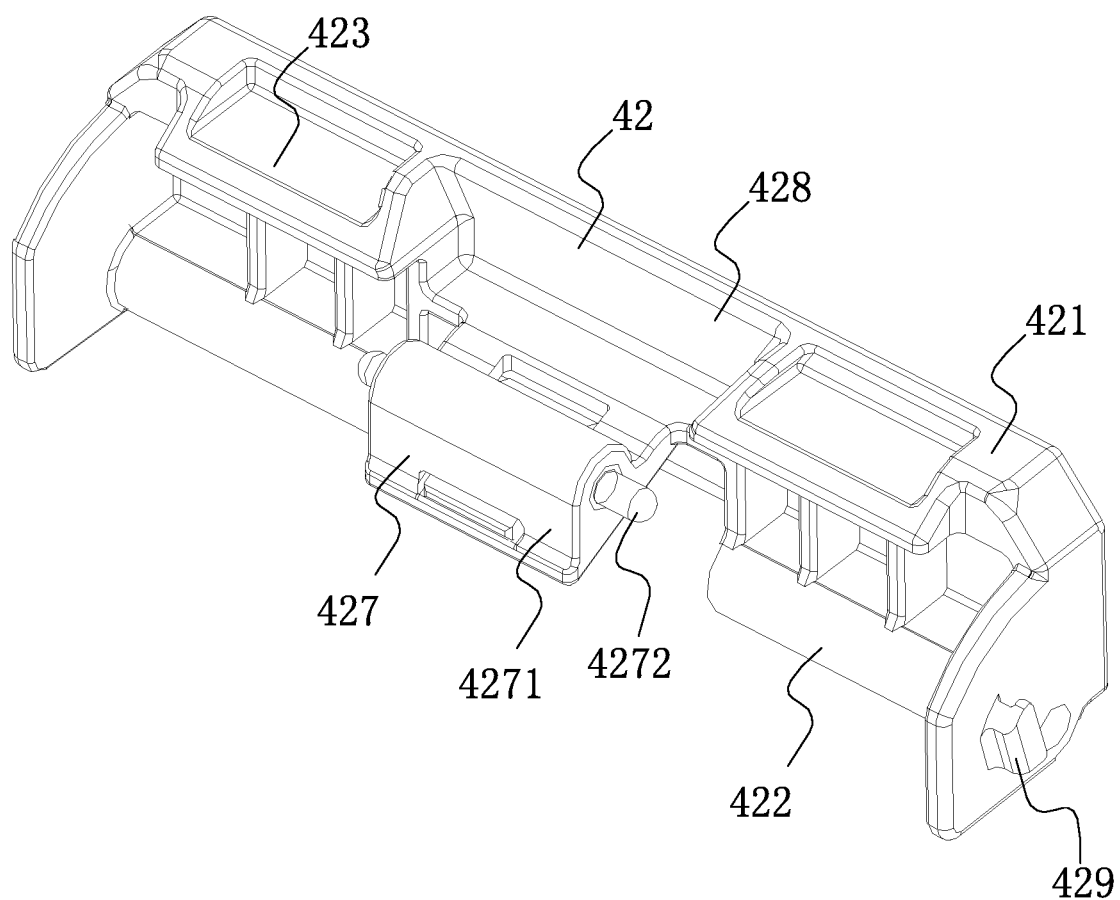
FIG. 46 is a perspective view of a first snap piece.
Figure 48:
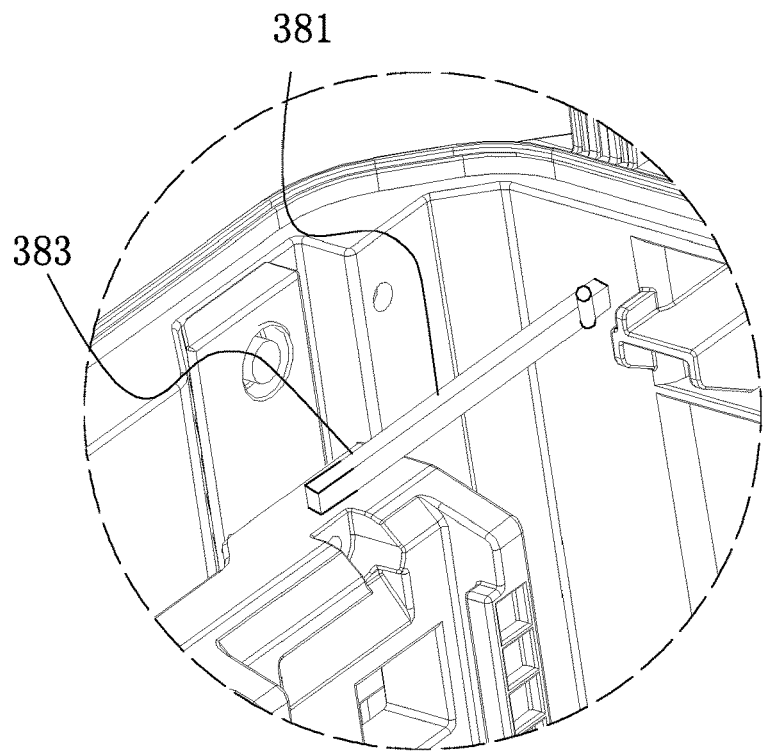
FIG. 48 is a partial enlarged view of the perspective view shown in FIG. 44.

As shown in FIGS. 44 and 48, as another example, a second positioning assembly 381 includes at least a pair of a first positioning end and a second positioning end 383 mating with each other, where one of the first positioning end and the second positioning end 383 is disposed on the right sidewall and the other one of the first positioning end and the second positioning end 383 is disposed on the battery pack insert. Similarly, to ensure the stability of the connection, the second positioning assembly 381 is provided with two pairs of positioning ends mating with each other, and the structures of the two pairs of positioning ends are consistent. To avoid repeated description, only one pair of positioning ends are described here as an example. The first positioning end is fixedly connected to the sidewall adjacent to the right sidewall, and the second positioning end 383 is fixedly connected to or integrally formed with the battery pack insert. Further, the first positioning end is disposed on the rear sidewall, and the second positioning end 383 is disposed on the battery pack insert. For example, the first positioning end is connected to a first snap portion, the first snap portion is movable relative to the rear sidewall, and the second positioning end 383 is connected to a second snap portion. When the top surface of the support groove is in contact with the bottom surface of the overhang, the user drives the first snap portion to be engaged with the second snap portion on the battery pack insert, thereby limiting the upward movement of the battery pack insert, so that the battery pack insert is prevented from being dropped due to the wobble in the process of carrying and transporting the toolbox system. When the user needs to detach the battery pack insert, the user only needs to toggle the first snap portion to separate the first snap portion from the second snap portion. To ensure the stability of the connection, a first positioning end 382 and a second positioning end with the same structures are generally provided on the rear sidewall.

Figure 51:
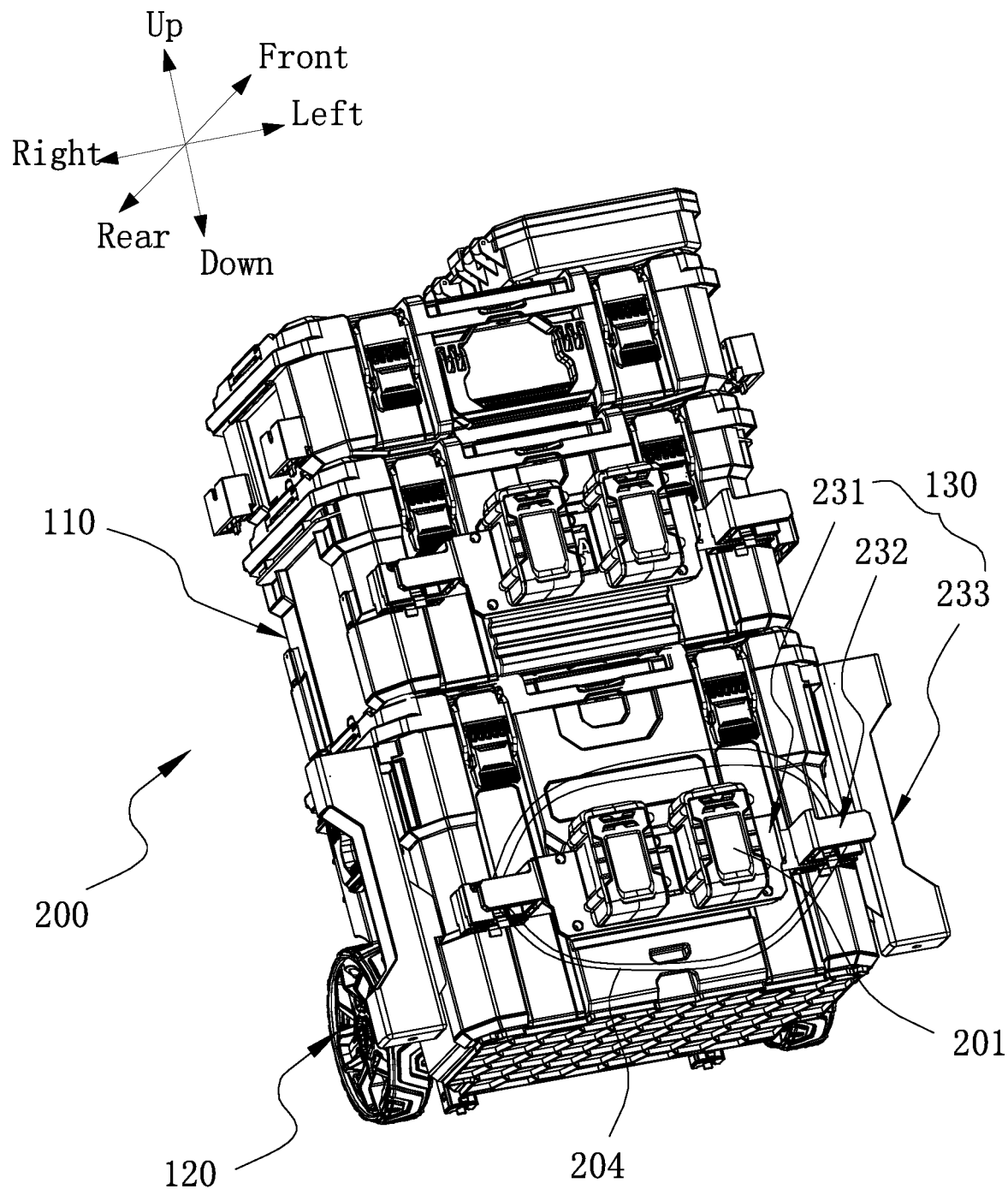
FIG. 51 is a schematic view of another example of a toolbox system according to the present application.
Figure 52:
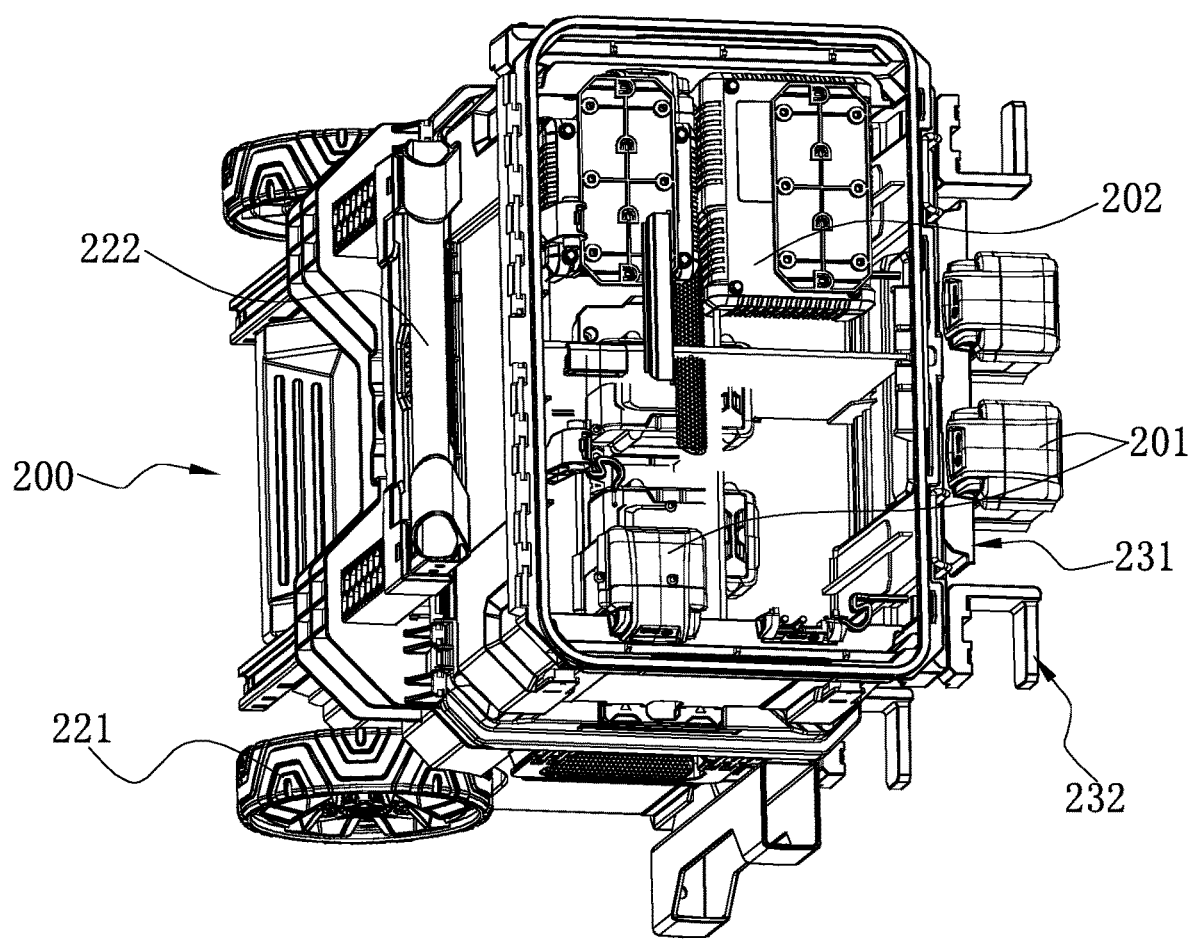
FIG. 52 is a structural view of the toolbox system in FIG. 51 from another perspective.

As another example, as shown in FIG. 51, a storage box 200 includes a housing 110, a moving assembly 120, and an external hanger 130. The housing 110 has an accommodation space for accommodating a tool. The moving assembly 120 is provided on the housing 110 and used for moving the storage box 200. Referring to FIG. 52, the moving assembly 120 includes rollers 221 and a push handle 222, where the push handle 222 is telescopic along an up and down direction. When the storage box 200 needs to be moved, the push handle 222 is pulled upward, that is, the storage box 200 may be pulled by the push handle 222. When the push handle 222 does not need to be used, the push handle 222 may be retracted. Optionally, the moving assembly 120 is not provided with the rollers. The external hanger 130 is detachably limited on the housing 110 through a limiting surface 260 formed on a surface of the housing 110, and/or the external hanger 130 is fixed on the housing 110 by a fastener. A tool such as a power tool, a battery pack 201, a cable 204, and a scale 203 can be detachably mounted to the external hanger 130. The fastener may be one or more of a screw, a latch, a rivet, and a movable snap.

In the present application, the external hanger 130 is provided outside the storage box 200, which is convenient for the tool such as the power tool, the battery pack 201, the scale 203, and the cable 204 to be hung externally. The external hanger 130 is detachably connected to the housing 110 through the limiting surface 260 formed on the surface of the housing 110, and/or the external hanger 130 is fixed on the housing 110 by the fastener so that the external hanger 130 can be quickly disassembled and assembled according to requirements, and an installation position of the external hanger 130 on the housing 110 can be adjusted according to requirements.

In the present application, the external hanger 130 is insertable on the housing 110, the housing includes a limiting portion 205 formed on the housing, and the external hanger 130 may be inserted on the limiting portion 205. The external hanger 130 includes a mounting portion 220 and a connecting portion 210, where the mounting portion 220 is capable of detachably connecting the power tool and/or a power tool accessory, and the connecting portion 210 is detachably connected to the limiting portion 205. In this manner, the external hanger 130 is inserted on the housing 110, thereby facilitating the quick installation of the external hanger 130 to the housing 110 and the quick removal of the external hanger 130 from the housing 110, and it is convenient for the user to design the installation position of the external hanger 130 on the housing 110 according to requirements. The limiting portion 205 includes the limiting surface 260 and/or a limiting hole 270 mating with the connecting portion 210. A toolbox further includes the fastener, where the fastener penetrates through the limiting hole 270 so that the connecting portion 210 is connected to the limiting portion 205, and the fastener is one of or a combination of the screw, the latch, the rivet, and the movable snap so that the external hanger 130 may be fixed on the housing 110 by the screw. Optionally, the external hanger 130 is inserted into the housing 110 through the limiting portion 205 and fixedly connected to the housing 110 by the screw at the same time.

As shown in FIG. 51, the external hanger 130 includes a battery pack hanger 231, a cable hanger 232, a scale hanger 233, a power supply hanger, and a power tool hanger for hanging the battery pack 201, the cable 204, the scale 203, and the power tool separately. Optionally, multiple external hangers 130 are provided and are one of or a combination of the battery pack hanger 231, the cable hanger 232, the scale hanger 233, the power supply hanger, and the power tool hanger. Multiple limiting portions 205 are provided. The multiple external hangers 130 may be independently mounted to different limiting portions 205. The connecting portion 210 of the external hanger 130 is a common structure and can adapt to the limiting portions 205 at different positions so that the position of the external hanger 130 on the housing and a relative distance between the multiple external hangers 130 can be adjusted.

Figure 53:
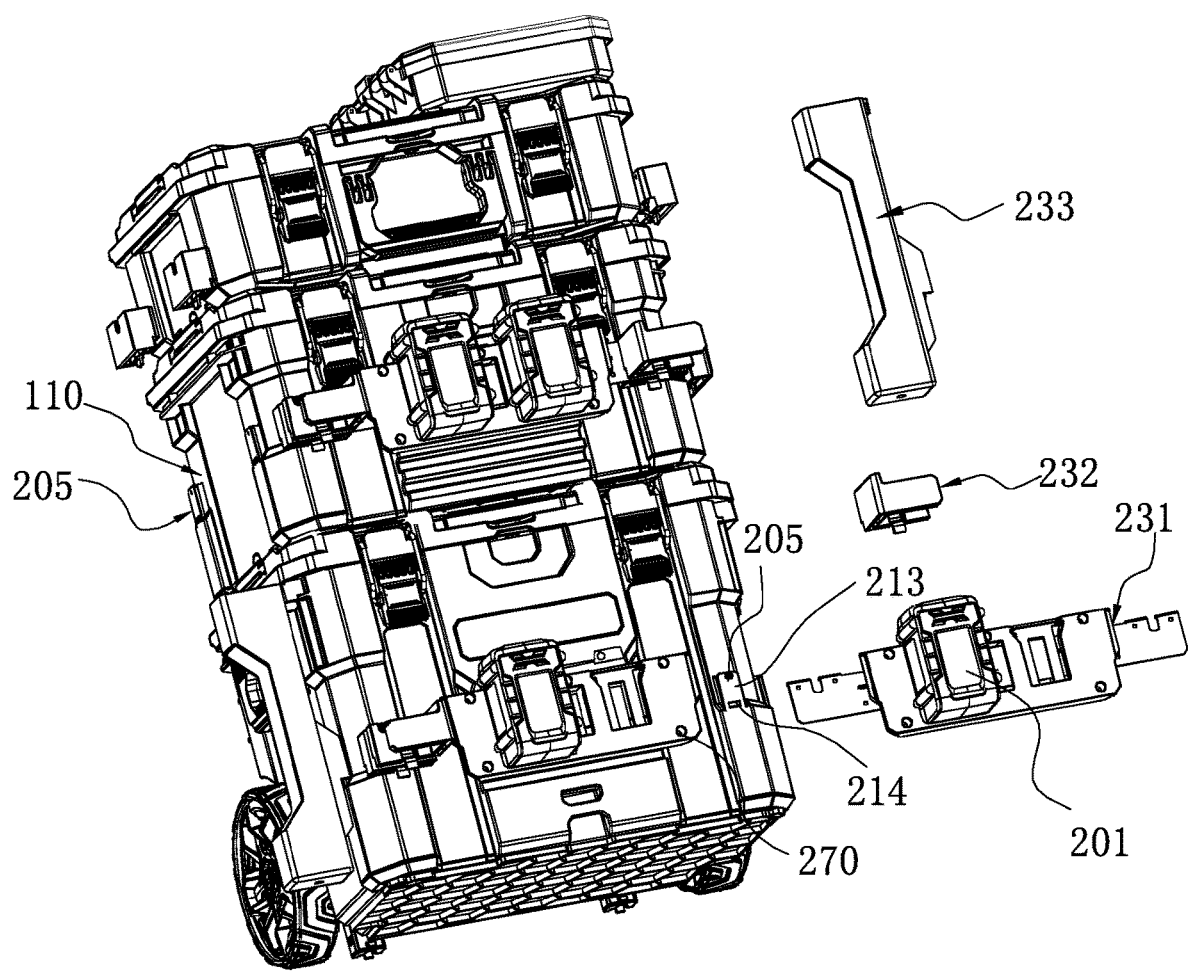
FIG. 53 is an exploded view of the toolbox system in FIG. 51.

As shown in FIG. 53, two upper and lower external hangers 130 opposite to each other mate with each other for placing the scale 203, a bottom of the lower external hanger 130 is closed, and the scale 203 penetrates through the upper external hanger 130 and then penetrates into the lower external hanger 130 from top to bottom and is supported by the lower external hanger 130. A distance between the two external hangers 130 is adjustable. The distance between the two external hangers 130 may be adjusted according to a length of the scale 203 so that the two external hangers 130 are adjusted to a distance suitable for placing the scale 203.

As shown in FIGS. 54A and 54B, the housing 110 is provided with screw holes 211, the screw holes 211 are arranged in a row along the up and down direction, the external hanger 130 is provided with first mounting holes capable of mating with the screw holes 211, and the first mounting holes on the external hanger 130 are aligned with different screw holes 211 on the housing 110, that is, a height of the external hanger 130 may be adjusted so that the distance between the two external hangers 130 can be adjusted. The external hanger 130 may be inserted on the housing as long as inserting holes are arranged in a row on the housing 110 along the up and down direction.

Figure 58:
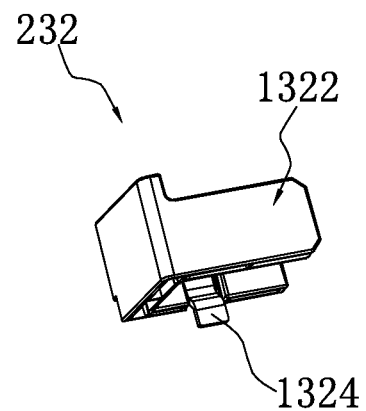
FIG. 58 is a structural view of a second example of a hanger in the toolbox system shown in FIG. 51.
Figure 61:
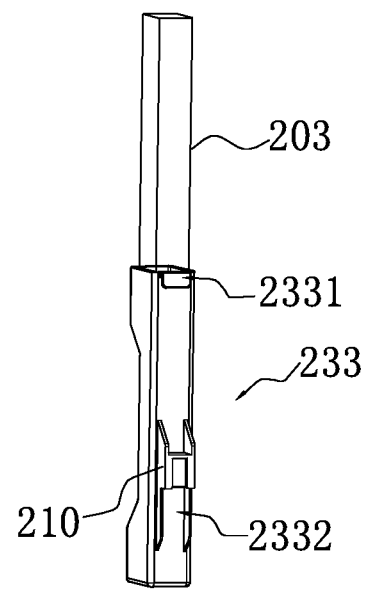
FIG. 61 is a structural view of the hanger shown in FIG. 60 from another perspective.
Figure 62:
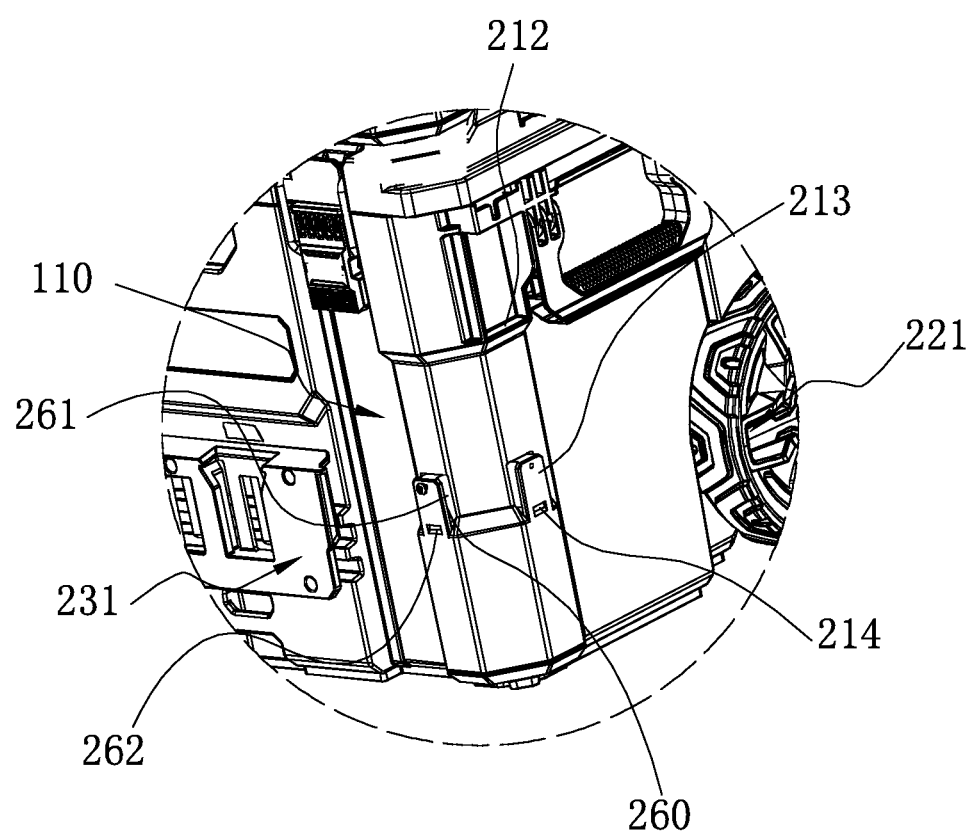
FIG. 62 is a partial structural view of the toolbox system shown in FIG. 51.

As described above, the external hanger 130 may be inserted on the housing 110. In an example, referring to FIGS. 59 and 61, the limiting portion 205 includes a mounting groove formed with the limiting surface 260, and the connecting portion 210 includes an insert block, where the insert block is inserted into the mounting groove and abuts against the limiting surface 260. One of the limiting portion 205 and the connecting portion 210 is provided with a groove and the other one of the limiting portion 205 and the connecting portion 210 is provided with an elastic member, where the elastic member is insertable into the groove. Optionally, the limiting portion 205 includes an insert block formed with the limiting surface 260, and the connecting portion 210 includes a mounting groove, where the insert block is inserted into the mounting groove such that the mounting groove abuts against the limiting surface 260. Specifically, one of the external hanger 130 and the housing 110 is provided with a mounting groove 2332, and the other one of the external hanger 130 and the housing 110 is provided with an insert block 213 mating with the mounting groove 2332, as shown in FIG. 62. The insert block 213 is inserted into the mounting groove 2332, and a mating surface between the mounting groove 2332 and the insert block 213 is the limiting surface 260 described above, that is to say, the external hanger 130 is connected to the housing 110 through the limiting surface 260. Optionally, in conjunction with FIGS. 59, 61, and 62, the external hanger 130 is provided with the mounting groove 2332, the housing 110 is provided with the insert block 213, the mounting groove 2332 extends along the up and down direction, and the external hanger 130 slides from top to bottom along the housing 110 so that the insert block 213 on the housing 110 is inserted into the mounting groove 2332 on the external hanger 130. A baffle or a stopper rib may be disposed at the top of the mounting groove 2332 and abuts against a top end of the insert block 213, so as to implement a limiting function. Further, as shown in FIG. 62, one of the external hanger 130 and the housing 110 is provided with a groove 214. As shown in FIG. 58, the other one of the external hanger 130 and the housing 110 is provided with an elastic member 1324, where the elastic member 1324 is inserted into the groove 214, and a mating surface between the groove 214 and the elastic member 1324 is the limiting surface 260 described above. The elastic member 1324 has elasticity. When the elastic member 1324 is clamped into the groove 214, the elastic member 1324 can abut against an inner wall of the housing 110 so that the external hanger 130 is fixed on the housing 110. In this example, as shown in FIG. 58, the elastic member 1324 is provided on the external hanger 130. As shown in FIG. 62, the groove 214 is provided on the housing 110. The elastic member 1324 on the external hanger 130 and the mounting groove 2332 of the external hanger 130 mate for jointly fixing the external hanger 130 on the housing 110. During assembly, when the user holds the external hanger 130 to slide the external hanger 130 downward, the insert block 213 on the housing 110 is inserted into the mounting groove 2332 on the external hanger 130, and at the same time, the elastic member 1324 on the external hanger 130 is clamped into the groove 214 on the housing 110.

Optionally, the mounting groove 2332 is formed by a rib and a groove of the housing, so as to enhance the strength of the limiting portion, and the limiting portion does not need to be mounted on the power tool.

The limiting portion 205 is formed with the limiting surface 260 for limiting and connecting the connecting portion 210, and the limiting surface 260 includes at least a first limiting surface 261 and a second limiting surface 262 that abut against the connecting portion 210 from two directions and limit the connecting portion 210. The first limiting surface 261 is formed in the mounting groove and the second limiting surface 262 is formed in the groove 214. The first limiting surface 261 and the second limiting surface 262 mate for keeping the external hanger 130 connected, which is convenient to disassemble and assemble the external hanger 130. Optionally, a connecting hole mating with the limiting hole 270 is provided on the external hanger 130, the fastener penetrates through the limiting hole 270 and the connecting hole to strengthen the connection between the external hanger 130 and the housing, the arrangement of the connecting hole enables the external hanger 130 to be independently hung on a wall or at other positions for convenient storage. Moreover, the power tool and the power tool accessory can also be hung on the wall.

Optionally, the limiting portion 205 may be separately formed with the first limiting surface 261 and the second limiting surface 262 through other structures, and the first limiting surface 261 and the second limiting surface 262 mate for limiting a position of the connecting portion 210.

As described above, the external hanger 130 includes the battery pack hanger 231.

Figure 56:
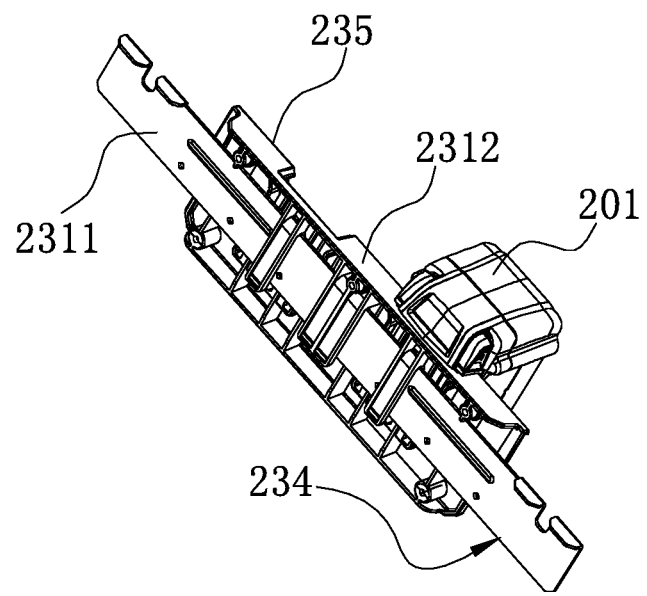
FIG. 56 is a structural view of the hanger shown in FIG. 55 from another perspective.
Figure 57:
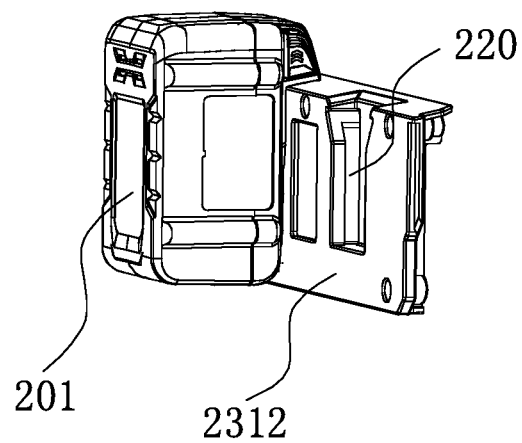
FIG. 57 is a partial structural view of the hanger shown in FIG. 0.55.

Referring to FIGS. 55 to 57, in an example, the battery pack hanger 231 includes a main hanging plate 2311 and a battery pack hanging plate 2312, where the battery pack hanging plate 2312 is used for hanging the battery pack 201. As shown in FIG. 55, multiple battery pack detents 1313 is provided on the battery pack hanging plate 2312 so that multiple battery packs 201 can be hung. The main hanging plate 2311 is fixed to the housing 110 by screws, and the battery pack hanging plate 2312 is hung on the main hanging plate 2311. The battery pack hanger 231 is configured to include the main hanging plate 2311 and the battery pack hanging plate 2312, and the battery pack hanging plate 2312 is hung on the main hanging plate 2311 so that the battery pack hanging plate 2312 can be quickly removed from the main hanging plate 2311. When the battery pack 201 does not need to be hung, the battery pack hanging plate 2312 may be removed, avoiding space occupation. Since the main hanging plate 2311 is relatively thin and does not occupy excessive space, the main hanging plate 2311 may be directly fixed to the housing 110 by the screws. Fixing the main hanging plate 2311 by the screws improves the stability of assembly since the battery pack 201 is relatively heavy.

The power tool may be connected to the external hanger by a belt clip. The external hanger may fix the power tool by the snap or in other manners.

As described above, the external hanger 130 includes the cable hanger 232. For example, referring to FIGS. 51, 58, and 59, the cable hanger 232 is disposed on each of two sides of at least a sidewall of the housing 110. As shown in FIG. 51, the cable hanger 232 is disposed on each of two sides of the sidewall of the housing 110 so that the cable 204 can be conveniently hung, and two ends of the cable 204 are separately hung on two cable hangers 232 on the two sides. As shown in FIG. 58, the mounting portion 220 of the cable hanger 232 is a hook portion 1322. In conjunction with FIGS. 51 and 58, openings of hook portions 1322 of the cable hangers 232 on the two sides of the sidewall are in opposite directions, which is conducive to limiting the cable 204 on the hook portions 1322 of the cable hangers 232.

Figure 59:
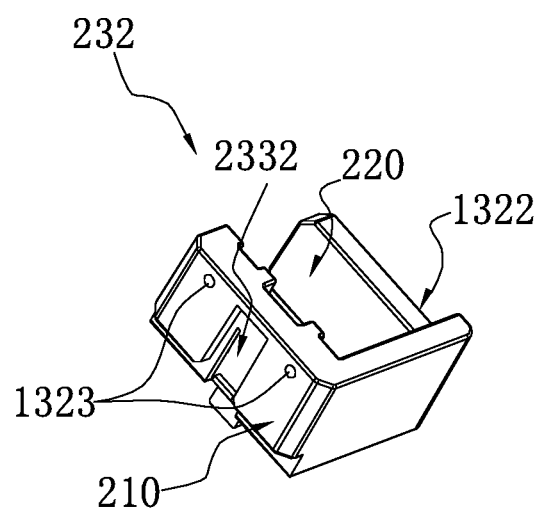
FIG. 59 is a structural view of the hanger shown in FIG. 58 from another perspective.

Referring to FIGS. 58 and 59, the cable hanger 232 may be fixed to the housing 110 through the mounting groove 2332 and the elastic member 1324 on the cable hanger 232, and the cable hanger 232 may also be fixed to the housing 110 through a second mounting hole 1323 on the cable hanger 232. The screw penetrates through the second mounting hole 1323 and is locked on the housing 110 so that the cable hanger 232 can be fixed on the housing 110. The mounting groove 2332 and the elastic member 1324 may be provided or the second mounting hole 1323 may be provided. Alternatively, the mounting groove 2332, the elastic member 1324, and the second mounting hole 1323 may be provided at the same time. As shown in FIG. 59, two second mounting holes 1323 are provided and separately disposed on two sides of the mounting groove 2332.

The mounting portion 220 is provided at an end of the cable hanger 232 facing the housing 110, and the second mounting holes 1323, the mounting groove 2332, and the elastic member 1324 are all disposed on the mounting portion 220. As shown in FIG. 59, the mounting portion 220 and the hook portion 1322 form a U-shape.

Figure 60:
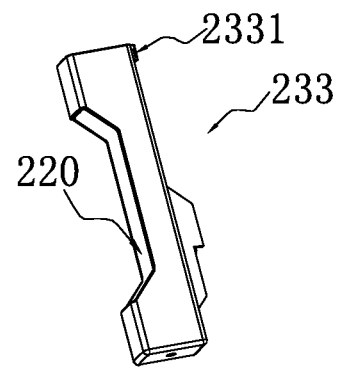
FIG. 60 is a structural view of a third example of a hanger in the toolbox system shown in FIG. 51.

As described above, the external hanger 130 includes the scale hanger 233. In the example shown in FIGS. 54A and 54B, the two external hangers 130 may mate for placing the scale 203. In the example shown in FIGS. 60 and 61, the mounting portion 220 of the scale hanger 233 is a cavity in the shape of a long cylinder, and the scale 203 is placed directly by one scale hanger 233 in the shape of the long cylinder. As shown in FIGS. 60 and 61, a hook 2331 is provided at a top end of a mating surface where the scale hanger 233 mates with the housing 110, and an opening of the hook 2331 is downward so that the hook 2331 may be hung on the housing 110 from top to bottom. Referring to FIG. 62, a hanging groove 212 mating with the hook 2331 is disposed on the housing 110. The scale hanger 233 is hung in the hanging groove 212 on the housing 110 from top to bottom through the hook 2331 so that the scale hanger 233 can be prevented from falling. As shown in FIG. 61, the mounting groove 2332 may be provided on the scale hanger 233. In conjunction with FIGS. 61 and 62, the mounting groove 2332 mates with the insert block 213 on the housing 110.

Referring to FIG. 52, the battery pack 201 and a charger 202 are hung in the housing 110 to form a battery pack charging station. The battery pack 201 is directly hung in the housing 110, and the battery pack 201 is connected to the charger 202 also hung in the housing 110 so that the battery pack 201 is charged, thereby implementing the function of a mobile charging station. The battery pack 201 can be charged at any time, which is convenient and quick. It is to be understood that the external hanger 130 may be disposed inside the housing 110 so as to hang the tool such as the battery pack 201 inside the housing 110.

The external hanger 130 includes a primary hanger 234 and a secondary hanger 235, where the primary hanger 234 is connected to the housing, the secondary hanger 235 is connected to the primary hanger 234, and the secondary hanger 235 may be used for connecting and supporting the power tool and the power tool accessory, such as the battery pack and the scale. The primary hanger 234 is provided with the connecting portion 210 mating with the limiting portion 205 of the housing, and the primary hanger 234 is further provided with the limiting portion 205 connected to the secondary hanger 235. The primary hanger may be used for directly mounting an accessory such as the power tool or the battery pack. The secondary hanger 235 may be provided with a hook so that the secondary hanger 235 can be hung directly on the primary hanger 234. Optionally, the secondary hanger 235 is connected to the primary hanger 234 by the fastener. The primary hanger 234 is foldable, which is convenient for the user to store.

The housing further includes an intermediate piece 136 disposed at a corner of a side surface of the housing and used for connecting the primary hanger 234. The intermediate piece 136 is provided with a protrusion for positioning the primary hanger 234. The primary hanger 234 is formed with a corresponding hole groove to be clamped with the intermediate piece 136. Positioned by the intermediate piece 136, the primary hanger 234 extends horizontally toward two side surfaces of the housing and is fixedly connected to the housing through the fastener. The intermediate piece 136 is provided so that a gap between the fastener and the primary hanger 234 can be reduced, and two primary hangers 234 may be connected to the housing through one fastener.

Optionally, the storage box 200 includes an accommodation portion and a bracket portion, where the bracket portion supports the accommodation portion, the external hanger 130 may be mounted to the bracket portion, and the accommodation portion is used for accommodating an object. The accommodation portion may be made of a hard material, such as a plastic material or a resin material. Optionally, the accommodation portion may be a pouch structure, that is, the accommodation portion is deformable, and the storage box 200 is integrally supported by the bracket portion. The storage box 200 further includes a cover connected to the accommodation portion and used for enclosing an accommodation space formed by the accommodation portion. Optionally, the external hanger 130 may be adaptively connected to two end surfaces of the cover. The external hanger 130 is disposed on the cover, in the housing, or outside the housing. Optionally, the battery pack hanger and the charger insert are included in the housing to form the battery pack charging station.

Optionally, the storage box 200 has multiple layers, and the storage box 200 includes at least a first toolbox and a second toolbox, where the first toolbox and the second toolbox are detachably spliced to form a housing structure of the toolbox having multiple accommodation spaces. The first toolbox and the second toolbox are connected by a connector or a snap structure of the toolbox.

In an example, the present application adopts the technical solutions described below. A toolbox system includes a storage box and an external hanger assembly.

The storage box has an accommodation cavity for storing an item. The storage box includes a limiting portion formed on a housing of the storage box. The external hanger assembly is used for detachably connecting the item. The external hanger assembly includes an external hanger capable of detachably connecting the item. The limiting portion includes a limiting surface and/or a limiting hole mating with a mounting portion of the external hanger assembly.

In some examples, the external hanger assembly further includes an intermediate piece, where the intermediate piece is connected to or integrally formed with the storage box.

The intermediate piece further includes a first contact portion, a second contact portion, and a third contact portion, where at least one external hanger is capable of being mounted to each of the first contact portion, the second contact portion, and the third contact portion.

In some examples, the intermediate piece is integrally formed with the storage box, and the external hanger is formed with the mounting portion.

In some examples, the intermediate piece is integrally formed with the storage box, and the intermediate piece is formed with the mounting portion.

In some examples, the first contact portion includes a first mounting surface at least partially located in a first plane.

The second contact portion includes a second mounting surface at least partially located in a second plane.

The third contact portion includes a third mounting surface at least partially located in a third plane.

The first plane, the second plane, and the third plane intersect with each other and are not perpendicular to each other.

In some examples, one or more external hangers are capable of being mounted on each of the first mounting surface, the second mounting surface, or the third mounting surface.

In some examples, the storage box includes multiple sidewalls extending basically along an up and down direction and a bottom wall and an upper cover which are opposite to each other and basically close the multiple sidewalls, where the multiple sidewalls, the bottom wall, and the upper cover surround the accommodation cavity, and sidewalls are connected to each other through a connecting section.

The sidewalls and the connecting section are integrally formed to form the intermediate piece, and the external hanger is connected to the storage box through one or more of a screw, a latch, a rivet, and a movable snap.

In some examples, the storage box includes multiple sidewalls extending basically along an up and down direction and a bottom wall and an upper cover which are opposite to each other and basically close the multiple sidewalls, where the multiple sidewalls, the bottom wall, and the upper cover surround the accommodation cavity.

Sidewalls are connected to each other through a connecting section, and the intermediate piece is detachably connected to the connecting section.

In some examples, the connecting section is connectable to one or more intermediate pieces through one or more of the screw, the latch, the rivet, and the movable snap.

In some examples, a metal guard link is semi-embedded into the connecting section.

When the intermediate piece is mounted onto the connecting section, the guard link is disposed between the intermediate piece and the connecting section.

In some examples, multiple external hangers are provided, where the multiple external hangers include one of or a combination of a battery pack hanger, a cable hanger, a scale hanger, a support, and a power tool hanger.

In some examples, multiple scale hangers mate for placing a scale.

In some examples, the support includes a first elongated plate and a second elongated plate spaced apart to form a gap for connecting or supporting one or more of a power tool, a power tool accessory, a battery pack, or a charger.

In some examples, multiple spacer plates are disposed in the gap.

In some examples, the support is connectable to the external hanger.

In some examples, the external hanger assembly is disposed outside the accommodation cavity, the external hanger assembly further includes an intermediate piece, the intermediate piece is provided with the mounting portion, the mounting portion is detachably connected to the limiting portion, and the external hanger is detachably mounted to the intermediate piece.

The intermediate piece includes at least an external hanger contact portion on which the external hanger is capable of being mounted.

In some examples, the external hanger contact portion includes a first contact portion and a second contact portion, where the first contact portion and the second contact portion are formed with a first mounting surface and a second mounting surface, where at least one external hanger is capable of being mounted on each of the first mounting surface and the second mounting surface.

The first mounting surface is at least partially located in a first plane and the second mounting surface is at least partially located in a second plane, where the first plane obliquely intersects with the second plane.

In some examples, the storage box includes multiple sidewalls extending basically along an up and down direction and a bottom wall and an upper cover which are opposite to each other and basically close the multiple sidewalls, where the multiple sidewalls, the bottom wall, and the upper cover surround the accommodation cavity.

The toolbox system further includes at least one fan unit, where the fan unit is used for generating an airflow and detachably connected outside the accommodation cavity.

In some examples, the toolbox system further includes a snap assembly by which the fan unit is detachably connected to one of the multiple sidewalls.

In some examples, the toolbox system further includes a snap assembly by which the fan unit is detachably connected to the upper cover.

In some examples, the snap assembly includes a first snap assembly and a second snap assembly, where the first snap assembly and the second snap assembly mate for locking the fan unit.

A distance between the first snap assembly and the second snap assembly along an extension direction of the upper cover is defined as a first distance $W1$.

A length of the upper cover along the extension direction of the upper cover is defined as a second distance $W2$.

A ratio of the first distance $W1$ to the second distance $W2$ is greater than or equal to 0.4 and less than or equal to 1.

In some examples, the first snap assembly includes a first snap piece and a positioning member mating with each other, where the first snap piece is fixedly connected to or integrally formed with the fan unit, and the positioning member is connected to the upper cover.

The second snap assembly includes a rotary member and a stop mating with each other, where the rotary member is connected to the upper cover, and the stop is fixedly connected to or integrally formed with the fan unit.

When the rotary member is in contact with the stop and the first snap piece is in contact with the positioning member, the fan unit and the storage box remain fixed relative to each other.

When the first snap piece is separated from the positioning member, the fan unit is separated from the storage box into an independent tool.

In some examples, the toolbox system includes multiple storage boxes, where the multiple storage boxes are fixedly connected to each other.

The fan unit is detachably connectable to any one of the multiple storage boxes.

In some examples, the snap assembly further includes a third snap assembly, where the first snap assembly and the third snap assembly mate for locking the storage box, the first snap assembly and the third snap assembly are disposed at two ends of the upper cover, and the second snap assembly is disposed between the first snap assembly and the third snap assembly.

In some examples, when the toolbox system stands still on the ground, three support points are at least included between the storage box and the ground, where a plane where the three support points are located is defined as a support plane; when the fan unit is connected to the storage box, a contact surface at least exists between the fan unit and the storage box; and a distance between the contact surface and the support plane along the up and down direction is greater than or equal to 100 mm.

In some examples, the toolbox system further includes a moving device capable of standing or moving the storage box, where the moving device is connected to the storage box and includes one or more wheels.

When the toolbox system stands still on the ground, three support points are at least included between the toolbox system and the ground, where a plane where the three support points are located is defined as a support plane.

When the fan unit is connected to the storage box, a contact surface at least exists between the fan unit and the storage box.

A distance between the contact surface and the support plane along the up and down direction is greater than or equal to 100 mm.

In some examples, the toolbox system further includes the external hanger detachably connected to the storage box, where the external hanger assembly is capable of detachably connecting the fan unit.

In some examples, the toolbox system further includes an interposer assembly disposed in the accommodation cavity, where the interposer assembly includes a charger insert for connecting a charger; and the charger insert has at least a first connection state and a second connection state, where when the charger insert is in the first connection state, a first type of charger is mounted to the charger insert; and when the charger insert is in the second connection state, a second type of charger is mounted to the charger insert.

In some examples, the interposer assembly further includes a connector, where the connector is connected to the storage box, and at least one charger insert is detachably connected to the connector.

In some examples, the interposer assembly further includes a fastener by which the charger insert is fixed to the connector, where the fastener is one or more of a screw, a latch, a rivet, and a movable snap.

In some examples, the storage box includes multiple sidewalls extending basically along an up and down direction and a bottom wall and an upper cover which are opposite to each other and basically close the multiple sidewalls, where the multiple sidewalls, the bottom wall, and the upper cover surround the accommodation cavity, and the connector is connected to the upper cover.

In some examples, the interposer assembly further includes a connector, where the connector is integrally formed with the storage box, and at least one charger insert is detachably connected to the connector.

In some examples, a first clamping end and a second clamping end are provided on the charger insert and used for mounting the charger; and the charger insert has at least the first connection state and the second connection state, where when the charger insert is in the first connection state, a first length exists between the first clamping end and the second clamping end; and when the charger insert is in the second connection state, a second length exists between the first clamping end and the second clamping end, where the first length is greater than the second length.

The charger insert includes a first charger insert and a second charger insert, where the first clamping end is disposed on the first charger insert, the second clamping end is disposed on the second charger insert, and the first charger insert is capable of moving relative to the second charger insert.

In some examples, the charger insert in the first connection state and the charger insert in the second connection state are capable of being simultaneously mounted on the connector.

In some examples, the storage box includes multiple sidewalls extending basically along an up and down direction and a bottom wall and an upper cover which are opposite to each other and basically close the multiple sidewalls, where the multiple sidewalls, the bottom wall, and the upper cover surround the accommodation cavity.

The toolbox system further includes a battery pack insert and a battery pack mounting portion. The battery pack insert is used for mounting a battery pack. The battery pack mounting portion is detachably connected to the battery pack insert. The battery pack mounting portion is disposed outside the accommodation cavity, or the battery pack mounting portion is disposed inside the accommodation cavity.

In some examples, the battery pack mounting portion includes a positioning device disposed in the accommodation cavity and used for guiding the battery pack insert to be detachably connected in the accommodation cavity along a first guiding direction.

In some examples, the positioning device includes a first positioning assembly and a second positioning assembly mating with each other for fixing the battery pack insert.

The first positioning assembly limits downward movement of the battery pack insert and the second positioning assembly limits upward movement of the battery pack insert in the case where the battery pack insert is not driven by an external force.

In some examples, the first positioning assembly includes at least a pair of a first connection end and a second connection end mating with each other, where one of the first connection end and the second connection end is fixedly connected to or integrally formed with at least one sidewall of the storage box and the other one of the first connection end and the second connection end is fixedly connected to or integrally formed with the battery pack insert.

In some examples, the first positioning assembly includes a support element fixedly connected to the sidewall, the support element is connected to the first connection end, the first connection end is formed with a support groove, the second connection end is formed on the battery pack insert, the second connection end is bent outward to form an overhang, and a width of the support groove is greater than a width of the overhang so that the overhang moves along the first guiding direction.

In some examples, the second positioning assembly includes at least a pair of a first positioning end and a second positioning end mating with each other, where one of the first positioning end and the second positioning end is disposed on the sidewall fixed to the first connection end and the other one of the first positioning end and the second positioning end is disposed on the battery pack insert.

In some examples, the first positioning end is disposed on the support element and the second positioning end is disposed on the battery pack insert.

When the overhang is connected to the support groove, the first positioning end is in contact with the second positioning end, and the first positioning end limits the upward movement of the battery pack insert.

In some examples, the first positioning end is an elastic protrusion formed by the support element, and the second positioning end is an upper surface of the battery pack insert.

In some examples, the second positioning assembly includes at least a pair of the first positioning end and the second positioning end mating with each other.

The first positioning end is fixedly connected to or integrally formed with the upper cover, and the second positioning end is fixedly connected to or integrally formed with the battery pack insert.

When the upper cover basically closes the accommodation cavity, the first positioning end abuts against the second positioning end, and the first positioning end limits the upward movement of the battery pack insert.

In some examples, the second positioning assembly includes at least a pair of the first positioning end and the second positioning end mating with each other, where the first positioning end is disposed on a sidewall adjacent to the support element, and the second positioning end is fixedly connected to or integrally formed with the battery pack insert.

When the first positioning end is driven to abut against the second positioning end, the first positioning end limits the upward movement of the battery pack insert.

In some examples, the battery pack mounting portion includes a support disposed outside the accommodation cavity, where the support is connected to or supports the battery pack insert.

In some examples, the battery pack insert includes a battery pack mounting plate for mounting the battery pack and a main connecting plate for fixing the battery pack mounting plate; where the main connecting plate is made of a first material and the battery pack mounting plate is made of a second material, where hardness of the first material is greater than hardness of the second material.

In some examples, the toolbox system further includes an interposer assembly disposed in the storage box and used for connecting the item. The interposer assembly includes an interposer and a connector, where the connector is connected to the storage box, and at least one interposer is capable of being detachably mounted on the connector. The interposer includes an outlet portion capable of detachably connecting the item and an access portion mating with an adapter portion of the connector.

In some examples, the interposer assembly further includes a fastener, where the fastener penetrates through the access portion to fix the interposer to the adapter portion of the connector, and the fastener is one or more of a screw, a latch, a rivet, and a movable snap.

In some examples, the storage box includes multiple sidewalls extending basically along an up and down direction and a bottom wall and an upper cover which are opposite to each other and basically close the multiple sidewalls, where the multiple sidewalls, the bottom wall, and the upper cover surround the accommodation cavity, and the connector is fixedly connected to the upper cover.

In some examples, the storage box includes multiple sidewalls extending basically along an up and down direction and a bottom wall and an upper cover which are opposite to each other and basically close the multiple sidewalls, where the multiple sidewalls, the bottom wall, and the upper cover surround the accommodation cavity, and the connector is fixedly connected to a sidewall.

In some examples, the interposer is formed by the item.

In some examples, multiple interposers are provided, where each of the multiple interposers includes one of or a combination of a battery pack insert, a charger insert, and a tool accessory box.

In some examples, multiple adapter portions are provided, and the multiple interposers are capable of being independently mounted to different adapter portions.

In some examples, one of the tool accessory box and the adapter portion is provided with an embedded groove and the other one of the tool accessory box and the adapter portion is provided with a flexible member, where the flexible member is insertable into the embedded groove.

In some examples, the charger insert has at least a first connection state and a second connection state, where when the charger insert is in the first connection state, a first type of charger is mounted to the charger insert; and when the charger insert is in the second connection state, a second type of charger is mounted to the charger insert.

In some examples, the charger insert is formed with multiple limiting holes through which screws penetrate to fix the charger insert to the adapter portion.

In some examples, the limiting portion includes a mounting groove formed with the limiting surface, and a connecting portion includes an insert block, where the insert block is inserted into the mounting groove and abuts against the limiting surface.

In some examples, one of the limiting portion and the connecting portion is provided with a groove and the other one of the limiting portion and the connecting portion is provided with an elastic member, where the elastic member is insertable into the groove.

In some examples, the toolbox further includes a fastener, where the fastener penetrates through the limiting hole to connect the connecting portion to the limiting portion, and the fastener is one of or a combination of a screw, a latch, a rivet, and a movable snap.

In some examples, multiple external hangers are provided, where the multiple external hangers include one of or a combination of a power tool hanger, a battery pack hanger, a cable hanger, and a scale hanger.

In some examples, multiple limiting portions are provided, and the multiple external hangers are capable of being independently mounted to different limiting portions.

In some examples, the cable hanger is disposed on each of two sides of at least a sidewall of the housing, is used for hanging a cable, and includes a hook portion, and openings of hook portions of cable hangers on the two sides of the sidewall are in opposite directions.

In some examples, the scale hanger is in a shape of a long cylinder and used for placing a scale, a hook is disposed at a top end of a mating surface of the scale hanger mating with the housing, an opening of the hook is downward, and a hanging groove mating with the hook is disposed on the housing.

In some examples, the limiting portion includes an insert block formed with the limiting surface, and a connecting portion includes a mounting groove, where the insert block is inserted into the mounting groove such that the mounting groove abuts against the limiting surface.

In some examples, the external hanger includes a primary hanger and a secondary hanger, where the primary hanger is connected to the housing, and the secondary hanger is connected to the primary hanger.

In some examples, the toolbox system includes an accommodation portion and a bracket portion, where the bracket portion supports the accommodation portion, and the external hanger is mounted on the bracket portion.

In some examples, the storage box further includes a cover, and the external hanger is disposed on the cover, in the housing, or outside the housing.

In some examples, a battery pack hanger and a charger insert are included in the housing to form a battery pack charging station.

The present application has the following beneficial effects: the item is connected outside the storage box through the external hanger assembly so that the toolbox system can accommodate more items.

What is claimed is:

1. A toolbox system, comprising:
a storage box having an accommodation cavity for storing an item, wherein the storage box comprises a limiting portion formed on a housing of the storage box; and
an external hanger assembly comprising an external hanger capable of detachably connecting the item,
wherein the limiting portion comprises at least one of a limiting surface or a limiting hole mating with a connecting portion of the external hanger assembly,
wherein the limiting portion comprises a mounting groove formed with the limiting surface, the connecting portion comprises an insert block, and the insert block is inserted into the mounting groove and abuts against the limiting surface, and
wherein one of the limiting portion and the connecting portion is provided with a groove and another one of the limiting portion and the connecting portion is provided with an elastic member, and the elastic member is insertable into the groove.

2. The toolbox system of claim 1, wherein the external hanger assembly comprises a plurality of external hangers, and the plurality of external hangers comprises at least one of a power tool hanger, a battery pack hanger, a cable hanger, or a scale hanger.

3. The toolbox system of claim 1, wherein the external hanger assembly comprises a plurality of cable hangers disposed on each of two sides of a sidewall of the housing, each of the plurality of cable hangers comprises a hook portion, and openings of hook portions of the plurality of cable hangers on the two sides of the sidewall are in opposite directions.

4. The toolbox system of claim 1, wherein the external hanger assembly comprises a plurality of external hangers and the plurality of external hangers comprises a primary hanger and a secondary hanger, the primary hanger is connected to the housing, and the secondary hanger is connected to the primary hanger.

5. The toolbox system of claim 1, wherein the external hanger assembly further comprises an intermediate piece for connecting the external hanger to the storage box, the intermediate piece is connected to the storage box through the limiting portion, and the external hanger is detachably connected to the intermediate piece.

6. The toolbox system of claim 5, wherein the intermediate piece further comprises a first contact portion, a second contact portion, and a third contact portion, and an external hanger is capable of being mounted to each of the first contact portion, the second contact portion, and the third contact portion.

7. The toolbox system of claim 1, wherein the storage box comprises a plurality of sidewalls extending basically along an up and down direction and a bottom wall and an upper cover which are opposite to each other, the plurality of sidewalls, the bottom wall, and the upper cover surround the accommodation cavity, the toolbox system further comprises a fan unit, and the fan unit is used for generating an airflow and detachably connected outside the accommodation cavity.

8. The toolbox system of claim 7, further comprising a snap assembly by which the fan unit is detachably connected to the upper cover.

9. The toolbox system of claim 1, further comprising an interposer assembly disposed in the accommodation cavity, wherein the interposer assembly comprises a charger insert for connecting a charger, the charger insert has at least a first connection state and a second connection state, a first type of charger is capable of being mounted to the charger insert when the charger insert is in the first connection state, and a second type of charger is capable of being mounted to the charger insert when the charger insert is in the second connection state.

10. The toolbox system of claim 1, wherein the storage box comprises a plurality of sidewalls extending basically along an up and down direction and a bottom wall and an upper cover which are opposite to each other, the plurality of sidewalls, the bottom wall, and the upper cover surround the accommodation cavity, the toolbox system further comprises a battery pack insert for mounting a battery pack and a battery pack mounting portion detachably connected to the battery pack insert, and the battery pack mounting portion is disposed outside the accommodation cavity or inside the accommodation cavity.

11. The toolbox system of claim 1, further comprising a fastener, wherein the fastener penetrates through the limiting hole to connect the connecting portion to the limiting portion, and the fastener is at least one of a screw, a latch, a rivet, or a movable snap.

12. A toolbox system, comprising:
a storage box having an accommodation cavity for storing an item, wherein the storage box comprises a limiting portion formed on a housing of the storage box; and
an external hanger assembly comprising an external hanger capable of detachably connecting the item,
wherein the limiting portion comprises at least one of a limiting surface or a limiting hole mating with a connecting portion of the external hanger assembly, and
wherein the external hanger assembly comprises a scale hanger in a shape of a long cylinder and used for placing a scale, a hook is disposed at a top end of a mating surface of the scale hanger mating with the housing, an opening of the hook is downward, and a hanging groove mating with the hook is disposed on the housing.

* * * * *